(12) United States Patent
Vantaram et al.

(10) Patent No.: US 8,515,171 B2
(45) Date of Patent: Aug. 20, 2013

(54) METHODS FOR ADAPTIVE AND PROGRESSIVE GRADIENT-BASED MULTI-RESOLUTION COLOR IMAGE SEGMENTATION AND SYSTEMS THEREOF

(75) Inventors: Sreenath Rao Vantaram, Rochester, NY (US); Eli Saber, Webster, NY (US); Sohail Dianat, Pittsford, NY (US); Mark Shaw, Meridian, ID (US); Ranjit Bhaskar, Portland, OR (US)

(73) Assignees: Rochester Institute of Technology, Rochester, NY (US); Hewlett-Packard Development Company, LP, Houston, TX (US)

( * ) Notice: Subject to any disclaimer, the term of this patent is extended or adjusted under 35 U.S.C. 154(b) by 690 days.

(21) Appl. No.: 12/655,933

(22) Filed: Jan. 11, 2010

(65) Prior Publication Data

US 2010/0183225 A1 Jul. 22, 2010

Related U.S. Application Data

(60) Provisional application No. 61/204,787, filed on Jan. 9, 2009.

(51) Int. Cl.
*G06K 9/34* (2006.01)
*G06K 9/00* (2006.01)
*G06K 9/66* (2006.01)

(52) U.S. Cl.
USPC ........... 382/173; 382/164; 382/168; 382/190; 382/195

(58) Field of Classification Search
None
See application file for complete search history.

(56) References Cited

PUBLICATIONS

Rao, "Multiresolution Techniques in Image Processing," 1995, PhD thesis, Louisiana State University and Agricultural and Mechanical College, Dept. Comp. Sci.*
Piella, "A general framework for multiresolution image fusion: from pixels to regions," 2003, Information Fusion, 4(4): pp. 259-280.*
Jung, "Unsupervised multiscale segmentation of color images," 2007, Pattern Recognit. Lett., pp. 523-533.*
Garcia et al., "Automatic Color Image Segmentation by Dynamic Region Growth and Multimodal Merging of Color and Texture Information," 2005, International Conference on Acoustics, Speech and Signal Processing.*
Jung, "Combining wavelets and watersheds for robust multiscale image segmentation", 2007, Image and Vision Computing 25, pp. 25-33.*

* cited by examiner

*Primary Examiner* — Amir Alavi
*Assistant Examiner* — Kenny Cese
(74) *Attorney, Agent, or Firm* — Joseph M. Noto; Bond, Schoeneck & King PLLC

(57) ABSTRACT

A multi-resolution color image segmentation algorithm which takes advantage of gradient information in an adaptive and progressive framework is described. A gradient-based segmentation method is initiated with a dyadic wavelet decomposition scheme of an arbitrary input image, accompanied by a vector gradient calculation of its color converted counterpart. The resultant gradient map is used to automatically and adaptively generate thresholds for segregating regions of varying gradient densities, at different resolution levels of the input image pyramid. In combination with a confidence map and non-linear spatial filtering techniques, regions of high confidence are passed from one resolution level to another until the final segmentation at highest (original) resolution is achieved.

18 Claims, 28 Drawing Sheets
(28 of 28 Drawing Sheet(s) Filed in Color)

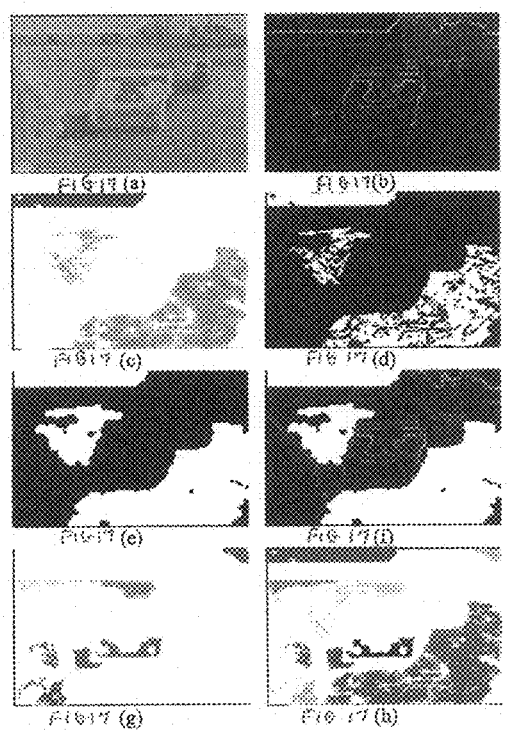

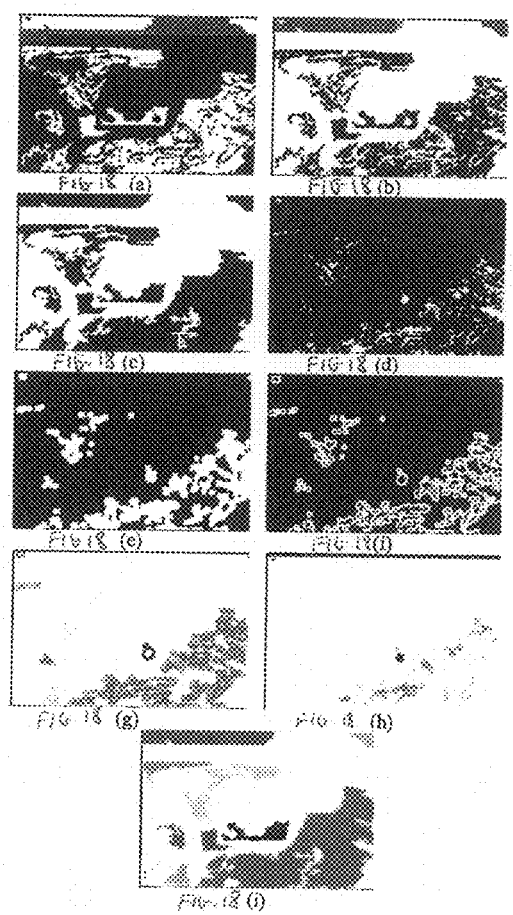
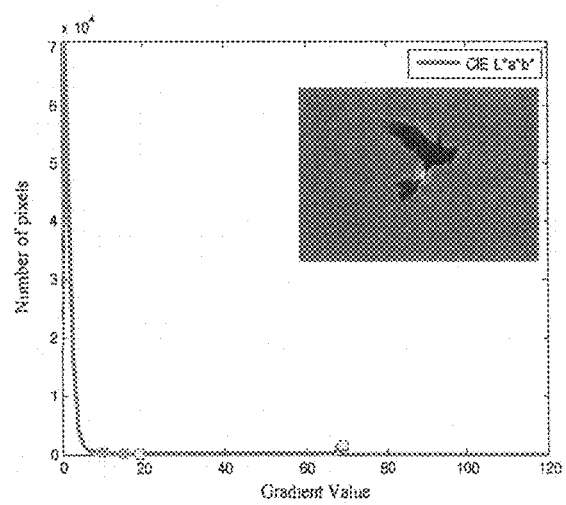
FIG. 19

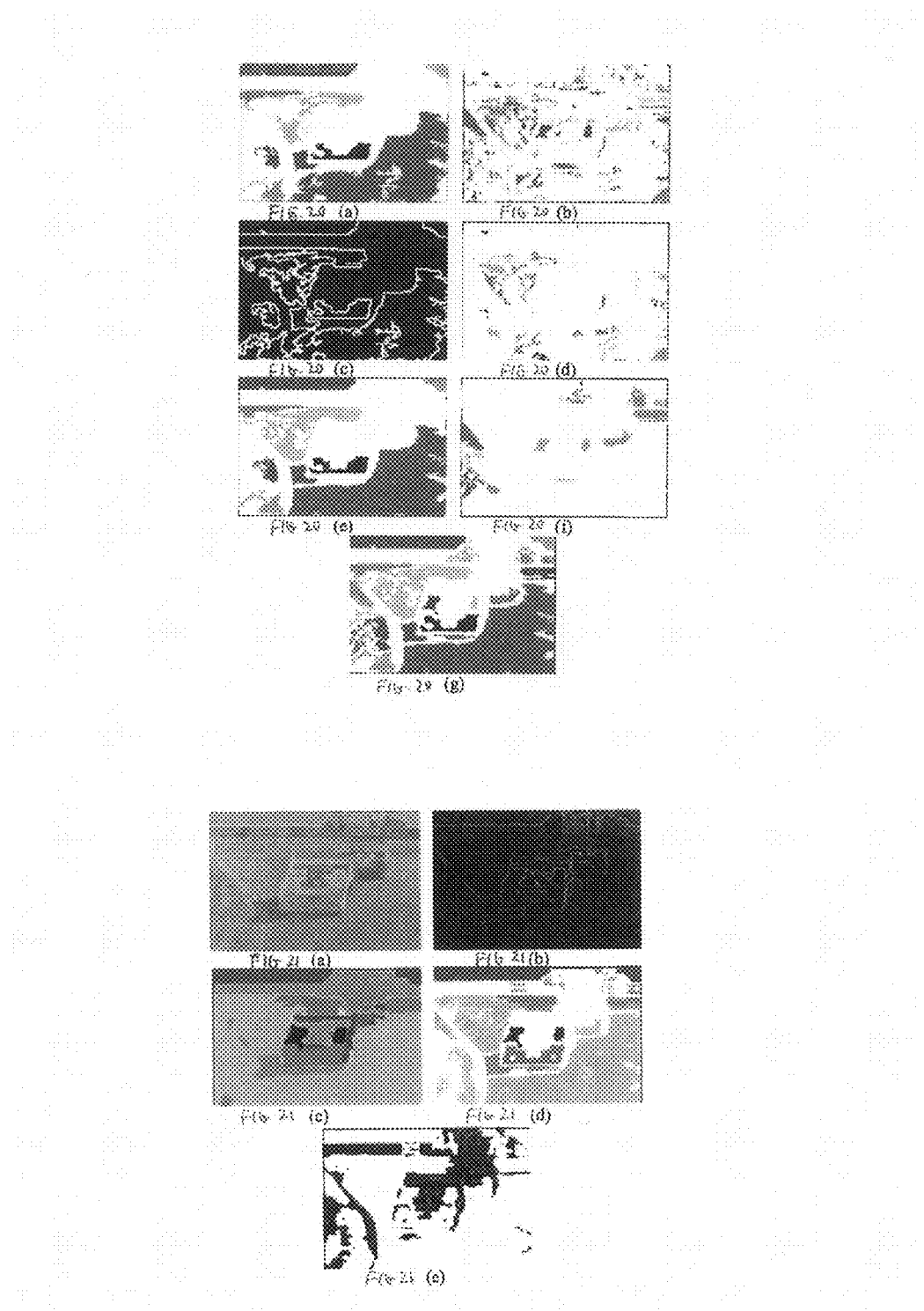

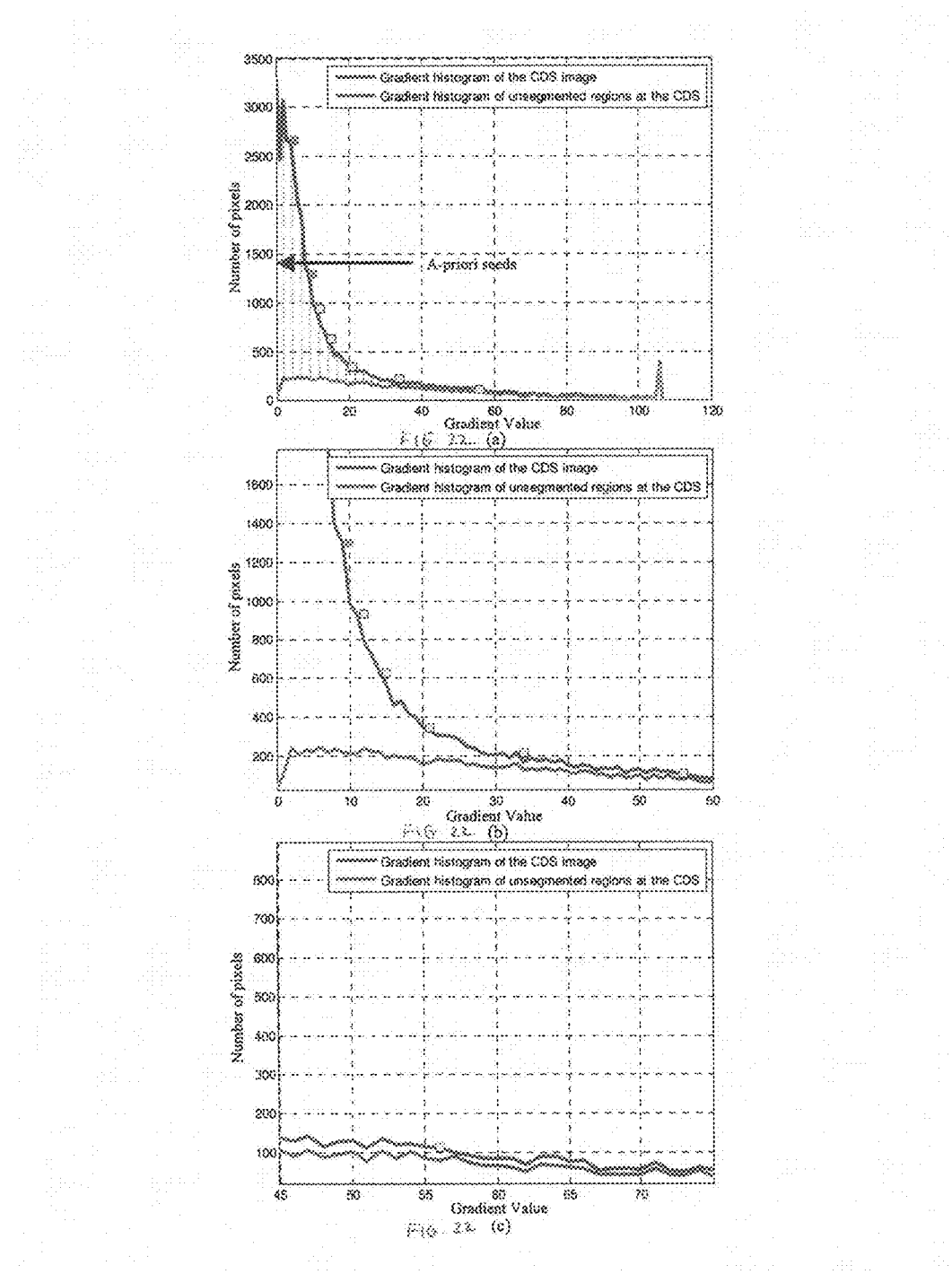

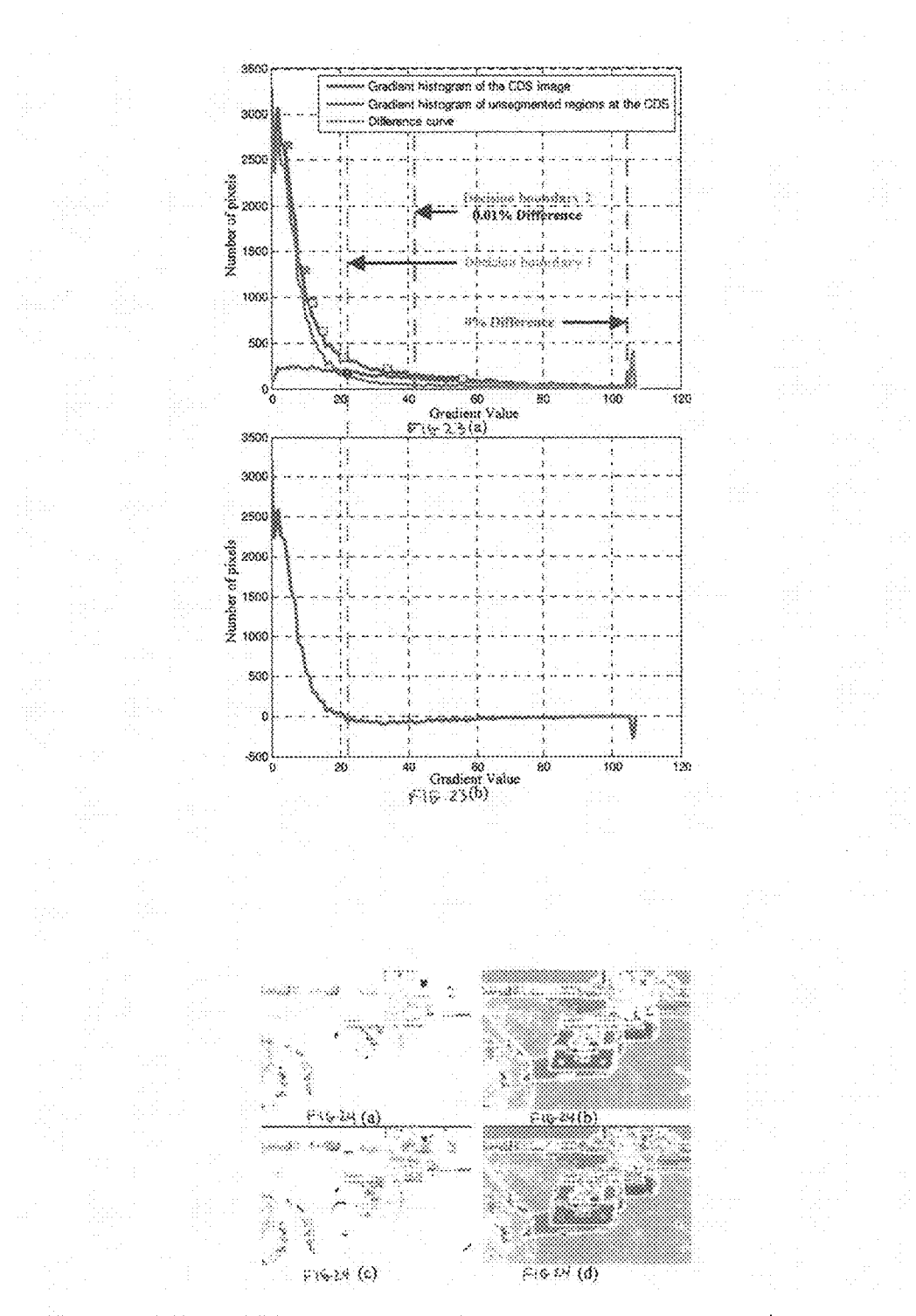

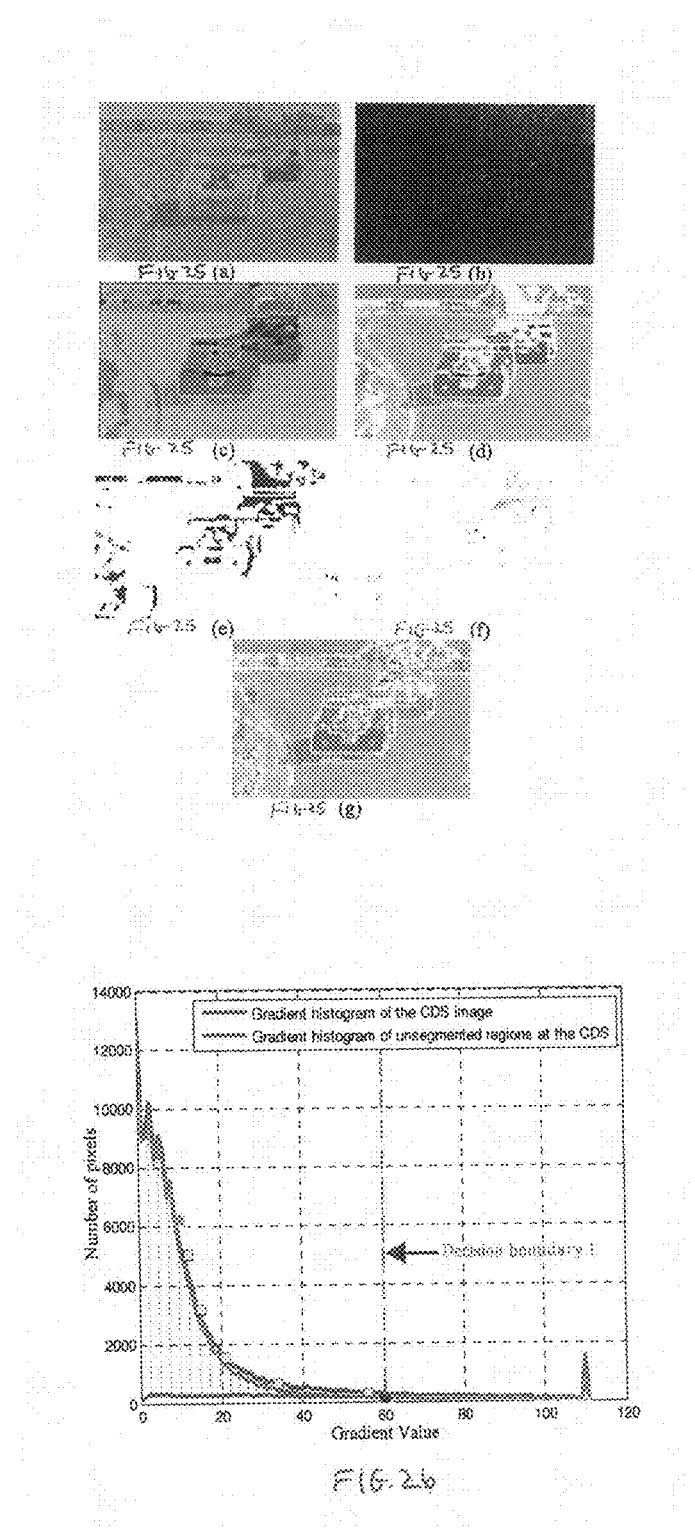

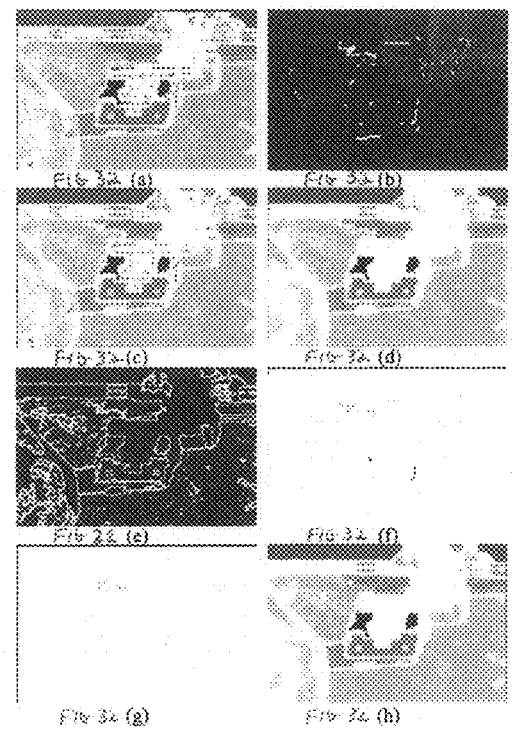
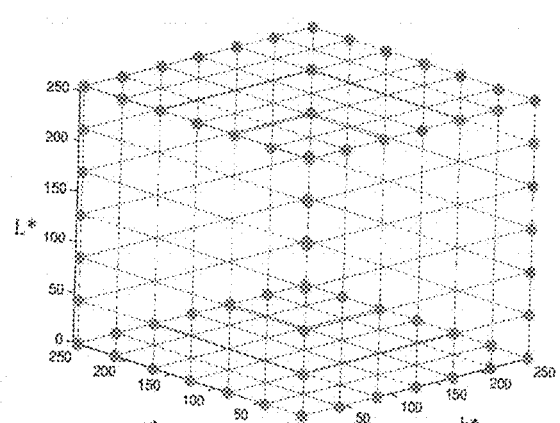
FIG. 33

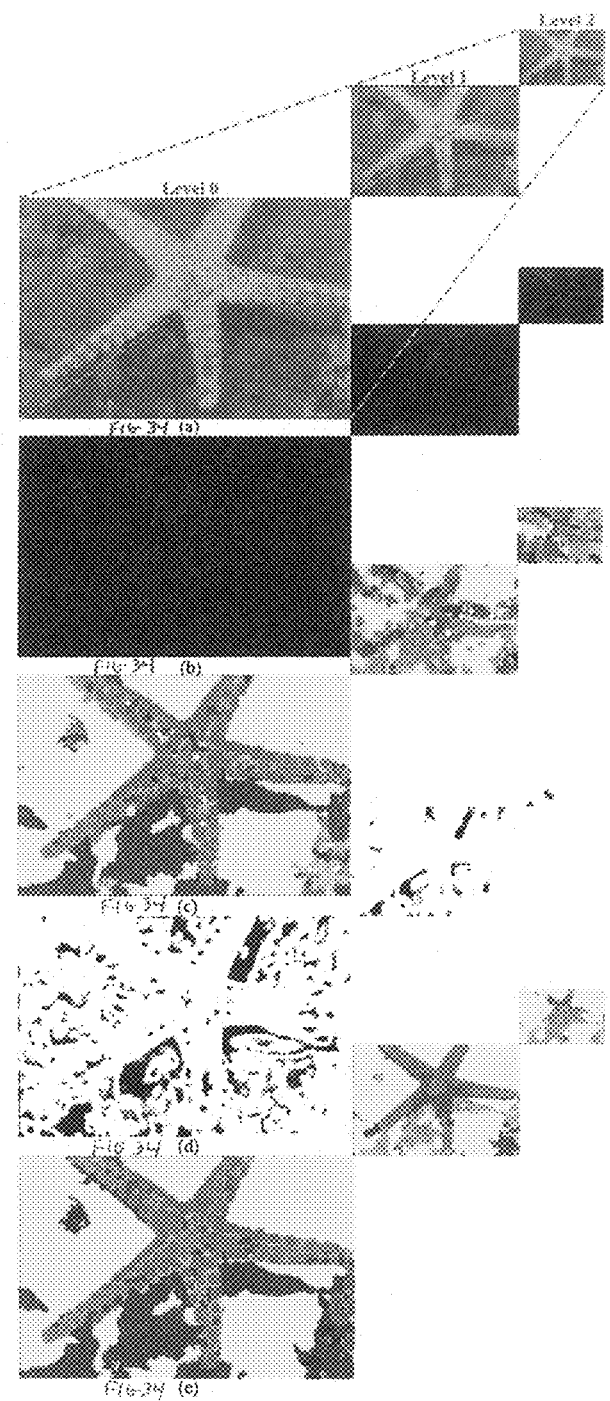

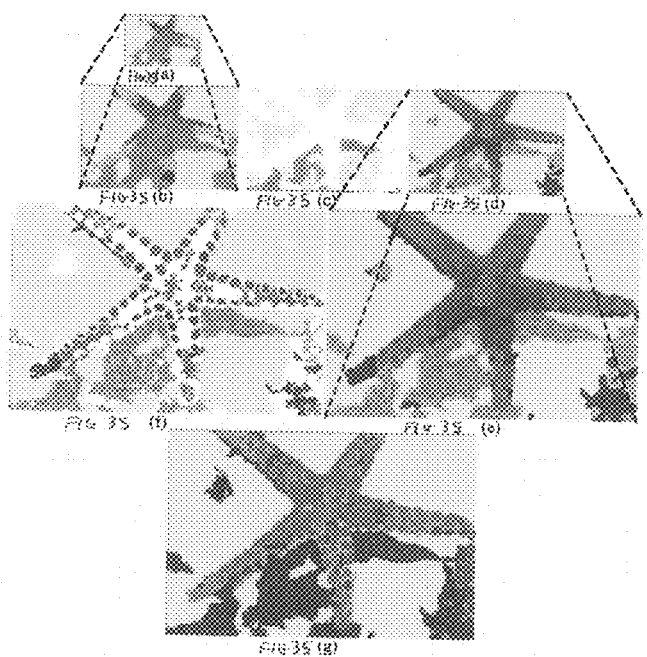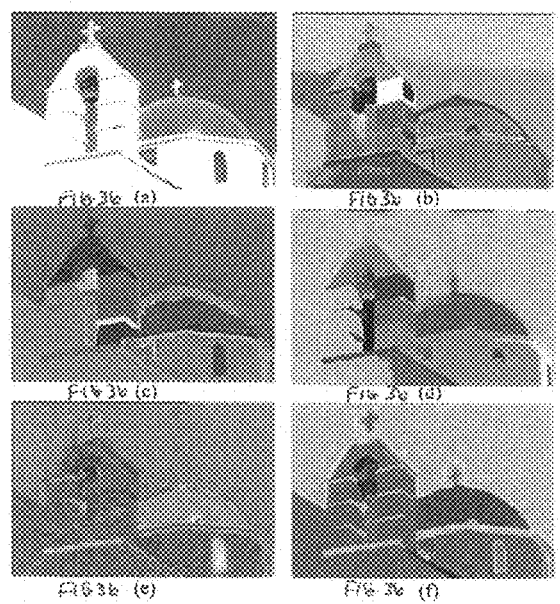

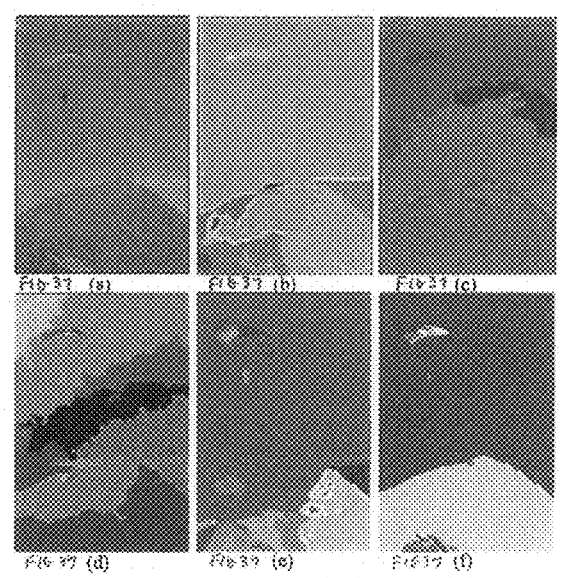
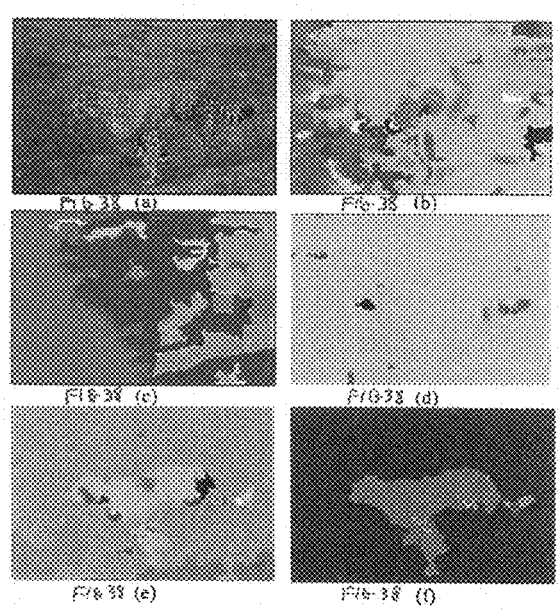

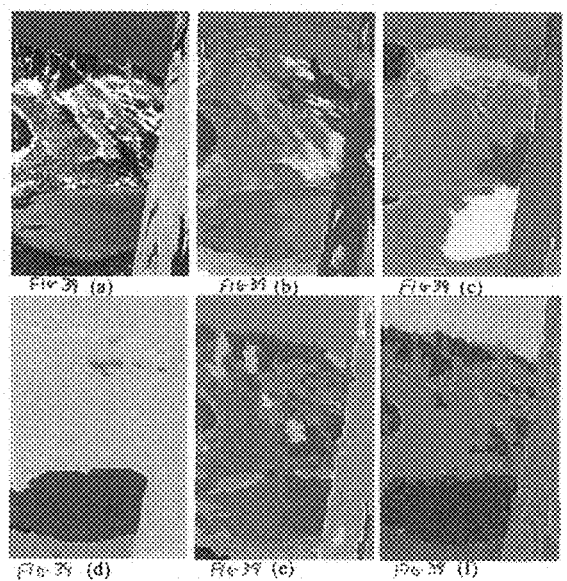
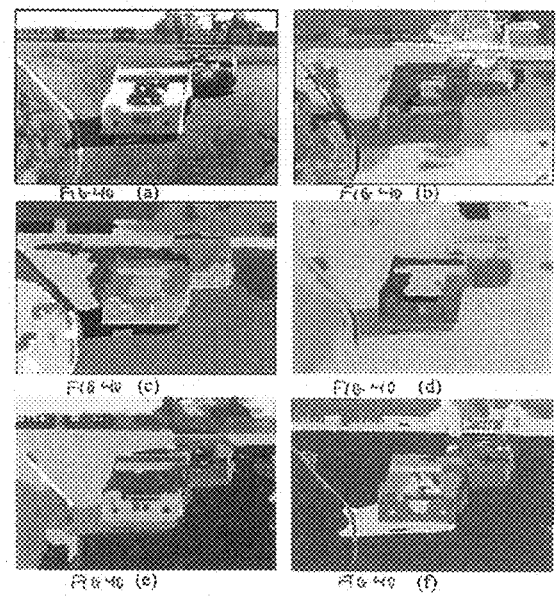

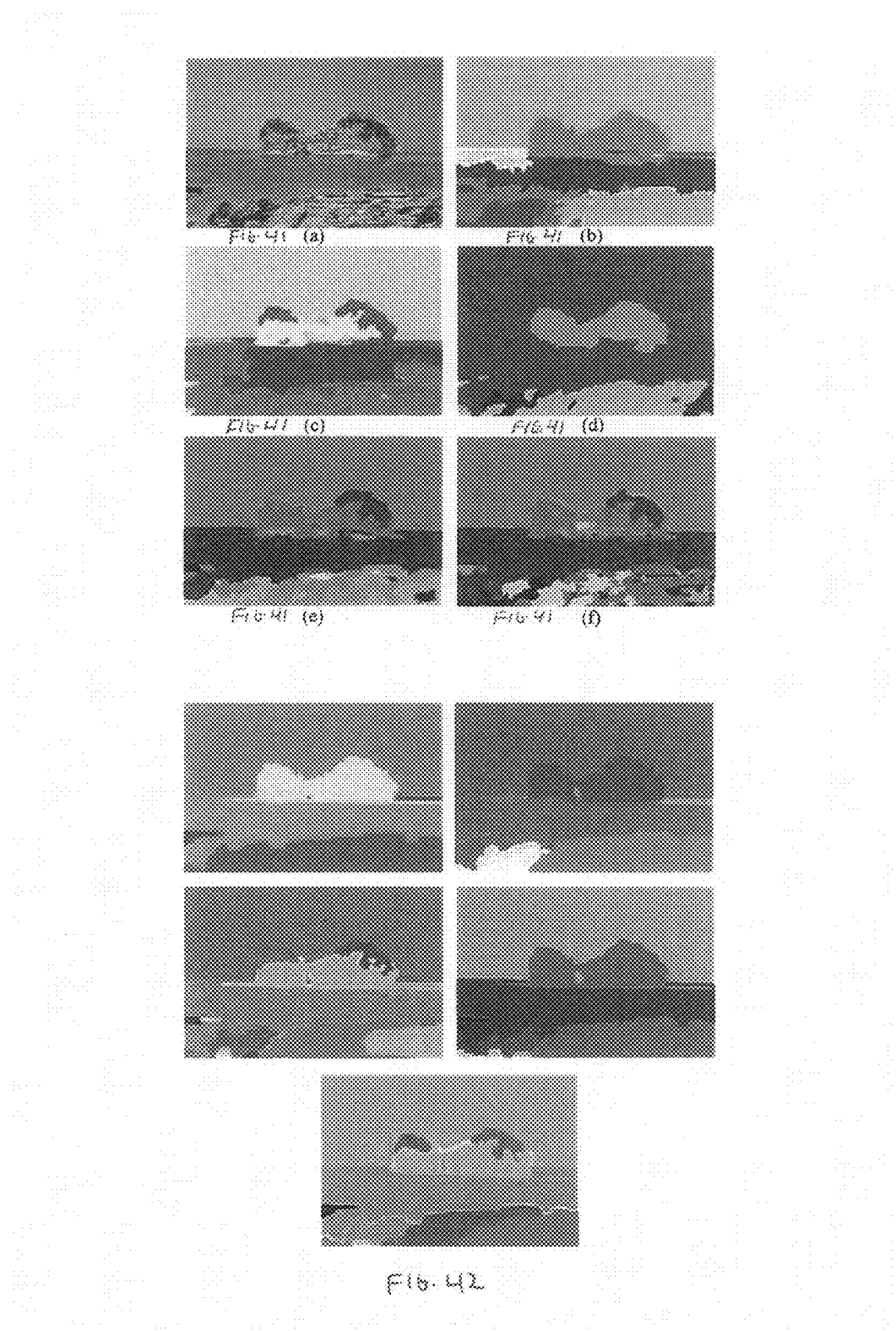

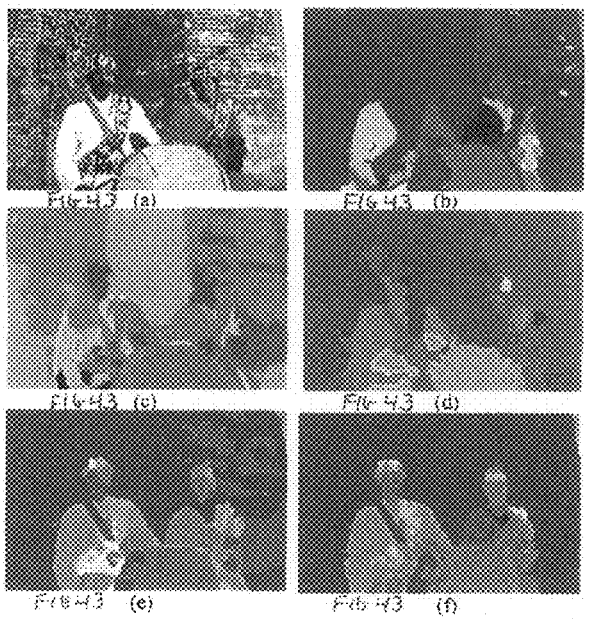
FIG. 43(a)  FIG. 43(b)
FIG. 43(c)  FIG. 43(d)
FIG. 43(e)  FIG. 43(f)
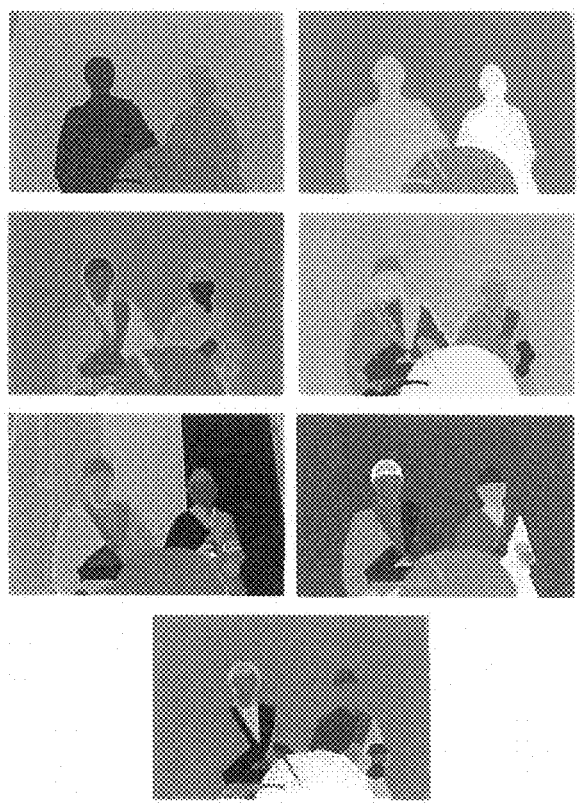
FIG. 44

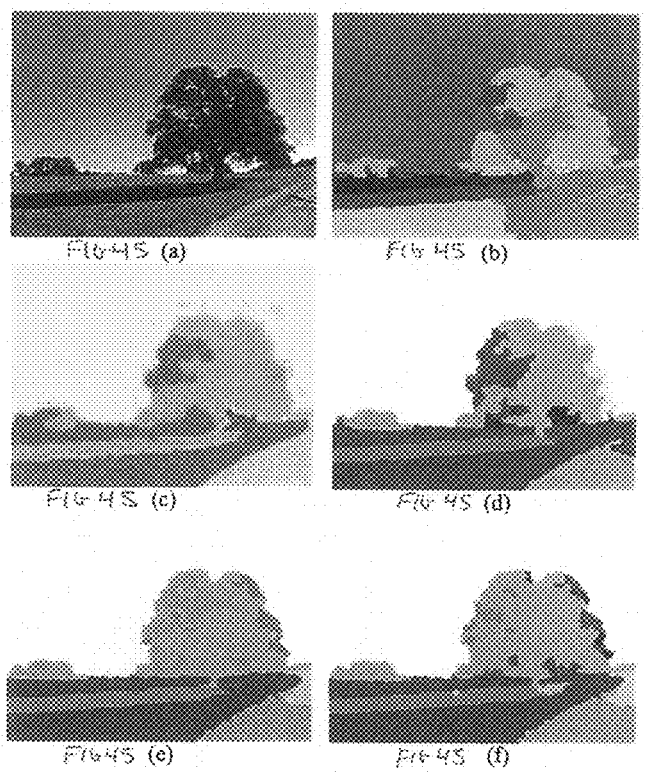
FIG. 45 (a)  FIG. 45 (b)
FIG. 45 (c)  FIG. 45 (d)
FIG. 45 (e)  FIG. 45 (f)
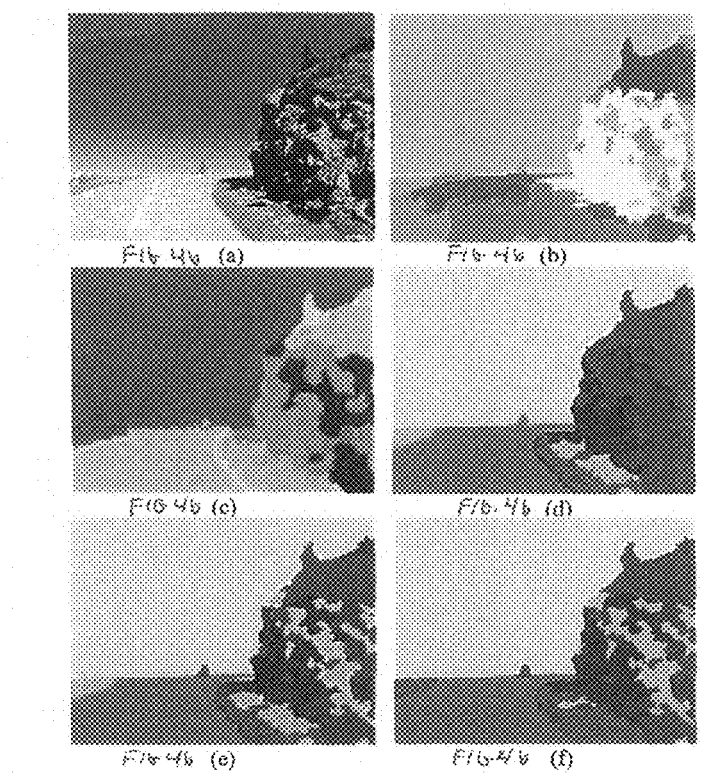
FIG. 46 (a)  FIG. 46 (b)
FIG. 46 (c)  FIG. 46 (d)
FIG. 46 (e)  FIG. 46 (f)

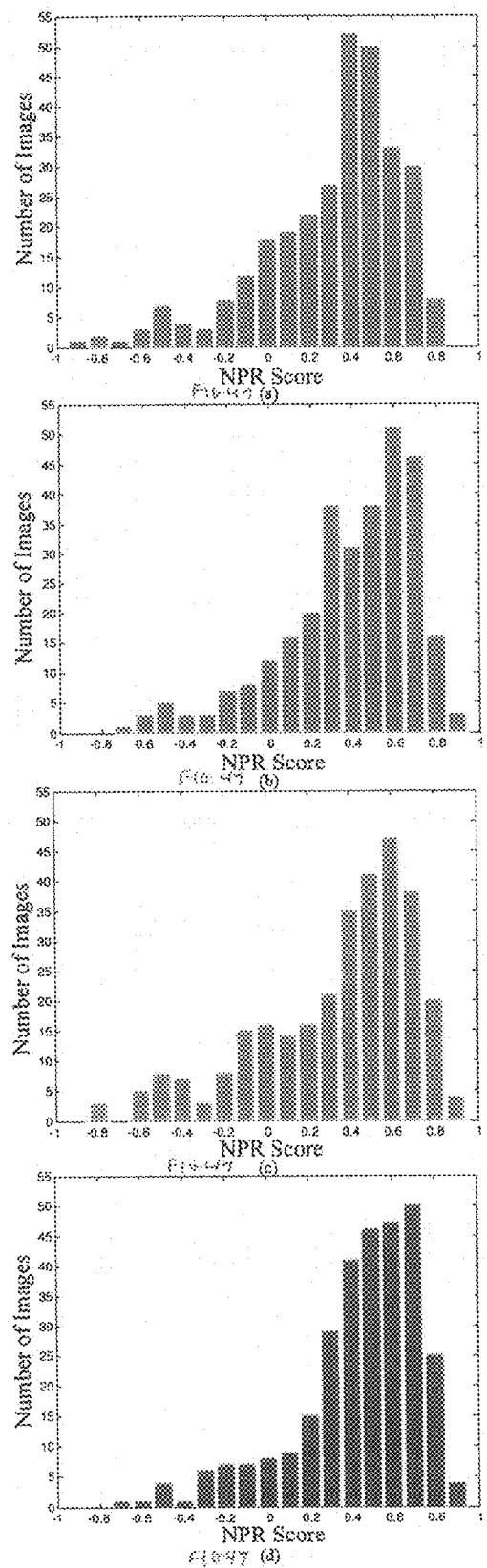

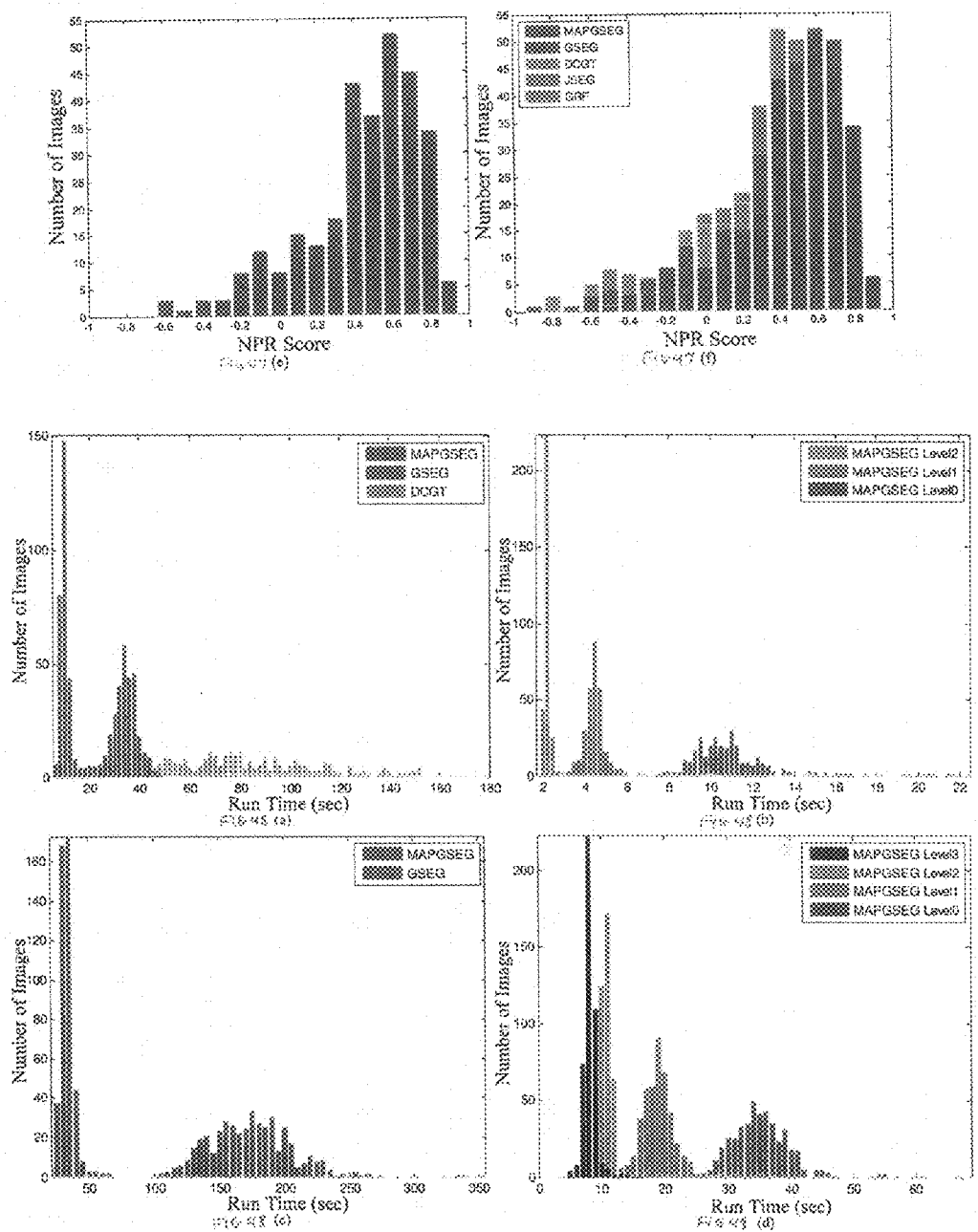

METHODS FOR ADAPTIVE AND PROGRESSIVE GRADIENT-BASED MULTI-RESOLUTION COLOR IMAGE SEGMENTATION AND SYSTEMS THEREOF

This application claims the benefit of U.S. Provisional Patent Application Ser. No. 61/204,787, filed Jan. 9, 2009, which is hereby incorporated by reference in its entirety.

FIELD

The present invention generally relates to methods and systems for image segmentation and, more particularly, to methods for adaptive and progressive gradient-based multi-resolution color image segmentation and systems thereof.

BACKGROUND

The interest in digital media has grown to new heights with rapid technological advancements being made in the capture and sharing of images, consequently necessitating the exploration of methods to enhance, classify and/or extract information from them. Image segmentation is one approach that provides the foundation to make these functionalities ever more effective and expeditious. Segmentation is defined as the meaningful partitioning of an image into distinct clusters that exhibit homogeneous characteristics. In doing so, it generates a reduced and relevant dataset for high level semantic operations such as rendering, indexing, classification, compression, content-based retrieval, and multimedia applications, to name a few. Though segmentation comes naturally to human observers, the development of a simulated environment to perform this imaging task has proven to be extremely challenging.

Many grayscale/color domain methodologies have been adopted in the past to tackle this ill-defined problem (see Lucchese et al., "Color Image Segmentation: A State of the Art Survey," *Proc. Indian National Science Acad.* 67(2):207-221 (2001); Cheng et al., "Color Image Segmentation: Advances & Prospects," *Pat. Rec.* 34(12):2259-2281 (2001), which are hereby incorporated by reference in their entirety, for comprehensive surveys). Initial multiscale research was aimed to overcome drawbacks being faced by Bayesian approaches for segmentation/classification, using Markov Random Fields (MRF's) and Gibbs Random Field's (GRF's) estimation techniques. Derin et al., "Modeling and Segmentation of Noisy and Textured Images Using Gibbs Random Fields," *IEEE Trans. on Pat. Anal. and Mach. Int* 9(1):39-55 (1987), which is hereby incorporated by reference in its entirety, proposed a method of segmenting images by comparing the Gibbs distribution results to a predefined set of textures using a Maximum a posteriori (MAP) criterion. Pappas et al. "An Adaptive Clustering Method For Image Segmentation," *IEEE Trans. on Sig. Process.* 40(4):901-914 (1992), which is hereby incorporated by reference in its entirety, generalized the k-means clustering method using adaptive and spatial constraints, and the Gibbs Random Field (GRF) model to achieve segmentation in the gray scale domain. Chang et al. "Adaptive Bayesian Segmentation of Color Images," *Jour. of Elec. Imag.* 3(4):404-414 (1994), which is hereby incorporated by reference in its entirety, extended this to color images by assuming conditional independence of each color channel. Improved segmentation and edge linking was achieved by Saber et al. "Fusion of Color and Edge Information For Improved Segmentation and Edge Linking," *Imag. and Vision Comp.* 15:769-780 (1997), which is hereby incorporated by reference in its entirety, who combined spatial edge information and the regions resulting from a GRF model of the segmentation field. Bouman et al. "Multiple Resolution Segmentation of Textured Images," *IEEE Trans. on Pat. Anal. and Mach. Int* 7(1):39-55 (1991), which is hereby incorporated by reference in its entirety, proposed an method for segmenting textured images comprising regions with varied statistical profiles using a causal Gaussian autoregressive model and a MRF representing the classification of each pixel at various scales. However most of the aforementioned methods suffered from the fact that the obtained estimates could not be calculated exactly and were computationally prohibitive. To overcome these problems, Bouman et al. "A Multiscale Random Field Model For Bayesian Image Segmentation" *IEEE Transactions on Image Processing* 3(2):1454-1466 (1994), which is hereby incorporated by reference in its entirety, extended his work by incorporating a multiscale random field model (MSRF) and a sequential MAP (SMAP) estimator. The MSRF model was used to capture the characteristics of image behavior at various scales. However, the work in Bouman et al., "Multiple Resolution Segmentation of Textured Images," *IEEE Trans. on Pat. Anal. and Mach. Int* 7(1):39-55 (1991); and Bouman et al., "A Multiscale Random Field Model For Bayesian Image Segmentation" *IEEE Transactions on Image Processing* 3(2):1454-1466 (1994), which are hereby incorporated by reference in their entirety, had either used single scale versions of the input image, or multiscale versions of the image with the underlying hypothesis that the random variables at a given level of the image data pyramid were independent from the ones at other levels.

Comer et al. "Multiresolution Image Segmentation," IEEE International Conference on Acoustics Speech and Signal Processing (1995), which is hereby incorporated by reference in its entirety, used a multiresolution Gaussian autoregressive model (MGAR) for a pyramid representation of the input image and "maximization of posterior marginals" (MPM) for pixel label estimates. He established correlations for these estimates at different levels using the interim segmentations corresponding to each level. He extended his work in Comer et al., "Segmentation of Textured Images Using a Multiresolution Gaussian Autoregressive Model," *IEEE Transactions on Image Processing* 8(3):1454-1466 (1999), which is hereby incorporated by reference in its entirety, by using a multiresolution MPM model for class estimates and a multiscale MRF to establish interlevel correlations into the class pyramid model. Liu et al. "Multiresolution Color Image Segmentation," *IEEE Transactions on Image Processing* 16(7):1454-1466 (1994), which is hereby incorporated by reference in its entirety, proposed a relaxation process that converged to a MAP estimate of the eventual segmentation of the input image using MRF's in a quadtree structure. An MRF model in combination with the discrete wavelet transform was proposed by Tab et al. "Scalable Multiresolution Color Image Segmentation," *Signal Processing* 86:1670-1687 (2006), which is hereby incorporated by reference in its entirety, for effective segmentations with spatial scalability, producing similar patterns at different resolutions. Cheng et al. in International Conference on Image Processing (1998), which is hereby incorporated by reference in its entirety, incorporated Hidden Markov Models (HMM's) for developing complex contextual structure, capturing textural information, and correlating among image features at different scales unlike previously mentioned MRF models. The method's usefulness was illustrated on the problem of document segmentation where intra scale contextual dependencies can be imperative. A similar principle was applied by Won et al. (Won et al., "Hidden Markov Multiresolution Texture Segmentation Using Complex Wavelets," in *International Conference on Telecommunications*, which is hereby incorporated by reference in its entirety), who combined HMM and Hidden Markov Tree (HMT) forming a hybrid HMM-HMT model to establish local and global correlations for efficient block-based segmentations.

Watershed and wavelet-driven segmentation methods has been of interest for many researchers. Vanhamel et al. "Multiscale Gradient Watersheds of Color Images," *IEEE Transactions on Image Processing* 12(6):1454-1466 (2003), which is hereby incorporated by reference in its entirety, proposed a scheme constituting a non-linear anisotropic scale space and vector value gradient watersheds in a hierarchical frame work for multiresolution analysis. In a similar framework Makrogiannis et al. "Watershed-Based Multiscale Segmentation Method For Color Images Using Automated Scale Selection," *J. Electronic Imaging* 14(3) (2005), which is hereby incorporated by reference in its entirety, proposed watershed based segmentations utilizing a fuzzy dissimilarity measure and connectivity graphs for region merging. Jung et al. "Combining Wavelets and Watersheds For Robust Multiscale Image Segmentation," *Image And Vision Computing* 25:24-33 (2007), which is hereby incorporated by reference in its entirety, combined orthogonal wavelet decomposition with the watershed transform for multiscale image segmentation.

Edge, contour and region structure are other features that have been adopted in various approaches for effective segmentations. Tabb et al. "Multiscale Image Segmentation by Integrated Edge and Region Detection," *IEEE Transactions on Image Processing* 6(5) (1997), which is hereby incorporated by reference in its entirety, instituted a multiscale approach where the concept of scale represented image structures at different resolutions rather than the image itself. The work involved performing a Gestalt analysis facilitating detection of edges and regions without any smoothing required at lower scales. On the other hand, Gui et al. "Multiscale Image Segmentation Using Active Contours," which is hereby incorporated by reference in its entirety, obtained multiscale representations of the image using weighted TV flow and used active contours for segmentation. The contours at one level were given as input to the next higher level to refine the segmentation outcome at that level. Munoz et al. "Unsupervised active Regions For Multiresolution Image Segmentation," *IEEE International Conference On Pattern Recognition* (2002), which is hereby incorporated by reference in its entirety, applied fusion of region and boundary information, where the later was used for initializing a set of active regions which in turn would compete for pixels in the image in manner that would eventually minimize a region-boundary based energy function. Sumengen et al. "Multi-Scale Edge Detection and Image Segmentation," (2005), which is hereby incorporated by reference in its entirety, showed through his work that multiscale approaches are very effective for edge detection and segmentation of natural images. Mean shift clustering followed by a minimum description length (MDL) criterion was used by Luo et al. "Unsupervised Multiscale Color Image Segmentation Based on MDL Principle," *IEEE Transactions on Image Processing* 15(9):1454-1466 (2006), which is hereby incorporated by reference in its entirety, for the same purpose.

Fusion of color and texture information is an eminent methodology in multiresolution image understanding/analysis research. Deng et al. "Unsupervised Segmentation of Color-Texture Regions in Images and Video," *IEEE Transactions on Pattern Analysis and Machine Intelligence* 23(8): 800-810 (2001), which is hereby incorporated by reference in its entirety, proposed a method prominently known as JSEG that performed color quantization and spatial segmentation in combination of a multiscale growth procedure for segmenting color-texture regions in images and video. Pappas et al. (Chen and Pappas, "Perceptually Tuned Multi-Scale Color Texture Segmentation," in *IEEE International Conference on Image Processing* (2004), which is hereby incorporated by reference in its entirety,) utilized spatially adaptive features pertaining to color and texture in a multiresolution structure to develop perceptually tuned segmentations, validated using photographic targets. Dominant color and homogenous texture features (HTF) integrated with an adaptive region merging technique were employed by Wan et al. "Multi-Scale Color Texture Image Segmentation With Adaptive Region Merging," *IEEE International Conference on Acoustics Speech and Signal Processing* (2007), which is hereby incorporated by reference in its entirety, to achieve multiscale color-texture segmentations.

The task of segmenting images in perceptually uniform color spaces is an ongoing area of research in image processing. Paschos et al. "Perceptually Uniform Color Spaces For Color Texture Analysis: An Empirical Evaluation," *IEEE Transactions on Image Processing* 10(6):932-937 (2001), which is hereby incorporated by reference in its entirety, proposed an evaluation methodology for analyzing the performance of various color spaces for color texture analysis methods such as segmentation and classification. The work showed that uniform/approximately uniform color spaces such as $L^*a^*b^*$, $L^*u^*v^*$ and HSV possess a performance advantage over RGB, a non uniform color space traditionally used for color representation. The use of these color spaces was found to be suited for the calculation of color difference using the Euclidean distance, employed in many segmentation methods. Yoon et al. "Color Image Segmentation Considering the Human Sensitivity For Color Pattern Variations," *SPIE Proceedings* 4572:269-278 (2001), which is hereby incorporated by reference in its entirety, utilized this principle to propose a Color Complexity Measure (CCM) for generalizing the K-means clustering method, in the CIE $L^*a^*b^*$ space. Chen et al. "Contrast-Based Color Image Segmentation," *IEEE Signal Processing Letters*, 11(7): 64 1-644 (2004), which is hereby incorporated by reference in its entirety, employed color difference in the CIE $L^*a^*b^*$ space to propose directional color contrast segmentations. Contrast generation as a function of the minimum and maximum value of the Euclidean distance in the CIE $L^*a^*b^*$ space, was seen in the work of Chang et al. "Color-Texture Segmentation of Medical Images Based on Local Contrast Information," *IEEE Symposium on Computational Intelligence in Bioinformatics and Computational Biology* pp. 488-493 (2007), which is hereby incorporated by reference in its entirety. This contrast map, subjected to noise removal and edge enhancement to generate an Improved Contrast Map (ICMap), was the proposed solution to the problem of over-segmentation in the JSEG method. More recently, Gao et al. "A Novel Multiresolution Color Image Segmentation Technique and its Application to Dermatoscopic Image Segmentation," in *IEEE International Conference on Image Processing* (2000), which is hereby incorporated by reference in its entirety, introduced a 'narrow-band' scheme for multiresolution processing of images by utilizing the MRF expectations-maximization principle in the $L^*u^*v^*$ space. This technique was found to be competent especially for segmenting dermatoscopic images. Lefevre et al. "Multiresolution Color Image Segmentation Applied to Background Extraction in Outdoor Images," IS&T European Conference on Color in Graphics, *Image and Vision*, Poitiers, France, pp. 363-367 (2002), which is hereby incorporated by reference in its entirety, performed multiresolution image segmentation in the HSV space, applied to the problem of background extraction in outdoor images.

Color gradient-based segmentation is a new contemporary methodology in the segmentation realm. Dynamic color gradient thresholding (DCGT) was first seen in the work by Balasubramanian et al. "Unsupervised Color Image Segmentation By Dynamic Color Gradient Thresholding" *Proceedings of SPIE/IS&T*: Electronic Imaging Symposium, San Jose, Calif. (2008), which is hereby incorporated by reference in its entirety. The DCGT technique was primarily used to guide the region growth procedure, laying emphasis on color homogenous and color transition regions without generating edges. However this method faced problems of over segmentation due to lack of a texture descriptor and proved to be computationally expensive. Garcia et al. "Automatic Color Image Segmentation By Dynamic Region Growth and Multimodal Merging of Color and Texture Information", *International Conference on Acoustics, Speech and Signal Processing*, Las Vegas, Nev., (2008), which is hereby incorporated by reference in its entirety, proposed a segmentation method that was an enhanced version of the DCGT technique (abbreviated here as Gradient Segmentation (GS) algorithm) by incorporating an entropic texture descriptor and a multiresolution merging procedure. The method brought significant improvement in the segmentation quality and computational costs, but was not fast enough to meet real time practical applications.

There remains a need for segmentation methods that efficiently facilitate: 1) selective access and manipulation of individual content in images based on desired level of detail, 2) handling sub sampled versions of the input images and decently robust to scalability, 3) a good compromise between quality and speed, laying the foundation for fast and intelligent object/region based real-world applications of color imagery.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 17(a) is an L*a*b* (81×121) image of a car;

FIG. 17(b) is an image of a corresponding color gradient of the 'Cars' image;

FIG. 17(c) is an image of initial clusters generated at $\lambda=5$, $50*MSS_L$ of the 'Cars' image;

FIG. 17(d) is a logical seed map of the 'Cars' image;

FIG. 17(e) is a logical seed map after dilation of the 'Cars' image;

FIG. 17(f) is a gradient map of the 'Cars' image with padded seeds;

FIG. 17(g) is an image of initial clusters at $\lambda+5$ (10), $25*MSS_L$ of the 'Cars' image;

FIG. 17(h) is an image of parent seeds of the 'Cars' image;

FIG. 18(a) is a logical parent seeds map of 'Cars' image;

FIG. 18(b) is an image of unassigned pixels of the 'Cars' image;

FIG. 18(c) is an image of large unassigned regions of the 'Cars' image;

FIG. 18(d) is a map of isolated and small contiguous pixel regions of the 'Cars' image;

FIG. 18(e) is the map shown in FIG. 18(d) after dilation;

FIG. 18(f) is an image of isolated and small seed borders of the 'Cars' image;

FIG. 18(g) is an image of neighborhood labels of the 'Cars' image;

FIG. 18(h) an image of label assignment of the 'Cars' image;

FIG. 18(i) is an image of seed saturation of the 'Cars' image;

FIG. 19 is a gradient histogram of an image of a bird with adaptive thresholds;

FIG. 20(a) is a map of parent seeds after seed saturation;

FIG. 20(b) is an image of new seeds after threshold increment;

FIG. 20(c) is an image of parent seed borders;

FIG. 20(d) is a map of adjacent child seeds;

FIG. 20(e) is a seed map after one interval of the region growth procedure;

FIG. 20(f) is an image of seeds obtained during the first stage dynamic seed addition procedure;

FIG. 20(g) is an image of parent Seeds for the next region growth interval;

FIG. 21(a) is an L*a*b* (161×241) image of a car;

FIG. 21(b) is an image of a corresponding color gradient of the 'Cars' image;

FIG. 21(c) is an image of interim segmentation of an (81×121) 'Cars' image;

FIG. 21(d) is an image of high confidence seeds of an (161×241) 'Cars' image;

FIG. 21(e) is a gradient map of the 'Cars' image with padded high confidence seeds;

FIG. 22 (a) is an entire gradient histogram comparison of the 'Cars' image versus unsegmented pixels at the current dyadic scale of a (161×241) 'Cars' image;

FIG. 22(b) is a first zoomed view of the gradient histogram shown in FIG. 22(a);

FIG. 22(c) is a second zoomed view of the gradient histogram shown in FIG. 22(a);

FIG. 23(a) is a graph classifying threshold intervals for distributed dynamic seed addition;

FIG. 23(b) is a graph illustrating a zero crossing curve between red and green curves shown in FIG. 23(a);

FIG. 24(a) is an image of agglomeration of seeds obtained at decision boundary 1 (gradient value 22) of an image of a car;

FIG. 24(b) is an overall seed map after an initial phase of seed addition;

FIG. 24(c) is an image of an agglomeration of obtained seeds;

FIG. 24(d) is an overall seed map prior to region growth;

FIG. 25(a) is an L*a*b* (321×481) image of a car;

FIG. 25(b) is an image of a corresponding color gradient of the 'Cars' image;

FIG. 25(c) is an image of interim segmentation of an (161×241) 'Cars' image;

FIG. 25(d) is an image of high confidence seeds of an (161×241) 'Cars' image;

FIG. 25(e) is a gradient map of the 'Cars' image with padded high confidence seeds;

FIG. 25(f) is an image of an agglomeration of seeds obtained at various thresholds lower than the decision gradient value;

FIG. 25(g) is a seed map after the pre-growth seed addition process;

FIG. 26 is a gradient histogram comparison of the 'Cars' image versus unsegmented pixels at the current dyadic scale (321×481);

FIG. 27(a) is an MAPGSEG region growth map at Level 1;

FIG. 27(b) is an MAPGSEG region growth map at Level 0;

FIG. 27(c) is an image of neighborhood label assignment at Level 1;

FIG. 27(d) is an image of neighborhood label assignment at Level 0;

FIG. 27(e) is an image of iterative morphological label assignment at Level 1;

FIG. 27(f) is an image of iterative morphological label assignment at Level 0;

FIG. 27(g) is an image of the region growth map using the GS method before residual pixel label assignment;

FIG. 27(h) is an image of the region growth map using the GS method after residual pixel label assignment;

FIG. 32(a) is a color map of high confidence pixel locations of an image of a car;

FIG. 32(b) is an image of mutual seed border regions of high confidence pixel locations of the 'Cars' image;

FIG. 32(c) is a color map of high confidence pixel locations of the 'Cars' image after mutual seed border regions removal;

FIG. 32(d) is an image of large confident regions of the 'Cars' image;

FIG. 32(e) is an image of large confident regions seed borders of the 'Cars' image;

FIG. 32(f) is an image of mutual seed border region labels of the 'Cars' image;

FIG. 32(g) is an image of high confidence mutual seed border regions of the 'Cars' image;

FIG. 32(h) is an image of a-priori information after border refinement of the 'Cars' image;

FIG. 33 is a Euclidean space representation of L*a*b*;

FIG. 34(a) is a multiresolution representation of a color converted 'Star fish' image;

FIG. 34(b) is a multiresolution representation of a color gradient of the 'Star fish' image;

FIG. 34(c) is a multiresolution representation of seeds maps at the end of progressive region growth of the 'Star fish' image;

FIG. 34(d) is a multiresolution representation of entropy based texture maps of the 'Star fish' image;

FIG. 34(e) is a multiresolution representation of interim and final segmentation outputs of the 'Star fish' image;

FIG. 35(a) is an image of interim segmentation of the 'Star fish' image at Level 2;

FIG. 35(b) is an image of interim segmentation of the 'Star fish' image unconverted to Level 1;

FIG. 35(c) is an image of a-priori information of the 'Star fish' image at Level 1;

FIG. 35(d) is an image of interim segmentation of the 'Star fish' image at Level 1;

FIG. 35(e) is an image of interim segmentation of the 'Star fish' image unconverted to Level 0;

FIG. 35(f) is an image of a-priori information of the 'Star fish' image at Level 0;

FIG. 35(g) is an image of MAPGSEG final segmentation output of the 'Star fish' image;

FIG. 36(a) is an original image of a 'Church';

FIG. 36(b) is an image of Gibbs Random Field 'Church' results;

FIG. 36(c) is an image of JSEG 'Church' results;

FIG. 36(d) is an image of DCGT 'Church' results;

FIG. 36(e) is an image of GS 'Church' results;

FIG. 36(f) is an image of MAPGSEG 'Church' results;

FIG. 37(a) is an original image of a 'Parachute';

FIG. 37(b) is an image of GRF 'Parachute' results;

FIG. 37(c) is an image of JSEG 'Parachute' results;

FIG. 37(d) is an image of DCGT 'Parachute' results;

FIG. 37(e) is an image of GS 'Parachute' results;

FIG. 37(f) is an image of MAPGSEG 'Parachute' results;

FIG. 38(a) is an original image of a 'Cheetah';

FIG. 38(b) is an image of GRF 'Cheetah' results;

Figure 1:
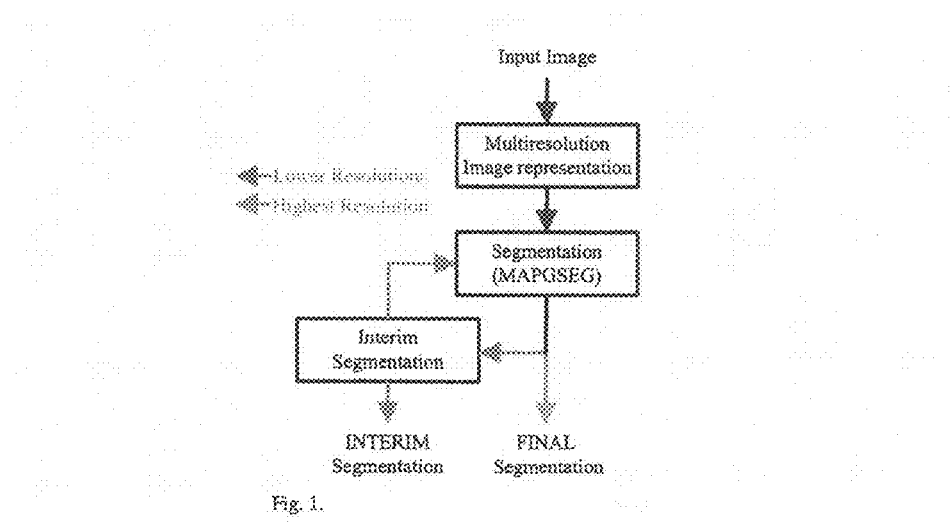
FIG. 1 is a flow chart of an overview of a method for multi-resolution and progressive gradient segmentation in accordance with embodiments of the present invention.

FIG. 38(c) is an image of JSEG 'Cheetah' results;
FIG. 38(d) is an image of DCGT 'Cheetah' results;
FIG. 38(e) is an image of GS 'Cheetah' results;
FIG. 38(f) is an image of MAPGSEG 'Cheetah' results;
FIG. 39(a) is an original image of 'Nature';
FIG. 39(b) is an image of GRF 'Nature' results;
FIG. 39(c) is an image of JSEG 'Nature' results;
FIG. 39(d) is an image of DCGT 'Nature' results;
FIG. 39(e) is an image of GS 'Nature' results;
FIG. 39(f) is an image of MAPGSEG 'Nature' results;
FIG. 40(a) is an original image of 'Cars';
FIG. 40(b) is an image of GRF 'Cars' results;
FIG. 40(c) is an image of JSEG 'Cars' results;
FIG. 40(d) is an image of DCGT 'Cars' results;
FIG. 40(e) is an image of GS 'Cars' results;
FIG. 40(f) is an image of MAPGSEG 'Cars' results;
FIG. 41(a) is an original image of an 'Island';
FIG. 41(b) is an image of DCGT 'Island' results;
FIG. 41(c) is an image of GS 'Island' results;
FIG. 41(d) is an image of Level 2 MAPGSEG 'Island' results;
FIG. 41(e) is an image of Level 1 MAPGSEG 'Island' results;
FIG. 41(f) is an image of Level 0 MAPGSEG 'Island' results;
FIG. 42 is an image of human segmentation for the 'Island' image;
FIG. 43(a) is an original image of 'Asians';
FIG. 43(b) is an image of DCGT of 'Asians' results;
FIG. 43(c) is an image of GS of 'Asians' results;
FIG. 43(d) is an image of Level 2 MAPGSEG 'Asians' results;
FIG. 43(e) is an image of Level 1 MAPGSEG 'Asians' results;
FIG. 43(f) is an image of Level 0 MAPGSEG 'Asians' results;
FIG. 44 is an image of human segmentation for the 'Asians' image;
FIG. 45(a) is an original image of a 'Tree';
FIG. 45(b) is an image of GS 'Tree' results;
FIG. 45(c) is an image of Level 3 'ree' results;
FIG. 45(d) is an image of Level 2 'Tree' results;
FIG. 45(e) is an image of Level 1 'Tree' results;
FIG. 45(f) is an image of Level 0 'Tree' results;
FIG. 46(a) is an original image of a 'Road';
FIG. 46(b) is an image of CSEG 'Road' results;
FIG. 46(c) is an image of Level 3 'Road' results;
FIG. 46(d) is an image of Level 2 'Road' results;
FIG. 46(e) is an image of Level 1 'Road' results;
FIG. 46(f) is an image of Level 0 'Road' results;
FIG. 47(a) is a graph of a distribution of NPR scores for 300 images of the Berkeley database from the GRF method;
FIG. 47(b) is a graph of a distribution of NPR scores for 300 images of the Berkeley database from the JSEG method;
FIG. 47(c) is a graph of a distribution of NPR scores for 300 images of the Berkeley database from the DCGT method;
FIG. 47(d) is a graph of a distribution of NPR scores for 300 images of the Berkeley database from the GS method;
FIG. 47(e) is a graph of a distribution of NPR scores for 300 images of the Berkeley database from the MAPSEG method;
FIG. 47(f) is a graph of all method distributions superimposed;
FIG. 48(a) is a graph of a computational time comparison utilizing the Berkeley database (321×421) from the MAPGSEG, GS and DCGT method;
FIG. 48(b) is a graph of a computational time comparison utilizing the Berkeley database (321×421) from various levels of MAPGSEG method;
FIG. 48(c) is a graph of a computational time comparison utilizing a large resolution image database (750×11200) from MAPGSEG and GS method; and
FIG. 48(d) is a graph of a computational time comparison utilizing a large resolution image database (750×11200) from various levels of the MAPGSEG method.

DETAILED DESCRIPTION

An image processing computing device used for adaptive and progressive gradient-based multi-resolution color image segmentation includes a central processing unit (CPU) or processor, a memory, a user input device, a display, and an interface system, and which are coupled together by a bus or other link, although the computing system can include other numbers and types of components, parts, devices, systems, and elements in other configurations and other types and numbers of systems which perform other types and numbers of functions can be used.

The processor in the image processing computing device executes a program of stored instructions for one or more aspects of the present invention as described and illustrated herein, although the processor could execute other numbers and types of programmed instructions. The memory in the image processing computing device stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory.

The user input device in the image processing computing device is used to input information, such as image data, although the user input device could be used to input other types of data and interact with other elements. The user input device can include a computer keyboard and a computer mouse, although other types and numbers of user input devices can be used. The display in the image processing computing device is used to show images by way of example only, although the display can show other types of information The display can include a computer display screen, such as a CRT or LCD screen, although other types and numbers of displays could be used.

The interface system in the image processing computing device is used to operatively couple and communicate between the computing system with other types of systems and devices, such as a server system over a communication network, although other types and numbers of communication networks or systems with other types and numbers of connections and configurations to other types and numbers of systems, devices, and components can be used. By way of example only, the communication network can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

Although an embodiment of the image processing computing device is described and illustrated herein, the image processing computing device can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, the system of the embodiments described herein may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for the system in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

A fast unsupervised multiresolution color image segmentation algorithm which takes advantage of gradient information in an adaptive and progressive framework in accordance with disclosed embodiments is described below. This gradient-based segmentation method is initiated with a dyadic wavelet decomposition scheme of an arbitrary input image, accompanied by a vector gradient calculation of its color converted counterpart. The resultant gradient map is used to automatically and adaptively generate thresholds for segregating regions of varying gradient densities, at different resolution levels of the input image pyramid. At each level, the classification obtained by a progressively thresholded growth procedure is integrated with an entropy-based texture model utilizing a unique region merging procedure to obtain an interim segmentation. In combination with a confidence map and non-linear spatial filtering techniques, regions of high confidence are passed from one resolution level to another until the final segmentation at highest (original) resolution is achieved. Performance evaluation of results obtained in accordance with embodiments of the present invention on several hundred images utilizing the Normalized Probabilistic Rand index demonstrates that the present invention computationally outperforms published segmentation techniques while obtaining superior quality.

An example of an unsupervised Multiresolution Adaptive and Progressive Gradient-based color image SEGmentation (MAPGSEG) method in accordance with the present invention is described herein, facilitating: 1) selective access and manipulation of individual content in images based on desired level of detail, 2) treatment of sub sampled versions of images with robustness to scalability, 3) a potential solution that computationally measures up to meet the demands of most practical applications involving segmentation, and 4) a practical compromise between quality and speed, laying the foundation for fast and intelligent object/region based real-world applications of color imagery.

An overview of a method for and progressive gradient-based multi-resolution color image segmentation in accordance with embodiments of the present invention is illustrated in FIG. 1. The method begins with a vector gradient computation (Lee et al., "Detecting Boundaries in a Vector Field," *IEEE Transactions on Signal Processing* 39(5):1181-1194 (1991), which is hereby incorporated by reference in its entirety) in CIE L*a*b* color space on the input image at full resolution, followed by a wavelet decomposition to obtain a pyramid representation of it. Starting at the smallest resolution, the functionality of color space conversion and gradient computation includes, but is not limited to, automatically and adaptively generating thresholds required for initial clustering, as well as carrying out a computationally efficient region growth procedure. The resultant classification is combined with an entropy-based texture model and statistical procedure to obtain an interim segmentation representing a certain degree of detail, in comparison to the original input. The up scaled version of this interim result is utilized as a-priori knowledge for segmenting the next higher resolution, wherein regions of high confidence are determined subsequently passed on to a fresh run of the method for facilitating the processing of the remaining unsegmented areas of the image, with minimal computational costs. The aforementioned protocol progresses from one resolution level to another until the segmentation at highest (original) resolution is achieved. Thus the proposed technique is essentially based on the principle that the segmentation results of low-resolution images can be utilized to efficiently segment their corresponding high resolution counterparts. In this particular example, this method is entirely implemented in MATLAB and tested on a large database of ~745 images, although the method could be implemented in other manners. Its performance was benchmarked against popular segmentation techniques utilizing the NPR index on the same test bed of images in the Berkeley database. The evaluation results show that the MAPGSEG method computationally outperforms published techniques while exhibiting superior segmentation quality.

Image segmentation has wide spread medical, military and commercial interests. One particular embodiment of the method is designed from a commercial standpoint with an emphasis on performance. Several applications that can take advantage of the capabilities of this method are illustrated for exemplary purposes.

Image Rendering

Rendering is often utilized in cameras and printers to acquire images with superior visual or print quality. This application is a tool that comes closest to transmuting reality to a photograph or printer output. A typical region/object oriented rendering method, designed for better print quality is shown in FIG. 2.

Figure 2:
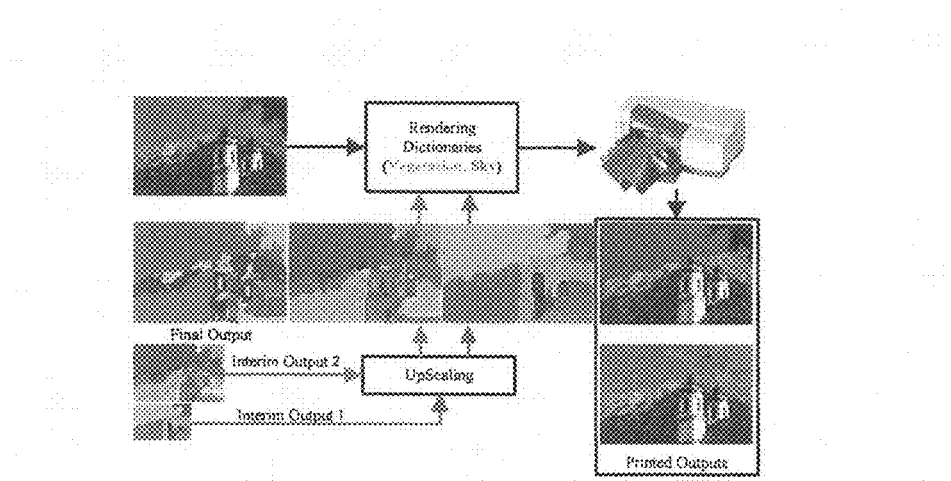
FIG. 2 is a diagram of image rendering using the method for multi-resolution and progressive gradient segmentation.

The rendering procedure illustrated in FIG. 2 is commenced by segmenting the input image using the MAPGSEG method. As can be seen, the output of the MAPGSEG includes multiple interim results and a final segmentation. Interim output 1 obtained at the lowest resolution, represents a coarse segmentation where only the low gradient regions such as the sky and mountain are well represented. Interim output 2 is the segmentation result at the next higher resolution where more detail associated with vegetation and man-made structures is seen. The final result shows fine detail with well defined edges for all regions. This hierarchy of detail and corresponding computational performance can be utilized for efficient and intelligent rendering. Thus if the rendering objective is just limited to the low gradient regions then customized rendering intents can be applied to these regions extracted from the up scaled coarse segmentation, to achieve better print quality. The advantage is that the coarse result achieved is much faster than its higher resolution counterparts. Furthermore, the up scaling operation is performed to acquire a coarse segmentation at the same resolution of the input image. As the scope of the rendering intentions are increased, higher resolution segmentations can be utilized. This multiscale segmentation-integrated rendering approach is much more flexible and computationally inexpensive than utilizing an approach that operates only on a single scale.

Content Based Image Retrieval (CBIR)

Content based image retrieval also known as Query By Image Content (QBIC) is defined as the process of sifting through large archives of digital images based on color, texture, orientation features, and other image content such as objects and shapes.

Figure 3:
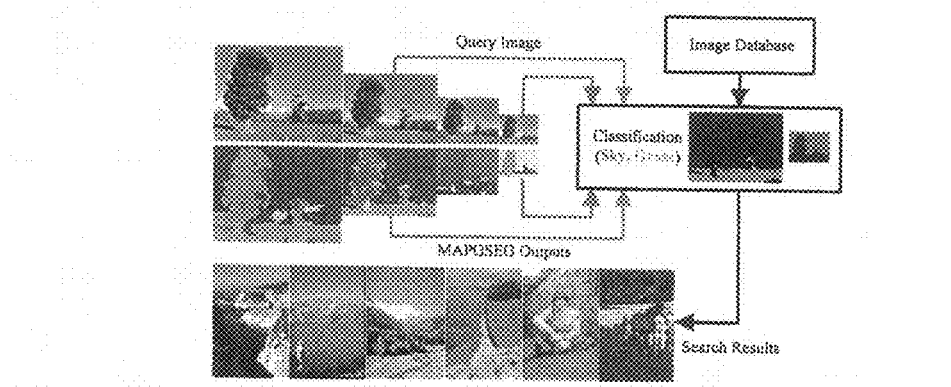
FIG. 3 is a diagram of content based image retrieval using the method for multi-resolution and progressive gradient segmentation.

FIG. 3 illustrates the advantage of incorporating the MAPGSEG method for region-based image retrieval. Here again, if the objective of the retrieval procedure is to acquire images with low gradient regions such as sky then a low resolution version of the input query image would suffice. The query image at an arbitrary low resolution and its corresponding segmentation can be given as inputs to a region classification method which identifies sky without much hindrance, owed to its low gradient content. Moreover, the aforementioned inputs along with the classification output can be used for an effective retrieval procedure. The computational costs are significantly reduced because all operations are performed at a lower resolution of the query image. Regions of higher gradient densities (such as grass in FIG. 3) can be similarly used for retrieval at bigger resolutions.

Technical concepts for the optimal implementation and understanding of embodiments of the method of the present invention are described herein. Firstly, a mathematical insight into the Wavelet Transform is provided, the foundation on which the wavelet theory has been established. Secondly, a brief discussion involving the extension of the wavelet transform for pyramidal image representations and its practical implementation using filter banks is provided, which is important from a multiresolution analysis standpoint. Thirdly, a brief description of the CIE L*a*b* color space and its characteristics that helped develop this method is given. Fourthly, a brief description of the Multivariate ANalysis Of Variance (MANOVA) data analysis statistical procedure has been provided. Finally, a segmentation evaluation metric known as the Normalized Probabilistic Rand Index, utilized to determine the performance of the present invention from a qualitative standpoint, has been discussed.

Wavelet Transform

Wavelets are powerful tools capable of dividing data into various frequency bands describing, in general, the horizontal, vertical, and diagonal spatial frequency characteristics of the data. A detailed mathematical analysis of initial multiresolution image representation models and its relation to the Wavelet Transform (WT) can be seen in the work of Mallat et al. "A Theory for Multiresolution Signal Decomposition: The Wavelet Representation," *IEEE Transactions on Pattern Analysis and Machine Intelligence* 11(7):674-693 (1989), which is hereby incorporated by reference in its entirety. Let $L^2$ (R) denote the Hilbert space of square integrable 1-D functions f(x). The dilation of this function by a scaling component s can be represented as:

$$f_s(x) = \sqrt{s} f(sx) \quad (1).$$

The WT can be defined by decomposing a signal into a class of functions obtained by the translation and dilation of a function $\psi(x)$. Here, $\psi(x)$ is called a wavelet and the class of functions is defined, using (1), by $(\sqrt{s}\psi(s(x-u)))_{(s,u) \in R^2}$. To this effect, the WT is defined as:

$$Wf(s, u) = \int_{-\infty}^{+\infty} f(x) \sqrt{s}\, \psi(s(x-u)) dx. \quad (2)$$

An inner product representation of Eq. (2) can be written as:

$$Wf(s,u) = \langle f(x), \psi_s(x-u) \rangle \quad (3).$$

To enable the reconstruction of f(x) from Wf(s, u) the Fourier transform of $\hat{\psi}(x)$ must comply with:

$$C_\psi = \int_{-\infty}^{+\infty} \frac{|\hat{\psi}(\omega)|^2}{\omega} d\omega < +\infty. \quad (4)$$

Eq. (4) signifies that $\hat{\psi}(0)=0$, and $\hat{\psi}(x)$ is small in the vicinity of $\omega=0$. Therefore, $\psi(x)$ can be construed as the impulse response of a Band Pass Filter (BPF). WT can be now written as a convolution product given as:

$$Wf(s,u) = f * \tilde{\psi}_s(u) \quad (5)$$

where $\tilde{\psi}_s$, $\psi_s(x)-(x)$. Thus, a WT can be interpreted as a filtering of f(x) with a BPF whose impulse response is $\tilde{\psi}_s(x)$. Furthermore from the aforementioned discussion it can be seen that the resolution of a WT varies with scale parameter s.

Sampling s, u and selecting a sequence of scales $(a^j)_{j \in Z}$, can be utilized to discretize the WT. Thus Eq. (5) can be rewritten as $$Wf(a^j, u) = f * \tilde{\psi}_{a^j}(u) \quad (6).$$

For the characterization of the decomposed signal in each channel, a uniform sampling rate proportional to $a^j$ must be used. Let the uniform sampling rate be $a^j/\beta$ at a scale $a^j$. The Discrete Wavelet Transform (DWT) can be defined as:

$$W_d f(j, n) = Wf(a^j, n\beta a^{-j}) = \int_{-\infty}^{+\infty} f(x) \psi_{a^j}(x - n\beta a^{-j}) dx \quad (7)$$
$$= f * \psi_{a^j}(n\beta a^{-j}).$$

Multiresolution Image Decomposition

A signal f (x) at resolution r can be acquired by filtering f (x) with a Low Pass Filter (LPF) whose bandwidth is proportional to the desired uniform sampling rate r, of the filtered result (S. G. Mallat, "A Theory for Multiresolution Signal Decomposition The Wavelet Representation," *IEEE Transactions on Pattern Analysis and Machine Intelligence* 11(7): 674-693 (1989), which is hereby incorporated by reference in its entirety). To negate the possibility of inconsistency with resolution variation these LPF's are obtained from a function $\theta(x)$ dilated by the resolution parameter r and can be represented in form identical to that of Eq. (1), given below:

$$\theta_r = \sqrt{r} \theta(rx) \quad (8).$$

Likewise to Eq. (7) the discrete approximation of a function f (x) on a dyadic array of resolutions $(2^j)_{j \in Z}$ can be represented as:

$$A_{2^j}f = (f * \bar{\theta}_{2^j}(2^{-j}n))_{n \in Z} \quad (9).$$

Eq. (9) represents an important category of the DWT known as orthogonal wavelets. Consequently, a wavelet orthonormal basis corresponds to the DWT for $\alpha=2$ and $\beta=1$. Although orthonormal basis can be constructed for scale sequences other than $(2^j)_{j \in Z}$, in general dyadic scales are used because they result in simple decomposition methods. For pyramidal multiresolution image representations, $\theta(x)$ is chosen with a Fourier transform defined by:

$$\hat{\theta}(\omega) = \prod_{p=1}^{+\infty} U(e^{-2^{-p}\omega}). \quad (10)$$

Where $U(e^{-i\omega})$ represents the transfer function of a discrete filter $U=(u_n)_{n \in Z}$. Subsequently, the approximation of a function f(x) at a scale $(2^j)_{j \in Z}$ is obtained by filtering $A_{2^{j+1}}f_{n \in Z}$ with U and restoring every alternate sample in the resultant convolution, written as:

$$\Lambda = A_{2^{j+1}}f * U = (\lambda_n)_{n \in Z} \quad (11)$$

$$A_{2^j}f = (\lambda_{2n})_{n \in Z} \quad (12)$$

where $A_{2^{j+1}}f = (f * \theta_{2^{j+1}}(n2^{-(j+1)}))_{n \in Z}$. Eq. (11) and (12) can be utilized iteratively to find the approximation of the signal f(x) at any dyadic resolution $(2^{-J}, J>0$ where $0 \geq j \geq -J)$. Furthermore apart from an estimate, the details of a signal at a particular resolution can be also obtained. From Eq. (11) and (12) it can be seen that $A_{2^{j+1}}f$ has double the number of samples in $A_{2^j}f$. Thus the details $D_{2^j}f$ at a resolution $2^j$ is given by:

$$D_{2^j}f = A_{2^{j+1}}f - A_{2^j}^e f \quad (13)$$

where $A_{2^j}^e f$ is the expanded version of $A_{2^j}f$ acquired by inserting a zero between each of its samples followed by filtering the resultant signal with an LPF.

Altogether, the previously mentioned discussion can be utilized to develop a multiresolution wavelet model. Earlier, Eq. (9) represented the estimate of f(x) at a scale of $2^j$, utilizing Eq. (3) and (5) this estimate can be re-written as:

$$A_{2^j}f = (\langle f(x), \bar{\theta}_{2^j}(x - 2^{-j}n) \rangle)_{e \in Z} \quad (14).$$

In addition, the best estimate of f(x) at a resolution $2^j$ can be derived to be the orthogonal projection of the signal on the array of all possible estimates designated by a vector space $V_{2^j}$, a proposition of the projection theorem. The array $(V_{2^j})_{j \in Z}$ is known as the multiresolution approximation of $L^2(R)$, requires an orthonormal basis for its computation. An orthonormal basis can be acquired by dilating and translating a scaling function $\phi(x)$, denoted at any $2^j$ resolution (from Eq. (1) or (8)) as $\phi_{2^j}(x) = \sqrt{2^j}\phi(2^j x)$. Thus from the initial definition of the WT the class of functions $(\phi_{2^j}(x - 2^{-j}n))_{n \in Z}$ can be called the orthonormal basis of the vector space $V_{2^j}$. From Eq. (10) we have:

$$\hat{\phi}(\omega) = \prod_{p=1}^{+\infty} H(e^{-i2^{-p}\omega}). \quad (15)$$

Here $H(e^{-i\omega})$ is the transfer function of a discrete filter. Furthermore if:

$$|H(e^{-i\omega})|^2 + |H-(e^{-i\omega})|^2 = 1 \quad (16)$$

then the discrete filters represented by $H=(h_n)_{n \in Z}$ are called as quadrature mirror filters. In addition, the orthogonal projection of f(x) on $V_{2^j}$ is given by:

$$p_{V_{2^j}}(f)(x) = \sum_{n \in Z} \langle f(u), \phi_{2^j}(u - 2^{-j}n) \rangle \phi_{2^j}(x - 2^{-j}n) \quad (17)$$

represents the best estimate of f(x). Now $A_{2^j}f$ is expressed in terms of $\hat{\phi}(x)$ instead of $\theta(x)$ being an LPF. Thus Eq. (9) becomes:

$$A_{2^j}f = (f * \bar{\phi}_{2^j}(2^{-j}n))_{n \in Z} = (\langle f(x), \phi_{2^j}(x - 2^{-j}n) \rangle)_{n \in Z}. \quad (18)$$

Utilizing Eq. (15), (18) in conjunction with Eq. (11) and (12) the discrete approximations $A_{2^j}f$ of a signal f (x) at a resolution $2^j$ can be obtained. In addition, the approximation of a signal at a resolution $2^{j+1}$ in $V_{2^{j+1}}$ can be considered to be better than its counterpart at a resolution $2^j$ in $V_{2^j}$. The difference in detail between the two resolutions is given by the orthogonal projection of f(x) on the orthogonal complement of $V_{2^{j+1}}$ in $V_{2^j}$, denoted as $O_{2^j}$. Hence, $O_{2^j}$ orthogonal to $V_{2^j}$ is given by:

$$O_{2^j} \Gamma C_{n^j} = V_{2^{j+1}} \quad (19).$$

The orthogonal projection of f(x) onto $O_{2^j}$ can be obtained in a manner similar to orthogonal projection of f(x) onto $V_{2^j}$. However, if $\psi_{2^j}(x) = \sqrt{2^j}\psi(2^j x)$ is denoted to be the scaling function and $(\psi_{2^j}(x - 2^{-j}n))_{n \in Z}$ to be the orthonormal basis in this case, the Fourier transform of $\psi(x)$ is given by:

$$\hat{\psi}(2\omega) = G(e^{-i\omega})\hat{\phi}(\omega) \text{ and } G(e^{i\omega}) = e^{-i\omega}\overline{H(e^{-i\omega})} \quad (20)$$

where $G(e^{-i\omega})$ is the transfer function of a discrete filter $G=(g_n)_{n \in Z}$. From Eq. (17) and (18) we have:

$$P_{O_{2^j}}(f)(x) = \sum_{n \in Z} \langle f(u), \psi_{2^j}(u - 2^{-j}n) \rangle \psi_{2^j}(x - 2^{-j}n) \quad (21)$$

$$D_{2^j}f = (\langle f(x), \psi_{2^j}(x - 2^{-j}n) \rangle)_{n \in Z}. \quad (22)$$

Here $D_{2^j}f$ represents the difference in details between successive dyadic resolutions.

Consequently, from the aforementioned mathematical discussion of the wavelet theory, it can be concluded that the notion of multiscale/resolution and quadrature mirror filters are directly allied to a wavelet orthonormal basis. Without any loss of generalization, this theory can be extended to 2-D signals f(x, y). In 2-D, the orthonormal basis is acquired using three wavelets $\psi^1(x), \psi^2(x), \psi^3(x)$, where each of these can be considered to be the impulse response of a BPF with a certain orientation preference. Thus the approximation $A_{2^j}f$ of a signal f (x, y) at a scale $2^j$ and its information difference with $A_{2^{j+1}}f$ are given as:

$$A_{2^j}f = (f(x,y) * \bar{\theta}_{2^j}(x - 2^{-j}n, y - 2^{-j}m))_{(n,m) \in Z^2} \quad (23)$$

$$D_{2^j}^1 f = (\langle f(x,y), \psi_{2^j}^1(x - 2^{-j}n, y - 2^{-j}m) \rangle)_{(n,m) \in Z^2} \quad (24)$$

$$D_{2^j}^2 f = (\langle f(x,y), \psi_{2^j}^2(x - 2^{-j}n, y - 2^{-j}m) \rangle)_{(n,m) \in Z^2} \quad (25)$$

$$D_{2^j}^3 f = (\langle f(x,y), \psi_{2^j}^3(x - 2^{-j}n, y - 2^{-j}m) \rangle)_{(n,m) \in Z^2} \quad (26).$$

Figure 4:
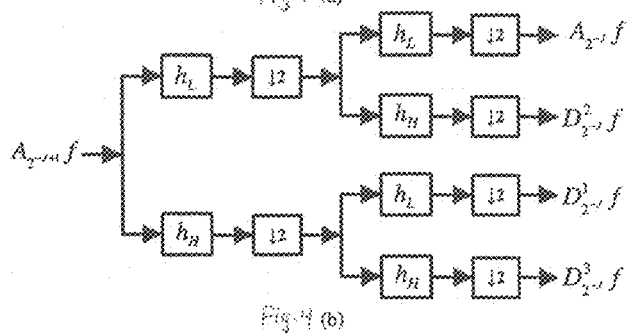
FIG. 4(a) is a diagram of multiresolution image representation.
FIG. 4(b) is a diagram of an analysis filter bank.

Here $D_{2^j}^1 f$ (HL) and $D_{2^j}^2 f$ (HH) correspond to the vertical and horizontal high frequencies respectively, while $D_{2^j}^3$, f (HH) corresponds to high frequency components in both directions, represented in FIG. 4(a). However, it must be noted that in FIG. 4 the scales are in terms of $2^{-J}$, J>0 where $0 \geq j \geq -J$.

Practical implementation of multiscale image decomposition has been done effectively using filter banks. A filter bank is defined as an array of filters utilized to separate a signal into various sub bands, generally designed in a manner to facilitate reconstruction of the signal by simply combining the acquired sub bands. The decomposition and reconstruction procedures are better known as analysis and synthesis respectively. FIG. 4(b) and Table 1 (below) portray the analysis filter bank and the Daubechies 9/7 analysis coefficients (rounded to 16 digits) in the JPEG2000 compression scheme (Christopoulos et al., "The JPEG2000 Still Image Coding System: An Overview," *IEEE Transactions on Consumer Electronics* 46(4):1103-1127 (2000), which is hereby incorporated by reference in its entirety), employed for multiscale analysis in the MAPGSEG method.

TABLE 1

DAUBECHIES 9/7 ANALYSIS FILTER COEFFICIENTS

| i | Low Pass Filter $h_L$ (i) | High Pass Filter $h_H$ (i) |
|---|---|---|
| 0 | 0.6029490182363570 | 1.1150870524569900 |
| ±1 | 0.2668641184428720 | −0.5912717631142470 |
| ±2 | −0.0782232665289878 | −0.0575435262284995 |
| ±3 | −0.0168641184428749 | 0.0912717631142494 |
| ±4 | 0.0267487574108097 | |

CIE 1976 L*a*b* Color Space

In 1976 the Commission International de l'Eclairage (CIE) proposed two device independent approximately uniform color spaces, L*a*b* and L*u*v*, for different industrial applications with the aim to model the human perception of color. One important objective these color spaces were able to achieve with reasonable consistency was that, given two colors, the magnitude difference of the numerical values between them was proportional to the perceived difference as seen by the human eye (Green et al., *Color Engineering*, John Wiley and Sons Ltd. (2002), which is hereby incorporated by reference in its entirety). Experimental data was used to model the response of a person through tristimulus values X, Y and Z, which are linear transformations from R,G and B. Using these tristimulus values the CIE L*a*b* was defined as:

$$L*116\left(\frac{Y}{Y_n}\right)^{1/3} - 16 \quad (27)$$

$$a* = 500\left(\left(\frac{X}{X_n}\right)^{1/3} - \left(\frac{Y}{Y_n}\right)^{1/3}\right) \quad (28)$$

$$b* = 200\left(\left(\frac{Y}{Y_n}\right)^{1/3} - \left(\frac{Z}{Z_n}\right)^{1/3}\right) \quad (29)$$

where $X_n$, $Y_n$ and $Z_n$ are the tristimulus values of a reference white.

Multivariate ANalysis of Variance (MANOVA)

The Multivariate ANalysis of Variance abbreviated as MANOVA, is a popular statistical method employed in highlighting differences between groups of data (W. J. Krzanowski, *Principles of Multivariate Analysis*, Oxford University Press, chapter 11 (1988), which is hereby incorporated by reference in its entirety) cumulatively structured in the form of a matrix of dimensions n×p, in which n samples are divided into g groups, where each sample is associated with p variables $x_1, x_2, \ldots, x_p$. To this effect, the goal of the MANOVA procedure is to find the optimal single direction in the p-dimensional space, so as to conveniently view differences between various groups.

In the general case of p variables, any direction in the p-dimensional space can be designated as a linear combination of certain vectors $(a_1, a_2, \ldots, a_p)$, which can be utilized to convert every p-variate sample to a univariate observation $y_i = a^T x_i$, where $a^T = (a_1, a_2, \ldots, a_p)$. However since the n data samples are divided into g groups, the obtained univariate observations are re-labeled as $y_{ij}$ denoting the y value for the $j^{th}$ sample in the $i^{th}$ group, where $i=1 \ldots g$ and $j=1 \ldots n_j$. In order to establish whether the aforementioned univariate observations demonstrate differences between groups, the total sum-of-squares of $y_{ij}$ is partitioned into its Sum-of-Squares Between (SSB)-groups and Sum-of-Squares Within (SSW)-groups components, defined as:

$$SSB(a) = \sum_{i=1}^{g} n_i(\overline{y_i} - \overline{y})^2 \text{ and } SSW(a) = \sum_{i=1}^{g}\sum_{j=1}^{n_j}(y_{ij} - \overline{y_j})^2. \quad (30)$$

Here, $$\overline{y_i} = \frac{1}{n_i}\sum_{j=1}^{n_i} y_{ij}, \quad \overline{y} = \frac{1}{n}\sum_{i=1}^{g}\sum_{j=1}^{n_i} y_{ij} = \frac{1}{n}\sum_{i=1}^{g} n_i\overline{y_i}$$

and the notation (a) in Eq. (30) is utilized to underscore the fact that the SSB and SSW components vary with the choice of a. Utilizing these components a mean square ratio (F), to highlight group differences, is obtained as:

$$F = \left\{\frac{1}{(g-1)}SSB(a)\right\} \Big/ \left\{\frac{1}{(n-g)}SSW(a)\right\}. \quad (31)$$

From Eq. (31) it can be observed that the larger the value of F, the more variability exists between groups than within groups. Consequently, the optimal choice of the coefficients $a^T = (a_1, a_2, \ldots, a_p)$ will be the one that yields the largest value for F.

However, to ascertain the optimal values of a, multivariate analogues of the between-groups and within-groups sum of squares components used in the univariate analysis of the variance are computed, and defined as:

$$B_0 = \sum_{i=1}^{g} n_i(\overline{x_i} - \overline{x})(\overline{x_i} - \overline{x})^T \quad (32)$$

and $$W_0 = \sum_{i=1}^{g}\sum_{j=1}^{n_j}(x_{ij} - \overline{x_j})(x_{ij} - \overline{x_j})^T$$

where $B_0$ known as the between-groups sum-of-squares and products matrix and $W_0$ known as the within-groups sum-of-squares and products matrix, should be positive definite matrices. Furthermore, the notations $x_{ij}$, $\overline{x}_i$, $\overline{x}$ are analogous to $y_{ij}$, $\overline{y}_i$, $\overline{y}$ respectively. Since $y_{ij}=a^T x_{ij}$ Eqs. (31), (32) can be re-written as:

$$SSB(a) = a^T B_0 a \text{ and } SSW(a) = a^T W_0 a \tag{33}$$

$$F = \left\{\frac{1}{(g-1)} SSB(a)\right\} / \left\{\frac{1}{(n-g)} SSW(a)\right\} \tag{34}$$
$$= \left\{\frac{1}{(g-1)} a^T B_0 a\right\} / \left\{\frac{1}{(n-g)} a^T W_0 a\right\}$$
$$= \frac{a^T B a}{a^T W a}$$

where $B=B_0/(g-1)$ and $W=W_0/(n-g)$ are the between-groups and within-groups covariance matrices respectively.

The choice of the coefficients $a^T=(a_1, a_2, \ldots, a_p)$ which maximizes the value of F in Eq. (34) signifies the optimal single direction (or the best linear combination $y=a^T x$) in the p-dimensional space, so as to highlight differences between various groups, and can be obtained by differentiating Eq. (34) with respect to a and assigning result to zero. To this effect, we have:

$$Ba - \left(\frac{a^T B a}{a^T W a}\right) Wa = 0 \Rightarrow Ba - lWa \tag{35}$$
$$= 0 \Rightarrow (B - lW)a$$
$$= 0 \Rightarrow (W^{-1}B - lI)a$$
$$= 0$$

where $a^T Ba/a^T Wa=1$ is a constant, equal to the maximum value of the mean square ratio(F). Also, for Eq. (35) to be satisfied, it can be inferred that l must be an eigenvalue and a must be an eigenvector of $W^{-1}B$. Moreover, since l is constant value at the maximum of F, a must be eigenvector associated with the largest eigenvalue of $W^{-1}B$, that determines the optimal linear combination $y=a^T x$. Note that for a distinct separation of groups (greater variability between groups than within groups), l will be significantly greater than unity.

When the number of groups (g) or the dimensionality of the original space (p) is large, the goal of determining a single direction in the p-dimension space renders an inefficient solution to view disparities between various groups. However, since Eq. (35) often possesses more than one solution, multiple differentiating directions can be generated, whose efficiency in delineating groups of data depends on the magnitude of the eigenvalue/eigenvector pairs. To this effect, if Eq. (35) possessed s non-zero eigenvalues ($l_1, l_2, \ldots, l_s$) with corresponding eigenvectors ($a_1, a_2, \ldots, a_s$), a set of new variates ($y_1, y_2, \ldots, y_s$) know as canonical variates can be obtained according to $y_i=a_i^T x_i$, and the space spanning all $y_i$'s is termed as a canonical variate space. Following this, Eq. (18) can be re-written in matrix terms as BA=WAL, where A is matrix of all $a_i$'s of dimensions (p×s), while L is matrix of all $l_i$'s of dimensions (s×s). Furthermore, in this space, the mean of an arbitrary $i^{th}$ group of individuals can be represented as $\overline{y}_i = A^T \overline{x}_i$.

An appropriate measure to quantify the variability between two random groups ($i^{th}$ and $j^{th}$) of data is the distance between the corresponding group means, given by:

$$D=((\overline{x}_i-\overline{x}_j)^T M(\overline{x}_i-\overline{x}_j))^{1/2} \Rightarrow D^2=((\overline{x}_i-\overline{x}_j)^T M(\overline{x}_i-\overline{x}_j)) \tag{36}.$$

Here M is a matrix that modifies the influence of each variate in the aforementioned distance computation. Moreover, to exploit the covariances between variables and as well as differential variances, M can be chosen to be the inverse of the Within-groups dispersion matrix (W). The resultant distance measure for this choice of M yields the Mahalanobis distance, defined as:

$$D=((\overline{x}_i-\overline{x}_j)^T W^{-1}(\overline{x}_i-\overline{x}_j))^{1/2} \Rightarrow D^2=((\overline{x}_i-\overline{x}_j)^T W^{-1}(\overline{x}_i-\overline{x}_j)) \tag{37}.$$

The Euclidean between $i^{th}$ and the $j^{th}$ groups in the canonical variate space after substitution for $\overline{y}_i$ and $\overline{y}_j$, can be written as:

$$D=((\overline{y}_i-\overline{y}_j)^T(\overline{y}_i-\overline{y}_j))^{1/2} \Rightarrow D^2=((\overline{x}_i-\overline{x}_j)^T AA^T(\overline{x}_i-\overline{x}_j)) \tag{38}.$$

Furthermore, it can be shown that $AA^T=W^{-1}$, resulting in Eq. (38) being equal to Eq. (37). Thus, by generating a canonical variate space in a manner described in this section, the Euclidean distance between the group means in this space is equivalent to the Mahalanobis distance in the original p-dimension space. Moreover, since the Mahalanobis distance metric takes in to consideration the covariance and differential variance between variables, this distance measure is utilized to measure of variability between two multivariate populations.

Quantitative Evaluation of Segmentation Methods

To objectively measure the quality of our segmentation results, we have selected a recently proposed generic technique of evaluating segmentation correctness, referred to as the Normalized Probabilistic Rand (NPR) index (Unnikrishnan et al., "Toward Objective Evaluation of Image Segmentation Methods," *IEEE Transactions on Pattern Analysis and Machine Intelligence*, 29(6):929-944 (2007), which is hereby incorporated by reference in its entirety), designed such that: 1) it does not yield cases where the evaluation produces a high value in spite of the automatic segmentation result being nowhere closely similar to any one of its corresponding ground truths (nondegeneracy), 2) no assumptions are made about label assignments and region sizes, 3) it penalizes the evaluation score when the automatic segmentation fails to distinguish between regions that humans can distinctly identify and facilitates for lesser penalty in regions that are visually ambiguous (adaptive accommodation of label refinement), and 4) it facilitates comparison amongst multiple ground truths of the same image as well as of different images. The following subsections briefly discuss the mathematical preliminaries used for implementing the NPR evaluation methodology.

Rand Index (R)

The Rand Index, first instituted by William Rand (Unnikrishnan et al., "Measures of Similarity," IEEE Workshop on Applications of Computer Vision, pp. 394-400 (2005), which is hereby incorporated by reference in its entirety), facilitates the comparison of two arbitrary segmentations utilizing pair wise label relationships. It is defined as the ratio of number of pixel pairs that share the same label relationship in two segmentations, and is represented as:

$$R(S, S') = \frac{1}{\binom{N}{2}} \sum_{\substack{i,j \\ i \neq j}} [I(l_i = l_j \wedge l'_i = l'_j) + I(l_i \neq l_j \wedge l'_i = l'_j)]. \tag{39}$$

Here S and S' are two segmentations of an image comprising of N pixels, with corresponding label assignments and $\{l_i\}$ and $\{l'_i\}$ where$l$ i=1, 2, . . . , N. Furthermore, I is the identity function, ^ represents a logical conjunction ('AND' operation), and the denominator represents all possible unique pixel pairs in a dataset of N points. The Rand Index varies from 0 to 1, where 0 represents complete dissimilarity and 1 symbolizes that S and S' are identical. The Rand index is disadvantaged by its capability of handling only one ground truth segmentation for evaluation and its inability to accommodate adaptive label refinement.

Probabilistic Rand (PR) Index

The Probabilistic Rand Index (Unnikrislman et al., "Measures of Similarity," *IEEE Workshop on Applications of Computer Vision*, pp. 394-400 (2005), which is hereby incorporated by reference in its entirety), enables evaluation of segmentation correctness, taking into consideration the statistical nature of the Rand Index. The PR index allows comparison of a test segmentation result ($S_{test}$) to a set of multiple ground-truths ($S_1, S_2, \ldots S_K$) through a soft non-uniform weighting of pixel pairs as a function of the variability in the ground-truth set.

The Probabilistic Rand (PR) Index is defined as:

$$PR(S_{test}, \{S_K\}) = \frac{1}{\binom{N}{2}} \sum_{\substack{i,j \\ i \neq j}} \left[ \begin{array}{l} I(l_i^{S_{test}} = l_j^{S_{test}})P(\hat{l}_i = \hat{l}_j) + \\ I(l_i^{S_{test}} \neq l_j^{S_{test}})P(\hat{l}_i \neq \hat{l}_j) \end{array} \right] \quad (40)$$

where $\{1_i^{S_{test}}\}$, $\{1_i^{S_k}\}$ respectively represent the label assignment of a pixel i (where i=1, 2, ... N) in $S_{test}$ and the $K^{th}$ manual segmentation ($S_K$), while $\hat{l}_i$ denote the set of "true labels" for a pixel $x_i$. In addition, $P(\hat{l}_i=\hat{l}_j)$, $P(\hat{l}_i \neq \hat{l}_j)$ represent the respective probabilities of an identical or distinct label relationship between a pair of pixels $x_i$ and $x_j$, defined as:

$$P(\hat{l}_i = \hat{l}_j) = \frac{1}{K} \sum_{k=1}^{K} I(l_i^{S_K} = l_j^{S_k}) \text{ and} \quad (41)$$

$$P(\hat{l}_i \neq \hat{l}_j) = \frac{1}{K} \sum_{k=1}^{K} I(l_i^{S_K} \neq l_j^{S_k}) = 1 - P(\hat{l}_i = \hat{l}_j).$$

The PR Index takes the same range of values as the Rand Index, from 0 to 1 where 0 signifies complete dissimilarity and 1 represents a perfect match with ground truths. Although the PR Index helps overcome the aforementioned drawbacks of the Rand Index, it suffers from a deficiency of variation in its values over a large set of images due to its small effective range combined with the variation in its maximum value across images. Moreover the interpretation of the PR index across images is often ambiguous.

Normalized Probabilistic Rand (NPR) Index

In order to overcome the aforementioned shortcomings of the PR index, Unnikrishnan et al. "Toward Objective Evaluation of Image Segmentation Algorithms," *IEEE Transactions on Pattern Analysis and Machine Intelligence*, 29(6): 929-944 (2007), which is hereby incorporated by reference in its entirety, proposed the Normalized Probabilistic Rand (NPR) Index. The NPR metric is referenced to expected value of the PR Index, and is computed utilizing the variation and randomness in the set of ground truth images, defined as:

$$NPR = \frac{PR - \text{Expected Index}}{\max[PR] - \text{Expected Index}} = \frac{PR - E[PR]}{\max[PR] - E[PR]}. \quad (42)$$

The normalization with respect to the expected value of the PR Index results in a much higher range of values, making the NPR Index a much more robust evaluation metric. In Eq. 25 the maximum value of the PR Index is chosen to be 1 (max [PR]=1), and the expected value of the PR Index (E[PR]) is obtained as:

$$E[PR(S_{test}, \{S_K\})] = \frac{1}{\binom{N}{2}} \quad (43)$$

$$\sum_{\substack{i,j \\ i<j}} \left[ E[I(l_i^{S_{test}} = l_j^{S_{test}})]P(\hat{l}_i = \hat{l}_j) + E[I(l_i^{S_{test}} \neq l_j^{S_{test}})]P(\hat{l}_i \neq \hat{l}_j) \right].$$

To make the computation of $E[I(1_i^{S_{test}}=1_j^{S_{test}})]$ meaningful Unnikrishnan et al. proposed its computation from segmentations of all images from an arbitrary database, for all unordered pixel pairs (i, j). Therefore, if $\Phi$ is the number of images in the database and $K_\Phi$ is the number of ground truths per image then $E[I(1_i^{S_{test}}=1_j^{S_{test}})]$ can be computed by:

$$E[I(l_i^{S_{test}} = l_j^{S_{test}})] = \frac{1}{\Phi} \sum_{\Phi} \frac{1}{K_\Phi} \sum_{k=1}^{k=K_\Phi} I(l_i^{S_k^\Phi} = l_j^{S_k^\Phi}) \quad (44)$$

where $E[I(1_i^{S_{test}}=1_j^{S_{test}})]$ signifies that $E[PR(S_{test}, \{S_K\})]$ is a weighted sum of $PR(S_K^\Phi, \{S_K\})$. The NPR index computed in Eq. (42) can posses both positive and negative values, where negative values occur when the PR index is lower than its expected value for a given segmentation, signifying a poor result, while positive values that are significantly greater than zero (with a maximum value of 1) are considered useful segmentations.

Figure 5:
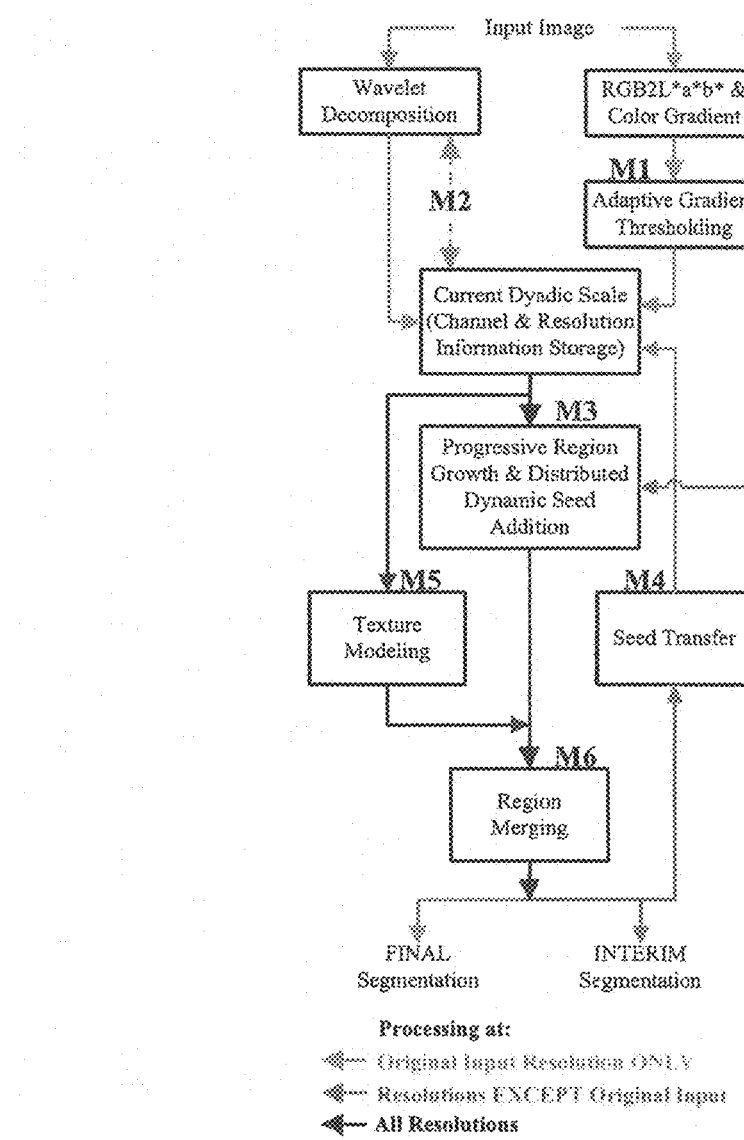
FIG. 5 is a detailed flow chart of the method for multi-resolution and progressive gradient segmentation in accordance with embodiments of the present invention.

The MAPGSEG method embodied in six modules is shown in FIG. 5. The first module (M1) is utilized to adaptively generate thresholds required for initial clustering, region growth at varied levels of the input image pyramid. The second module (M2) performs dyadic wavelet decomposition for multiresolution representation of the input image. The third module (M3) carries out a progressively thresholded growth procedure involving distributed dynamic seed addition. Module4 (M4) is responsible for identifying transferable regions from one resolution to another by exploiting the interim results as a-priori information. Texture modeling is performed utilizing module5 (M5). This method culminates in a region merging module (M6) to give interim segmentations at low resolutions, and the final segmentation map at a dyadic scale equal to that of the original input image. Furthermore, it is imperative to note that this method does not employ all modules at every scale (observe the color coding legend in FIG. 5). The following sub-sections elucidate each of these modules in detail.

Adaptive Gradient Thresholding

The segmentation method developed by Garcia et al. "Automatic Color Image Segmentation By Dynamic Region Growth and Multimodal Merging of Color and Texture Information", *International Conference on Acoustics, Speech and Signal Processing*, Las Vegas, Nev., (2008), which is hereby incorporated by reference in its entirety, and abbreviated as the Gradient Segmentation (GS) method utilized fixed thresholds for segmentation, in the RGB color space. Initial clustering was performed using a threshold value of 10, followed by a region growth procedure carried out at thresholds intervals of 15, 20, 30, 50, 85, and 120. These fixed thresholds were utilized for any image irrespective of its content, and intuitively can be deemed non-ideal, owed to the varied gradient composition present in natural images. This intuitive notion was substantiated as the fixed thresholds intervals were found to consistently pose major problems that hindered the performance of the GS method, clearly demonstrated by the images in FIG. 6.

Effects of Static Threshold Interval Selection

Figure 6:
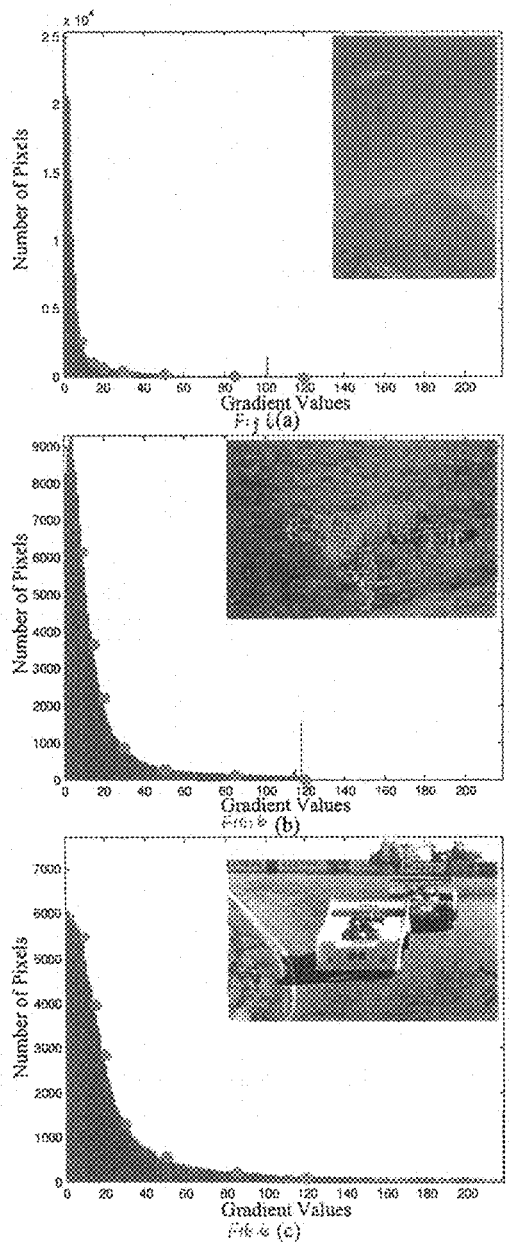
FIG. 6(a) is a gradient histogram of a parachute.
FIG. 6(b) is a gradient histogram of a Cheetah.
FIG. 6(c) is a gradient histogram of cars.

In FIG. 6 three natural scene images with their corresponding enhanced gradient map histograms, are shown. In addition marked in green and red along each of the histograms are the fixed threshold intervals utilized for initial clustering and region growth respectively. Enhanced gradient maps are obtained by computing the gradient utilizing the method in Lee et al., "Detecting Boundaries in a Vector Field," *IEEE Transactions on Signal Processing* 39(5):1181-1194 (1991), which is hereby incorporated by reference in its entirety, on the increased and decreased contrast versions of the original RGB inputs and finding the pixel by pixel maximum among the two. Increased contrast enhances dark regions and exposes edges present in these regions. On the contrary decreased contrast exposes edge information present in bright areas of the image. Thus, the maximum of the two yields a gradient map including most edge information present in the image. Although gradient map enhancement (employed in the GS algorithm) is useful it comes at the expense of increased computation, especially for large resolution images.

In FIG. 6 it can be observed that the varying shape of gradient histograms from image to image causes the fixed thresholds to be distributed erratically without following a uniform pattern, resulting in contrasting segmentation results. One way of analyzing the effects of static threshold interval selection is by comparing the gradient content of the images in each interval. Considering the first two intervals for region growth, from 10 to 15 and 15 to 20, large gradient content in the 'Cheetah' and 'Cars' images is seen within these intervals, and in contrast for the 'Parachute' image the content is small which may result in over segmentation of flat regions with higher computational costs. In addition, the GS method was designed such that, only seeds (a labeled collection of pixels corresponding to a particular region) which satisfy a certain minimum size criterion based on the current stage of the method be considered for further processing. In such a scenario few minute seeds generated in these low gradient intervals, in the parachute image may be discarded, rendering the thresholds constituting this interval to have negligible contribution to the final segmentation result. Conversely, if an interval is very large in comparison to the extent or span of the histogram, it causes regions with significantly different gradient detail to be merged together, providing a segmentation that is incoherent with the original input image (under segmentation).

Moreover, in FIGS. 6(a) and 6(b) the span of the histogram both cases is smaller than the final region growth threshold (120) resulting in wasted computational costs, significantly effecting the overall performance of the method. Thus, overcoming these problems necessitated an adaptive thresholding approach based on image content.

Advantages of CIE L*a*b* Over RGB

The MAPGSEG employs adaptive gradient thresholding in the CIE 1976 L*a*b* color space. The method begins with a conversion from RGB to CIE L*a*b for correct color differentiation, owed to the fact that the latter is better modeled for human perception and is more uniform in comparison to the RGB space. It should be noted that although the CIE L*a*b* has been used in the present invention, other color space models such as the CIE L*u*v*, CIE U*v*w*, YIQ and the like can be used. In general any 3-dimensional color space/model can be used for obtaining image segmentation in accordance with the present invention. The L*a*b* data is 8-bit encoded to values ranging from 0-255 for convenient color interpretation and to overcome viewing and display limitations. In addition it has also been widely used for commercial applications. The resultant color converted data is utilized for computing the vector color gradient utilizing the previously mentioned method described in Lee et al., "Detecting Boundaries in a Vector Field," *IEEE Transactions on Signal Processing* 39(5):1181-1194 (1991), which is hereby incorporated by reference in its entirety, without any enhancement methodology. In general for an image, 8-bit L*a*b* values were found to span over a much smaller range than 8-bit RGB, consequently resulting in a relatively compact histogram compared to its enhanced RGB counterpart.

Figure 7:
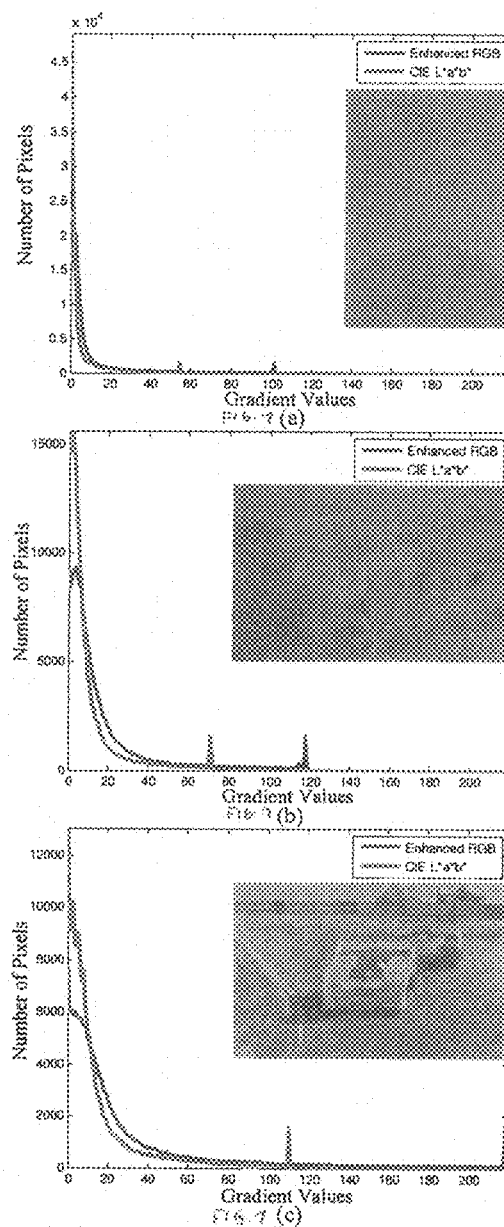
FIG. 7(a) is a graph of a gradient histogram of RBG versus CIE L*a*b* of a parachute.
FIG. 7(b) is a graph of a gradient histogram of RBG versus CIE L*a*b* of a Cheetah.
FIG. 7(c) is a graph of a gradient histogram of RBG versus CIE L*a*b* of cars.

In FIGS. 7(a), 7(b) and 7(c), shown are the histogram comparisons of RGB (in blue) and L*a*b*(in red), along with the color converted equivalents for the three images in FIG. 6. It can be observed that the red curves are squeezed versions of the blue curves, where the span of the red curves are significantly smaller than the ones in blue but the amplitude of the red are much larger in comparison. To this effect, if the thresholds are limited to the span of the histogram, this squeezed property is an advantage as the region growth procedure is now confined to a significantly smaller range and for any arbitrary threshold interval in this reduced range a higher number of pixels are worked upon, in comparison to RGB. In addition, it can be observed that color space changeover to L*a*b* has enabled distinct differentiation between the chromatic and achromatic regions, presenting the method with this additional piece of information.

Adaptive Threshold Generation

The MAPGSEG method is initiated with a color space conversion of the input image from RGB to CIE L*a*b* for reasons specified previously. Using the resultant L*a*b*data, the magnitude of the gradient of the full resolution color image field is calculated. The threshold values required for segmentation are determined utilizing the histogram of the color converted gradient map.

At first, the objective is to select a threshold for the initiation of the seed generation process. Preferably, a threshold value should be selected to expose most edges while ignoring the noise present in images. However, accomplishing this task is precluded by the unique disposition of natural scene images, where a threshold that correctly demarcates the periphery of a given region may unify other regions. Due to this factor, the thresholding method is initiated by estimating a value λ that aids in selecting the regions without any edges or with extremely weak and imperceptible edges. This threshold primarily is estimated based on the span of the histogram in combination with empirical data.

Given an image, one of two empirically determined threshold values is proposed to be chosen for initiating the seed generation process, by validating how far apart the low and high gradient content in the image are, in its corresponding histogram. The idea is that a high initial threshold be used for images in which a large percentage of gradient values spread over a narrow range and a low initial threshold value be used for images in which a large percentage of gradient values spread over a wide range, in comparison to the span of the histogram. These high and low initial threshold values were determined by obtaining the mean L*a*b* gradient histogram of 300 natural scene images present in the publicly available Berkeley database, shown in FIG. 8.

Figure 8:
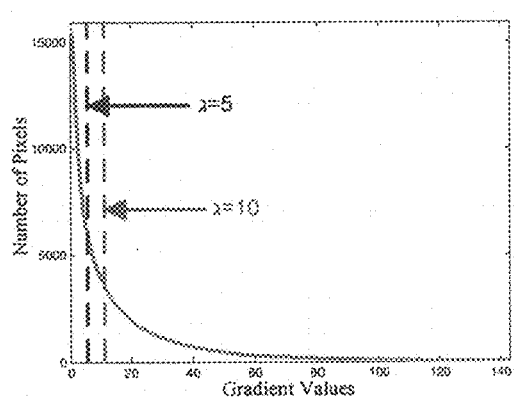
FIG. 8 is a mean color (L*a*b*) gradient histogram of 300 images of the Berkeley database.
Figures 9A, 9B, 9C, 9D:
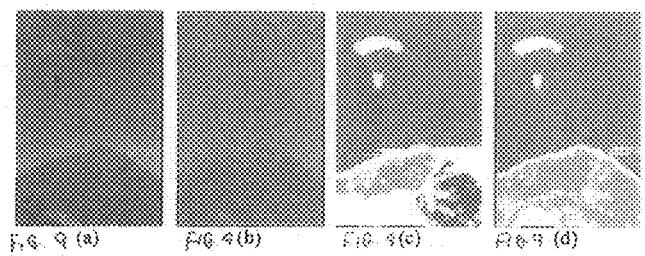
FIG. 9(a) is an image of an RGB version of the image of the parachute.
FIG. 9(b) is an image of an L*a*b* version of the image of the parachute.
FIG. 9(c) is an image of an initial cluster generated at $\lambda=5$ of the image of the parachute.
FIG. 9(d) is an image of an initial cluster generated at $\lambda=10$ of the image of the parachute.

As illustrated in FIG. 8, though the histogram span ends at a gradient value of 143, the gradient content is negligible beyond 100. Thus from an empirical perspective, a small percentage of this value was chosen as a suitable threshold for initiating the threshold method without causing any loss of strong gradient content (under segmentation). $\lambda=5$ (5% of 100) is chosen as a suitable value to meet the requirement and works well for most images where background and foreground have largely indistinguishable gradient detail from each other. However in images having a slightly varying background with less gradient detail, well distinguished from prominent foreground content, it was found that $\lambda=5$ results in flat regions being partially selected, potentially resulting in more processing time or in some cases an over segmentation result. To avoid this scenario a second threshold $\lambda=10$ is preferably chosen for such images. FIGS. 9(a) and 9(b) show the RGB and color converted versions of the 'Parachute' image respectively, after a two level decomposition from 481×321 to 121×81. FIGS. 9(c) and 9(d) show the initial clusters generated at $\lambda=5$ and $\lambda=10$ respectively, at this resolution. The advantage of using a higher initial threshold can be observed for this image which is abundant in low gradient content. In FIG. 9(c) the mountain region is split up as two seeds when using $\lambda=5$. However $\lambda=10$ results in acquiring the mountain as a single seed and in doing so covering a much larger homogenous area. This results in faster processing due to less number of seeds and unsegmented area.

Figure 10:
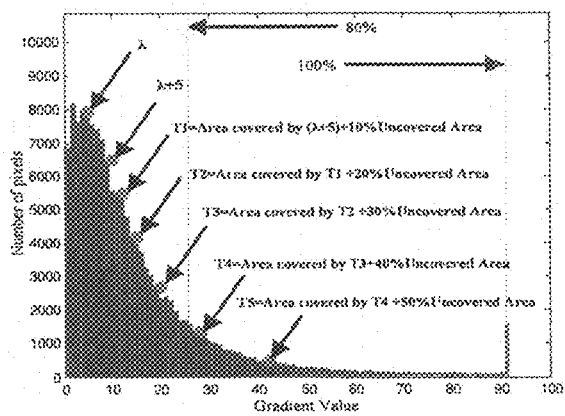
FIG. 10 is a histogram based on adaptive gradient thresholding.

From a practical implementation standpoint, a decision of selecting the initial threshold ($\lambda=5$ or $\lambda=10$) for any arbitrary image by obtaining the percentage ratio of the gradient values corresponding to 80% and 100% area under its histogram curve was made, as shown in FIG. 10. If 80% area under the histogram curve corresponds to a gradient value that is less than 10% of the maximum gradient value in the input image, a high threshold value ($\lambda=10$) is chosen and a low initial threshold value is chosen ($\lambda=5$). Having obtained $\lambda$, initial seeds are generated at threshold intervals of $\lambda$ and $\lambda+5$ to segment most low gradient regions. Once the thresholds for the initial seed generation are determined, the challenge is to calculate threshold limits for various intervals of the region growth and dynamic seed addition procedure, shown in the red box of FIG. 11. The initialization threshold discussed in the embodiment shown in FIG. 11 can be varied based on the complexity of the image being processed. In general for low complexity images a high value of the initialization thresholds ($\lambda$) should be chosen, while for images with highly complex content a low value is preferred. The choice of the initialization in this manner ensures appropriate selection of pixel clusters for initializing region formation. In general a preferred range of ($\lambda$) is about 5% to 10% of the maximum gradient value in the image. Once $\lambda$ is determined a second threshold in the vicinity of $\lambda$ (typically $\lambda+\delta$ where preferred values of $\delta$ is between 1-5) is picked to ensure proper region formation.

Figure 11:
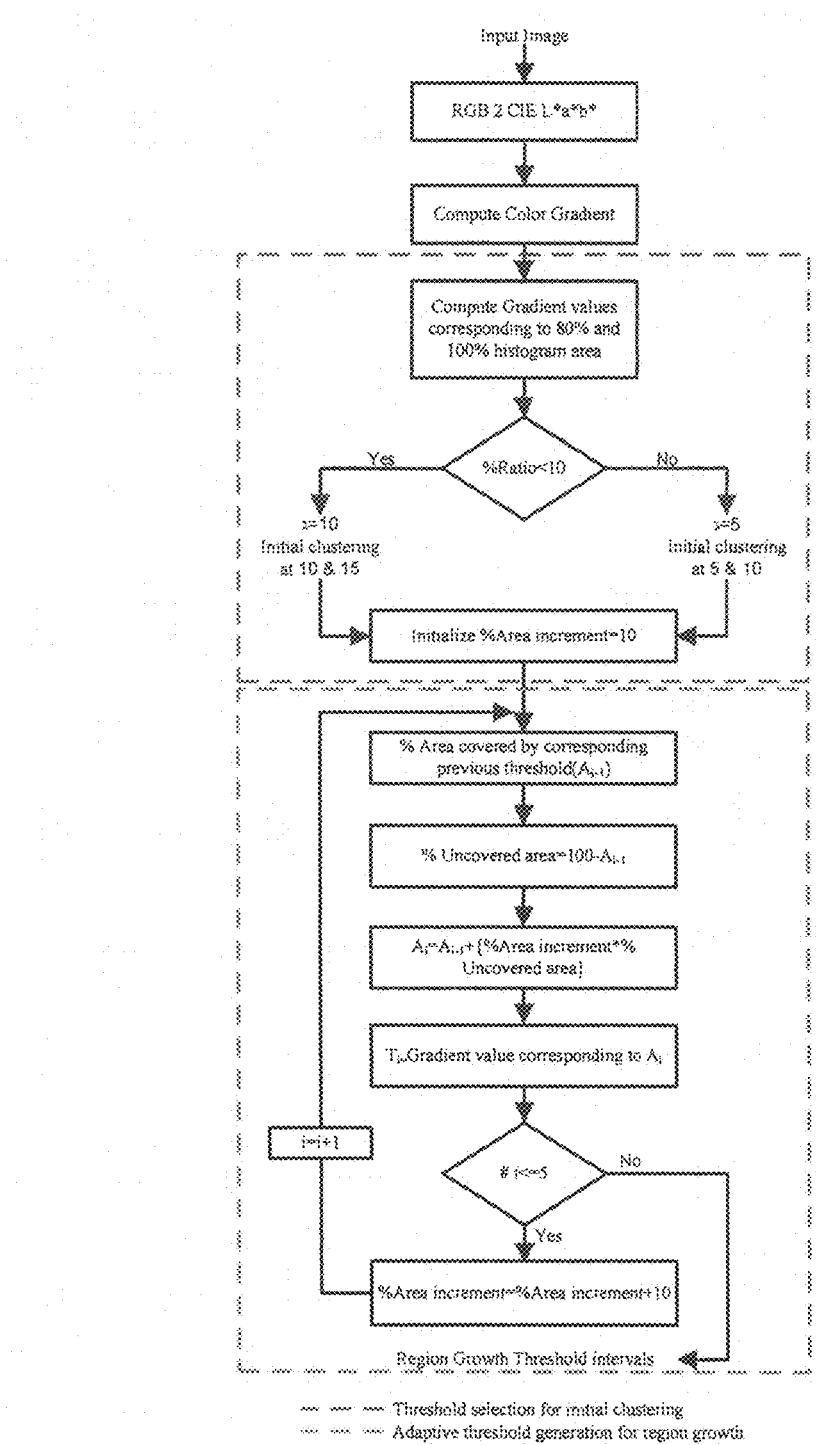
FIG. 11 is a flow chart of a method of adaptive gradient thresholding.

Dynamic seed generation is that portion of the growth process where additional seeds are added to the initial seeds at the lowest resolution or existing high confidence seeds at subsequent higher resolutions. These threshold limits constituting various intervals selected for region growth are determined utilizing the area under the gradient histogram that does not fall within the range of the initial thresholds. The first threshold ($T_i$, i=1) is determined by adding 10% of this uncovered area to the area covered by $T_{i-1}=\lambda+5$ and obtaining the corresponding threshold value. This process is continued for each new stage of the dynamic seed addition procedure where a 10% increment of the uncovered area at each stage is added to the area already covered by the threshold value of its corresponding previous stage ($A_{i-1}$) as illustrated in FIG. 10 and FIG. 11. Five iterations of the process yielding four growth intervals were determined to be sufficient to cover all significant areas of the input image. Calculating the growth intervals in this manner is done in order to 1) make certain that regions of significant size are always added to the segmentation map, 2) ensure that all thresholds lie within span of the histogram, avoiding the possibility of wasted computational efficiency, and 3) account for the exponential decay of the gradient map histograms of natural scene images as seen in FIG. 10.

In the general sense a threshold value ($T_i$) that drives seed addition at the end of an $i^{th}$ stage of region growth is determined by:

$$T_i = \sum_{g=0}^{T_{i-1}} N_g + i\Delta g \left[ \sum_{g=T_{i-1}+1}^{G-1} N_g \right]. \tag{45}$$

The first summation in Eq. (45) represents the cumulative image area less than the gradient threshold $T_{i-1}$ that is processed in the $(i-1)^{th}$ stage of region growth, while the second summation represents the cumulative unprocessed image area greater than $T_{i-1}$. The quantity $i\Delta g$ defined as the 'growth factor', determines the incremental percentage of image area of higher gradient densities to be processed in the $n^{th}$ stage. The entire quantity beyond the '+' sign, is known as a Region Growth Interval (RGI), which represents the range of gradient values from $T_{i-1}$ to $T_i$ (lower and upper limits of the $i^{th}$ RGI. In this manner utilizing Eq. (45) and an initialization threshold ($\lambda$), segmentation thresholds $T_1$ to $T_i$ differentiating T RGIs are computed, which are utilized for the previously mentioned functionalities.

Figure 12:
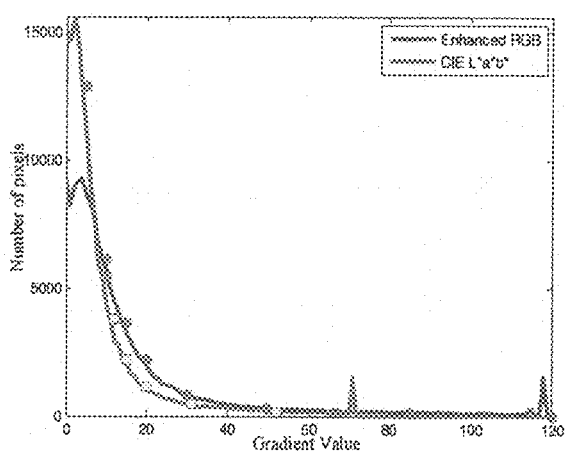
FIG. 12 is a graph of static versus adaptively generated thresholds for the cheetah image.
Figure 13:
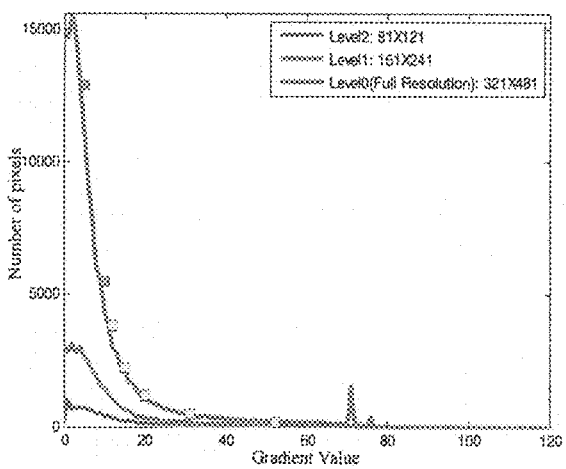
FIG. 13 is a graph of multiresolution gradient histograms of the cheetah image.

The effect of utilizing the aforementioned threshold generation procedure is clearly illustrated in FIG. 12. In this figure (zoomed version of FIG. 7(b)), shown is the comparison of static and adaptively generated thresholds for the 'cheetah' image. Here the magenta and yellow markers signify thresholds intervals utilized for initial clustering ($\lambda$, $\lambda+5$) and region growth respectively. It can be observed that these intervals are distributed along the histogram curve in a manner that they can meaningfully contribute to the segmentation result. This is clearly seen by comparing the gradient content in the last few intervals, where the adaptive thresholds cover more significant areas (on the red curve) than the static thresholds which include much less gradient content (on the blue curve). It can also be observed that the adaptive thresholds are all located within the span of the histogram thus avoiding wasted computational costs. In the MAPGSEG method, the adaptive thresholds were generated on the full resolution image (mentioned previously). Once these thresholds were acquired, the same thresholds were utilized in a progressive framework for faster segmentation at various resolutions. This was possible as given any threshold interval, the gradient content in this interval increases from lower to higher resolutions with the overall shape of the gradient histogram being the same, as can be observed in FIG. 13. Therefore in the MAPGSEG method the threshold generation scheme was performed only once and the same thresholds were utilized for segmenting the input image at all resolutions.

Dyadic Wavelet Decomposition

Figure 14:
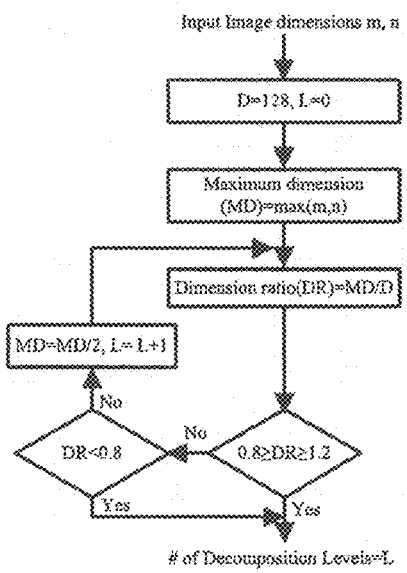
FIG. 14 is a flowchart of a method of determining a number of decomposition levels.

The MAPGSEG method employs a dyadic wavelet decomposition scheme for multiscale image representation, as described above. In order to ensure suitable approximations of the 2-D input signal, the Daubechies (9, 7) biorthogonal analysis coefficients similar to the ones used in the JPEG2000 compression scheme, were employed at different resolution levels. Other coefficients associated with the haar, Daubechies 4, Daubechies 6, Daubechies 8, coiflet wavelets and the like, can be used in the present invention. These levels are designated as L=0, 1, 2 . . . k for a k-level decomposition. Since segmentation can be used in multiple applications it is preferred to make the number of decomposition levels dynamic, for an arbitrary image. However in order to be able to achieve this objective a user or application defined variable called 'Desired dimension' is introduced. Desired dimension (D) is defined as the smallest workable dimension desired by a user or constrained by an application. Often applications are restricted by the smallest size of an image that they can handle. Since a dyadic (power of 2) wavelet decomposition scheme is employed in the present invention, preferred values of D are values that are powers of 2 such as 64, 128, 256, 512 etc. Although any value of D can be picked by a user, it should be noted that D should be chosen to be less than the image dimension but greater than preferably about 20% of the image dimension to achieve optimal results. The MAPGSEG method is designed such that it gives the application or user the option to set the smallest workable dimension for segmentation. Once D is initialized based on the resolution of the input image, the method automatically determines the number of dyadic decomposition levels that will result in the input image resolution being in the vicinity DXD, since DXD may or may not be a dyadic scale of the original input. In the case of images that are of the form m by n where m≠n (rectangular image) the number of decomposition levels is found by working with the maximum of m and n and find the number of levels that will take this maximum value in the vicinity of D (see FIG. 14). This will result in the smaller dimension to be automatically mapped such that aspect ratio is constant. In the MAPGSEG method, we set D=128 and the number of levels are counted till the maximum dimension of the input is in the range 0.8*D≤maximum (m, n)≤1.2*D, as shown in FIG. 14.

Figure 15:
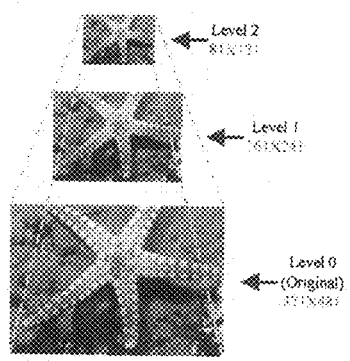
FIG. 15 are images of a star fish illustrating a two level decomposition with corresponding designations.

Having obtained the number of decomposition levels (L) based on desired dimension D the input image (L=0) is decomposed to the smallest resolution (L=k). In doing so all the channel (L*, a*, b*) information acquired from the LL sub band and corresponding size information pertaining to the intermediate levels (L=k−1, k−2, . . . , 1) are stored. To this effect the decomposition scheme is performed only once without having to be repeated for every level. In FIG. 15 shown is a typical dyadic scale image pyramid with designated levels. It is important to note that all the procedures described in various embodiments of the present invention can also be performed on non-dyadic image scales, with the only major trade off being increased complexity of processing. In general dyadic scales are easy to process, therefore, and a more preferred embodiment of the present invention.

Multiresolution Region Growing

In accordance with the present invention a multi-resolution region growing methodology does not depend exclusively on the initial assignment of clusters, to arrive at the final segmentation. In the GS algorithm the region growth and seed addition process were interlaced with each other, where every growth cycle corresponded with a seed addition stage. However in the MAPGSEG method, a progressively thresholded growth procedure was preferred where region growth cycles do not have an exclusive one-to-one relationship with the seed addition procedure. The multiresolution region growing procedure involving distributed dynamic seed addition in accordance with embodiments of the present invention and its performance advantages in a multiscale framework is discussed below. A flow chart of the entire module is shown in FIG. 16.

Initial Clustering

Figure 16:
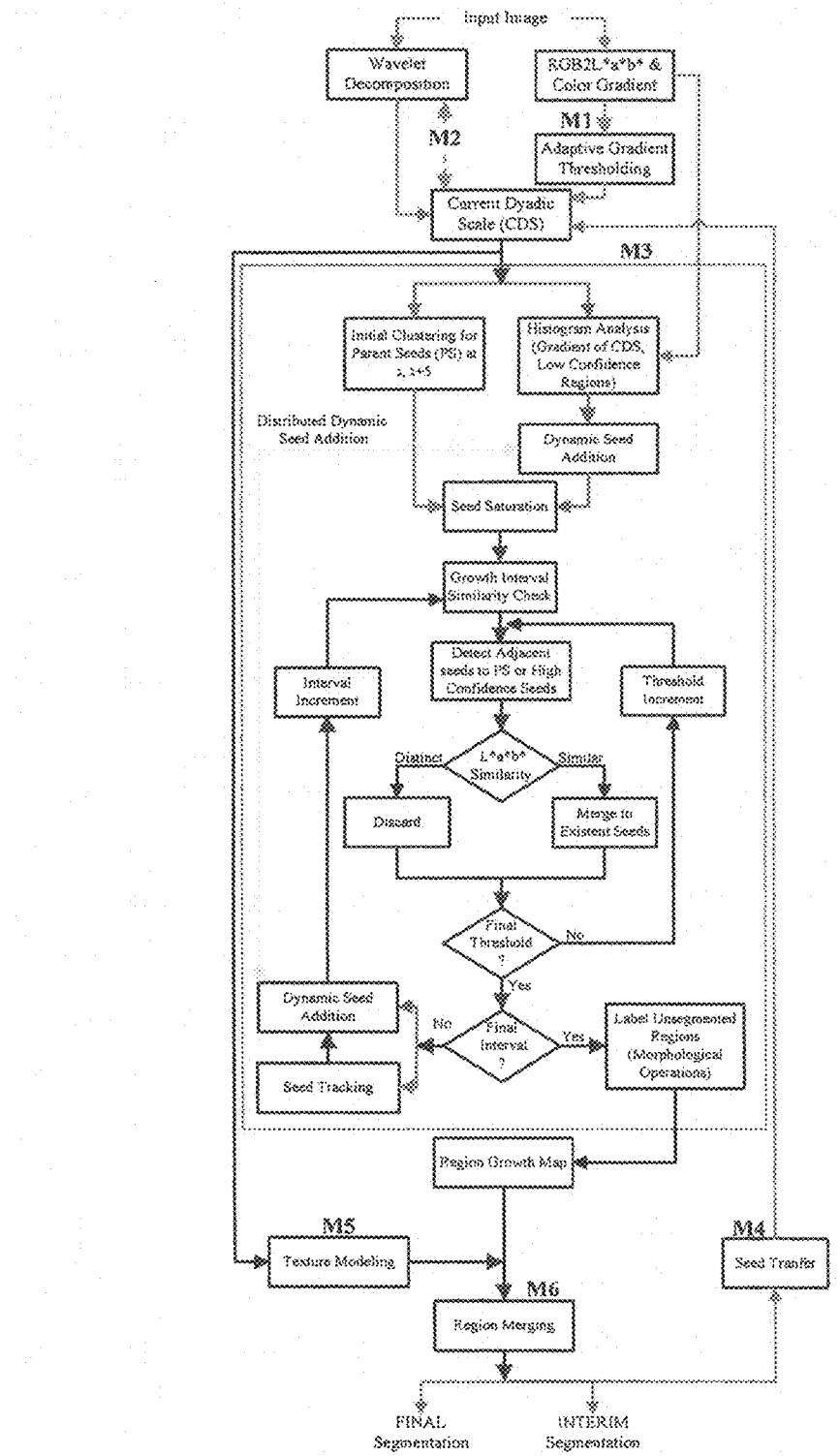
FIG. 16 is a flow chart of a method for progressive region growth involving distributed dynamic seed addition.

The initial positioning of seeds utilizing λ (either 5 or 10 for a particular image) and λ+5 is done only at the lowest resolution of the image pyramid, as shown in FIG. 16. All regions in the image, whose gradient value fall below these thresholds, are classified as initial seeds or Parent Seeds (PSs). However, to prevent the generation of multiple clusters within homogeneous and connected regions, PSs are constrained to clusters of pixels which are of certain minimum spatial extent. Spatial constraints (of seed extent) requisited during various stages of region formation are chosen proportional to a Minimum Seed Size (MSS) criterion that defines the minimum desired size of an independent seed. The MSS criterion for region processing at an arbitrary $L^{th}$ decomposition level ($MSS_L$) is chosen such that: 1) it is very small in comparison to the corresponding $L^{th}$ level image area (that is $MSS_L \ll \{d_{Mk}d_{Nk}\}$, where $d_{Mk}$ and $d_{Nk}$ are the row and column image dimensions at the 'kth' resolution level) to ensure that fine details are captured in the segmentation process, as well as 2) it is a function of the down sampling rate $2^L$ employed during decomposition to warrant the processing of seeds of 'meaningful' sizes in comparison to corresponding $L^{th}$ scale image area. Consequently, based on the aforementioned requirements the $MSS_L$ criterion is computed as:

$$MSS_L = 2^L \alpha \{d_{ML}d_{NL}\} \quad (46)$$

where, α is a small percentage (typically 0.01% with preferred range of 0.01% to 0.1% for optimal results) of the $L^{th}$ scale image area. The parameter α is preferably chosen so as to capture all details in the image. The aforementioned ranges were determined based on this requirement. In addition it can be observed that as the value of α is increased to larger values the detail in eventual segmentation decreases and vice versa. Hence, for the initial clustering phase performed only at the lowest resolution L=$k^{th}$ level (previously mentioned), a Minimum Seed Size criterion proportional to $MSS_k = 2^k \alpha \{d_{Mk}d_{Nk}\}$ is employed.

For the initial clustering phase these size criterions are obtained as $50*MSS_L$ and $25*MSS_L$ for λ and λ+5 respectively, as illustrated in FIG. 17. The 'Cars' image in FIG. 17(a) contains a lot of gradient detail as displayed in FIG. 17(b). Thus, for initial clustering the threshold λ was determined to be 5. It can be seen that λ constrained with size criterion of $50*MSS_L$ utilizing connected component analysis, detects large flat regions pertaining to the motorway and sky (FIG. 17(c)). Other low gradient regions that are not detected are acquired by padding the existent seeds generated at λ, so that a threshold increment and size constraint reduction results in detection of smaller seeds at locations other than the pre-existing ones. In the method developed by Garcia et al. seed padding was performed using nonlinear spatial filtering techniques. However, the MAPGSEG method adopts a two step morphological method for seed padding. Firstly, a logical map is obtained, comprising 0's and 1's where a pixel having a value of 1 signifies that it is a part of an existing seed and 0 indicated an unassigned pixel location. This is followed by the dilation of the logical map by a 3 by 3 structuring element. The two step seed padding procedure is represented in FIGS. 17(d) and 17(e) respectively. The padded seeds are marked in the gradient map signifying all locations that are available for seed generation and vice versa (FIG. 17(f)). The threshold is incremented to λ+5 and the size constraint is reduced to $25*MSS_L$, resulting in smaller gradient areas being detected, as portrayed in FIG. 17(g). Thus it is seen that varying size constraints plays a major part in proper region formation. Note that the multiplication factors of 50 and 25 for the threshold values of λ and λ+5 respectively, have been arbitrarily set. These can be varied depending on the complexity of the image. However in general the multiplicative factor for threshold λ (preferred range of 40 to 60 for optimal results) should be chosen greater than λ+5 (preferred range of 15 to 30 for optimal results), for proper region formation. The agglomeration of all seeds detected, forming the parent seeds map is shown in FIG. 17(h). Moreover, the size criterion for addition of new seeds at subsequent higher gradient densities is gradually reduced for proper region formation.

Seed Saturation

The parent seeds map, prior to region growth, is subjected to a seed saturation process where all isolated and small unassigned pixel regions encompassed within seed boundaries, are assigned the labels of corresponding parent seeds. However, contiguous unassigned pixel locations larger than the current size criterion ($25*MSS_L$) are left unassigned as these are potential locations for new seeds during region growth. The seed saturation procedure for the parent seeds map shown in FIG. 17(h) is illustrated in FIG. 18. A logical map for FIG. 17(h) is portrayed in FIG. 18 (a). The image negative of this logical map is shown in FIG. 18(b). This represents all unsegmented pixel locations in the image. In order to find all the unassigned pixel locations larger than the current size criterion ($25*MSS_L$) connected component analysis is employed to the map in FIG. 18(b). The result is shown in FIG. 18 (c) and it is these large unsegmented regions that are passed on to the region growth procedure. In addition, the large regions are removed from the map including all unsegmented pixel locations (FIG. 18(b)), to give a map of isolated and small contiguous pixel regions that can be directly assigned to the labels of their corresponding encompassing parent, shown in FIG. 18(d). However, in order to achieve this objective the labels of parent surrounding the small pixel regions need to be known. Parent Seed boundaries ($PS_{boundaries}$) is a binary map extracted morphologically by subtracting PSs from their corresponding dilated counterparts, mathematically represented as:

$$PS(i, j)_{boundaries} = \begin{cases} 1 & \forall \ (i, j) \text{ where } \{(PSs \oplus \psi) - PSs\} > 0 \\ 0 & \forall \ (i, j) \text{ where } \{(PSs \oplus \psi) - PSs\} = 0 \end{cases} \quad (47)$$

$$PSs \oplus \psi = \{\gamma \in Z^2 \mid \gamma = a + b \text{ for some } a \in PSs, b \in \psi\} \quad (48)$$

where (i,j) is a random pixel co-ordinate and PSs ⊕ψ v represents the dilation of the PSs map with a 3×3 square structuring element ψ that posses a value of '1' at every location. The dilated version of FIG. 18(d) seed map is shown in FIG. 18(e). All the nonzero pixels in FIG. 18(d) are removed from its dilated counterpart yielding isolated and small seed borders shown in FIG. 18(f). This seed border map is then point wise multiplied with the parent seeds map to obtain the parent labels in the proximity of the isolated pixels, as shown in FIG. 18(g). Having obtained all surrounding parent labels the small and isolated unsegmented pixels are assigned appropriate labels to complete the seed saturation process, as presented in FIGS. 18(h) and 18(i) respectively. The advantage of the seed saturation procedure can be analyzed by comparing FIGS. 17(h) and 18(i). It can be observed that a large portion of isolated pixels have been assigned labels without having to be processed during region growing. This results in a more efficient growth procedure where computational costs are channeled to segmented meaningful regions of the image rather than working on small isolated and insignificant regions that will visually not have any impact or show up as distinct segments in the final segmentation result.

Sequential Region Growing and Dynamic Seed Addition

The adaptive gradient thresholding method discussed above generates dissimilar values of growth intervals for most natural scene images. However, in the case of images with less gradient detail or foreground content, a situation may arise where identical thresholds are generated, causing the region growth and seed addition procedure to be inefficient. To overcome this problem, at the very beginning of the region growth procedure, all the thresholds demarcating the growth intervals are checked for similarity with one another. The 'check' is designed such that the growth procedure is performed only if the two thresholds constituting the current interval are different from each other, otherwise it is forcibly existed and the processing of the next interval begins. This adds an additional dimension to the MAPGSEG method, as not only are the thresholds generated adaptively but also their number may vary from image to image. Such a situation can be viewed by the image in FIG. 19, shown below.

The 'Bird' image shown in FIG. 19 is an example of an image with low gradient content and slowly varying background. This behavior can be observed by the shape of the histogram which is primarily concentrated in the low gradient regions, resulting in it being very narrow. This image is also an example where the initial threshold is λ=10 (first magenta marker). The thresholds intervals generated for this image are 19, 19, 69, 69 and 69 shown as the two yellow markers in FIG. 19. If the region growth procedure is performed without the aforementioned similarity check of the minimum and maximum limits of an interval, the method would go through three iterations (one at 19 and twice at 69) of the region growing without any contribution to the eventual segmentation result. The incorporation of a threshold similarity check avoids this problem and only one interval from 19 to 69 is used to grow regions, thus increasing the flexibility of the method.

Once the updated parent seeds map after seed saturation is obtained (FIG. 20(a)), the MAPGSEG method proceeds to the growth procedure in a manner similar to the GS method, by increasing the threshold to detect new areas, referred to as child seeds, shown in FIG. 20(b). However, at this point, only the child seeds that are adjacent to previously generated parent seeds are classified. The adjacent child seeds are found by obtaining the seeds that share pixels with parent seed borders. In the GS algorithm parent seed borders are found using a non-linear spatial filter that operates in a 3 by 3 neighborhood such that, the output of the filter is zero if all elements in the neighborhood are exclusively zero or non-zero, and gives a nonzero output if the neighborhood elements are a mixture of zero and non-zero values. However, the MAPGSEG adopts a morphological method to acquire parent seed borders (FIG. 20(c)) with identical results to the GS algorithm, aforementioned in the discussion on seed saturation. Morphological extraction of seed borders was found to be computationally more efficient especially for large resolution images, in comparison to non-linear spatial filtering.

Having obtained the adjacent child seeds (FIG. 20(d)) utilizing the parent seed borders map, the MSS criterion is now employed to differentiate between child seeds that can directly be merged with corresponding parents and those that have to be further processed. Incorporation of the MSS criterion at this point reduces the number of child seeds. The child seeds greater than the MSS constraint are checked for luminance and chrominance (L*, a*, b*) similarity with their parents. Parent-child similarity is evaluated by computing the distance between the mean L*, a* and b* values of PSs and CSs, $(m_{L*_{PSs}}, m_{a*_{PSs}}, m_{b*_{PSs}})$ and $(m_{L*_{CSs}}, m_{a*_{CSs}}, m_{b*_{CSs}})$ respectively, in the Euclidean space ($E^3$), defined as:

$$\Delta E_{PSs-CSs} = \sqrt{\begin{array}{c}(m^*_{L_{PSs}} - m^*_{L_{CSs}})^2 + (m^*_{a_{PSs}} - m^*_{a_{CSs}})^2 + \\ (m^*_{b_{PSs}} - m^*_{b_{CSs}})^2\end{array}} \quad (49)$$

The combination of the CIE L*a*b* color space and the Euclidean distance metric was employed because: 1) it assures the comparison of colors is similar to the differentiation of colors by the human eye, 2) the increased complexity of a different distance metric, for example, the Mahalanobis distance, does not improve the results, due to the small variance of the regions being compared, owing to their spatial proximity. On the other hand the GS method employed the Euclidean distance metric in the RGB color space which is non-uniform in nature. Thus the Euclidean distance measure in a non-uniform color space, employed earlier, was not a true indication of similarity of between regions, resulting in the GS algorithm yielding many oversegmented results. However the use of the CIE L*a*b* which is more uniform in comparison to RGB, helped reducing the over segmentation problem to a great extent. The maximum color distance to allow the integration of a child seed to its parent was empirically chosen preferably to be 60 in the MAPGSEG method. This value can be varied with a preferred range of 40 to 60. However it should be noted that when the value of color distance is lowered it implies a more stringent parent-child similarity criterion and vice versa. The aforementioned value of 60 was chosen based on the embodiment of the present invention's performance on 300 images. However, the preferred range may vary slightly when based upon a larger number of images.

The dynamic seed addition portion of the region growth procedure is responsible for the detection of new areas with higher gradient densities, where each stage corresponds to a different threshold validated by performing a similarity check for the thresholds generated at the very beginning of the growth procedure. The seeds added due to dynamic seed addition process may include adjacent and non-adjacent seeds, and obtained at varying size criterions (10*$MSS_L$, 5*$MSS_L$, and a criterion equivalent to $MSS_L$ for all remaining seed addition thresholds) in a manner similar to initial clustering (shown in FIG. 20 (f)). Note that the multiplication factors of 10, 5 and 1 have been arbitrarily set. Similar to the size criteria for the initial clustering phase, these can be varied depending on the complexity of the image. However in general these multiplicative factors should be chosen in order decreasing magnitudes for correspondingly increasing gradient ranges, to ensure proper region formation. Preferred ranges are 10-20, 5-10 and 1-5 respectively determined based on the embodiment of the present invention's performance on 300 images. However, the preferred range may vary slightly when based upon a larger number of images. The non-adjacent seeds that are larger than the corresponding seed size criterion, based on the interval of operation, are added as parent seeds to the current seed map and the all the adjacent seeds are processed in the previously explained procedure. The seed map obtained at the end of each interval of the region growth and dynamic seed addition process, becomes the parent seed map for the next interval, displayed in FIG. 20 (g). The seed tracking method (employed in the GS method) is employed in the growth procedure for growth rate feedback, preventing seeds to overflow into regions of similar L*a*b* values but different textures. When the last growth interval has been reached, all the significantly identifiable regions would have been given a label and all remaining unsegmented areas are close to the edges of the segmented regions.

In case of natural scene images where gradient content can dramatically vary, accomplishing region growth in the aforementioned iterative procedure over the entire gamut of gradient values present in these images can be computationally intensive. To this effect, the totality of the growth procedure in the proposed algorithm is restricted to a finite number of RGIs which may span only a portion of the total gamut of gradient values in an image, but sufficient enough to segment a large portion of it. This limit on the number of RGIs was chosen based on the average percentage of total segmented image area at different resolution levels, determined utilizing 300 natural scene images provided by the University of California at Berkeley. However, the preferred range may vary slightly when based upon a larger number of images. We found that with a growth factor (i$\Delta$g defined in Section 2.3) varying from 10% to 50% obtained utilizing $1 \leq i \leq 5$ and $\Delta g = 10\%$, on an average more than 85% area of an image to be segmented, and hence constrain the growth phase to preferably a maximum of five RGIs (N=5). Furthermore, using the preferred range of values for N from 3 to 7, with $\Delta g$ varying from 5% to 30% it was found that on an average more than 75% to 95% of the image can be segmented in the region growth procedure with varying computational requirements. This constraint on the number of RGIs, results in a small portion of the image largely including regions of color transitions in the periphery of existing seeds being left unsegmented, at the conclusion of the growth procedure (as mentioned earlier). These unsegmented regions are assigned labels in a procedure known as residual region growth that involves local neighborhood-based mode filtering and morphological dilation operations. Mode filtering is a technique in which un-labeled pixel locations (i,j) surrounded by existing seeds in their respective local 3×3 neighborhood ($\beta$), are assigned the most frequently occurring label from amongst the non-zero elements of that neighborhood ($\beta_{nz}$), using a non-linear spatial mode filter ($m_f$) defined as:

$$m_f(i, j) = \begin{cases} \text{mode}(\beta_{nz}) & \text{if mode}(\beta_{nz}) \\ & \text{is unimodal} \\ \phi : \phi \in \text{mode}(\beta_{nz}) & \text{if mode}(\beta_{nz}) \\ & \text{is multimodal} \end{cases} \quad (50)$$

where, $$\beta_{nz} = \left\{ \begin{array}{c} \beta(m_1, m_2) : \beta(m_1, m_2) > 0, \\ m_1 \in [i-1, i+1], \\ m_2 \in [j-1, j+1] \end{array} \right\}.$$

In locations where the mode of $\beta_{nz}$ is not unique (multimodal), a random label assignment $\phi$ from the acquired multiple mode values is performed, as represented in Eq. (35). At this stage the pixels that remain unsegmented are the ones whose corresponding local neighborhoods do not constitute any of the existing seeds. To this effect, an iterative morphological label assignment is employed, where-in all existing seeds are repeatedly dilated using a 3×3 structuring element $\psi$ (defined previously) until there exists no unassigned pixels, to yield the final region growth map. The aforementioned constraint on the number of RGIs was chosen with the fundamental objective to reduce the computational expense incurred in the present invention. Thus, it should be noted that the region growth procedure can be employed to segment the entire image (100%) without the need for the residual region growth process. However segmenting the entire image using only the region process was found to be computationally intensive with small variations in the final results and thus the residual region growth procedure was introduced.

Progressive Region Growing utilizing Distributed Dynamic Seed Addition (DDSA)

In the region growth process discussed so far, there exists an exclusive one-to-one relationship with the seed addition procedure, which is the methodology adopted by the MAPG-SEG method only at the smallest resolution in the image pyramid (see red arrows in FIG. 16). However the true progressive and cost-effective nature of the growth procedure is accentuated at subsequent higher resolutions where Distributed Dynamic Seed Addition takes place. The DDSA procedure commences at $(k-1)^{th}$ level in a k level decomposition, after the interim segmentation of the $k^{th}$ level is passed through the seed transfer module (M4 in FIG. 16). The seed transfer module is responsible for acquiring regions of high confidence from the $k^{th}$ level segmentation at the resolution of the $(k-1)^{th}$ level.

The significance of the DDSA can be intuitively derived from the images in FIG. 21. In FIGS. 21(a) and (b), shown is the 'Cars' image and its corresponding gradient map at a resolution of 161×241 (level k–1 where k=2). The image in FIG. 21(a) is obtained by garnering all channel and size information corresponding to the $(k-1)^{th}$ level, fusing them together to give the Current Dyadic Scale (CDS) image, a process previously described. Thus, no additional computational expenses are incurred in trying to acquire the CDS image at the $(k-1)^{th}$ level. The MAPGSEG output at the smallest resolution (81×121, level k where k=2) is shown in FIG. 21(c). This is achieved after the output of Module 3 (region growing module) is combined with a texture map (Module 4) in a statistical merging procedure (Module 5), as represented in FIG. 16. The output of the seed transfer module is shown in FIG. 21(d). The seeds in FIG. 21(d) represent all regions of high confidence at the CDS which can directly be incorporated from the interim segmentation of the previous level (FIG. 21(c)), and can be considered as a-priori information for processing at the current scale. The entire protocol from the end of region growing to the segmentation output, followed by seed transfer, is present in subsequent sections.

It can be observed that the a-priori information at the CDS, shown in FIG. 21(d), includes seeds mostly in low gradient regions. Due to this reason, initial clustering discussed earlier, is not employed at the commencement of processing, at this level. Moreover if the a-priori information is considered as parent seeds for the current level, intuitively it can be observed that all the growth intervals generated for this image will not be required to segment the remaining regions using the aforementioned region growing methodology, since these unsegmented regions occupy a relatively smaller area in the image. It is based on this intuitive notion the DDSA was designed. The essence of the DDSA is to explore the possibility of utilizing some or all of the adaptively generated growth intervals directly for seed addition without having to actually having to perform region growth. In other words the aim is to identify the intervals that can be used for addition of seeds by bypassing the region growth protocol and the ones in which region growth is indispensible before any seed addition can be performed. To this effect, where seed addition is done in a dynamic and distributed framework, the procedure is known as 'Distributed Dynamic Seed Addition'.

Practically, this objective is achieved by a histogram analysis of gradient information of the CDS image (FIG. 21(b)) and the gradient values of all unsegmented regions that are derived after padding the high confidence seeds in the CDS gradient map (shown in FIG. 21(e)). In FIG. 22(a) shown are the gradient histogram plots of FIG. 21(b) (blue curve) versus the histogram of unpadded pixels in FIG. 21(e), along with the generated threshold intervals, shown as magenta and yellow markers.

In FIG. 22(a) at each gradient value, the drop in number of pixels indicated by the difference of a point on the blue curve to its counterpart on the green curve corresponds to the number high confidence pixels possessing that gradient value. Thus the shaded region in red signifies gradient values of all high confidence pixels, and the gradient range of all a-priori seeds are from zero to the point of intersection of the two curves. Furthermore observe that the behavior of the two curves is the same in the latter half of the histogram suggesting that all strong gradient regions have remained unclassified. Since most pixels with low gradient values are already assigned labels, performing the region growth procedure in the low gradient threshold intervals is bound not to bring about any significant change in the area covered by the existent seeds yielding extravagant computations with little contribution towards the final segmentation result. Consequently, the point of intersection of the two curves can be utilized as a decision boundary for classifying intervals that will be of any significance during region growth. The threshold intervals below the intersection point were considered for seed addition without region growth and the intervals above the intersection point were subjected to the region growth procedure followed by seed addition.

On the other hand, due to the diverse nature of natural images this consideration can yield contrasting results, illustrated by FIGS. 22(b) and (c) which are the zoomed versions of the histograms shown in FIG. 22(a). It can be seen that that the curves do not intersect with each other until a gradient value of 108 towards the end of the histogram (0% difference line in FIG. 23(a)), is reached. In such a scenario utilizing the exact intersection point as the decision boundary for classifying seed addition thresholds prior to region growth, will result in a large number of minute seeds, increasing the computational overhead for region growing and merging. Thus instead of searching for an exact intersecting point to classify these threshold intervals, the search is for a decision threshold confined to the interval ranging from a gradient value 0 to a gradient value corresponding to 0.01% (preferred range of 0.001% to 0.1%) of the maximum difference value of the two histogram curves as seen in FIG. 23(a). In addition the difference curve (a-priori information gradient histogram) between the blue and green histogram curves is utilized to a find a suitable decision boundary for classifying thresholds. Note that the value of 0.01% of maximum difference is considered as a simulated point of intersection for the two curves.

The zero crossing point between the histogram curve of the segmented (red) and unsegmented pixels (green), was chosen to be a suitable threshold to distinguish among intervals which can be used for seed addition with and without region growing. To ensure that the correct decision threshold is being used the consistency in zero-crossing was also checked, as can be seen in FIG. 23(b). From FIG. 23(a) it can be seen that the intersection point between the red and green curves (shown as a black marker at a gradient value of 22) determines the maximum range within which there is a significant change in the number of pixels per gradient value, or the range of gradient values which contain a large portion of a-priori seeds, and is the ideal range that can be used for adding seeds of significant sizes without loss in visible gradient detail. For images where this decision boundary (Decision boundary 1 in FIG. 23(a)) yields no significant seeds, the threshold corresponding to 0.01% of maximum difference is utilized to find any significant seeds without merging discernible gradient information (Decision boundary 2 in FIG. 23(a)), not used at the current level for this image). All threshold intervals beyond 0.01% of the maximum difference gradient value are utilized in the previously mentioned sequential region growth procedure. Observe that though the number of unsegmented pixels in the intervals of high gradient is lesser in comparison to ones in low gradient ranges, the gradual increment of seed area due to region growth in the high gradient range is required to be able to segment regions without merging edge information, which is required in low gradient ranges.

The performance advantage of the DDSA can be seen in FIG. 24. The region growth intervals for the 'Cars' image constitute threshold values of 12, 15, 21, 36 and 54 (yellow markers in FIG. 23(a)). The point of intersection of segmented and unsegmented pixels, or the decision boundary for classifying thresholds as mentioned previously was obtained to be at a gradient value of 22. Therefore, for this image at level 1 the thresholds suitable for seed addition without the need for region growth were chosen to be 12, 15 and 21, while the intervals from 21-36 and 36-54 were chosen for region growth. The agglomeration of seed generated at 12, 15, and 21 is shown FIG. 24(a). In this seed map it can be seen that all seeds are of decent size and cover a significant portion of the unsegmented image area in low gradient regions. On the other hand observe that in FIG. 24(c) the seeds generated at all growth intervals (12, 15, 21, 36 and 54) include a whole number of minute seeds which in addition to the growth process will hinder the performance of the region merging module, also designed in an iterative format. Incidentally, seeds of 24(a) are generated as a result of the controlled decision making, and FIG. 24(c) would result if the decision boundary was chosen to be the exact point of intersection of the two curves. This illustrates the advantage of choosing Decision boundary 1 over the exact point of intersection, as the former is a good compromise between the regions that are directly assigned labels and the ones that are grown, such that the overall computational effort is minimal. FIGS. 24(b) and (d) represent the seed map after the initial phase of seed addition and prior to region growing, corresponding to FIGS. 24(a) and (c) respectively.

Clear advantages of the controlled threshold section for progressive region growing can be seen by observing the images presented in FIG. 25. In FIGS. 25 (a) and (b), shown is the 'Cars' image and its corresponding gradient map at a resolution of 321×481 (level k−2 where k=2). The MAPGSEG interim output at level 1 (161×241) is shown in FIG. 25(c). The a-priori information for the CDS is shown in FIG. 25(d). It can be observed that most areas of the image have been assigned a region and the ones close to strong gradient content are unassigned. Here again the previous discussed histogram analysis is performed utilizing FIG. 25(b) and unpadded areas of FIG. 25(e). A histogram comparison of the two is portrayed in FIG. 26. As shown the histogram curve in green reflects a gradient map in which most areas have already been segmented which results in the decision criterion (Decision boundary 1 at gradient value 60) to choose all the growth intervals (12, 15, 21, 36 and 54) only of pre-growth seed addition. Thus for the CDS no region growth is performed bringing about significant improvement in runtime of the method, owing to the iterative nature of the growth procedure. The seed generated due to all growth intervals in the unassigned regions are shown in FIG. 25(f). FIG. 25(g) represents the seed map after the pre-growth seed addition process which is directly led to the merging module. Thus it can be seen that as the MAPGSEG method traverses from one resolution to another, the region growth procedure is performed in progressively increasing threshold intervals. In addition, as the method navigates across resolutions, the DDSA procedure is dispensed with more responsibility while the growth procedure becomes discretionary, to the extent that it may be completely bypassed as seen in the example of the 'Cars' image. Moreover this controlled mechanism of thresholding enables the method to work efficiently without a seed tracking method, thus compensating for it at all dyadic scales other than the smallest one.

TABLE 2

MAPGSEG THRESHOLD SELECTION FOR A TWO LEVEL DECOMPOSITION ('CARS' IMAGE)

| Level (Resolution) | Thresholds/Intervals | | |
| --- | --- | --- | --- |
|  | 2 (81 × 121) | 1 (161 × 241) | 0 (321 × 481) |
| Initial Clustering | 5, 10 | None | None |
| Pre-Growth Seed Addition | None | 12, 15, 21 | 12, 15, 21, 36, 54 |
| Region Growth Intervals | 12, 15, 21, 36, 54 | 36, 54 | None |
| Post-Growth Seed Addition | 12, 15, 21, 36, 54 | 36, 54 | None |

Table 2 summarizes the functionality of the adaptively generated thresholds at various scales of the 'Cars' image. The progressive nature of the region growth procedure can be clearly observed in Table 2, where sequential growth takes place at level 0 and in doing so employing all growth intervals. At level 1 the growth procedure shift to the higher gradient content and finally at the highest resolution is not employed at all because of the absence of any significant unsegmented pixels so as to take full advantage of region growing. However for most images the MAPGSEG operates in a threshold range that covers regions of significant area in comparison to the image resolution, thus leaving all strong gradient regions unsegmented, as shown FIG. 27.

In FIGS. 27 (a) and (b), the seed maps at the end of the region growth procedure for level 1 and level 0 respectively, are shown. It can be observed that high gradient or strong edge regions are consistently unsegmented due to the previously mentioned reasons. Since strong gradient regions occupy a very small area of the image these regions are assigned with labels pre-existing in the seed map at the end of the growth procedure. In order to achieve this objective with minimal computational costs the MAPGSEG method performs a combination of neighborhood and iterative morphological label assignment. Neighborhood label assignment is the process by which unassigned pixels are assigned to the label having the maximum count in its 3×3 neighborhood using a non-linear spatial filtering technique discussed in the seed transfer module subsection. The results of this procedure are shown in FIGS. 27 (c) and (d), corresponding to FIGS. 27 (a) and (b) respectively. However neighborhood label assignment alone is not sufficient to label pixels encompassed by 0's (all zero neighborhoods). Thus the results of FIGS. 27(c) and (d) are subjected to iterative morphological label assignment, where all seeds are dilated in an iterative fashion using a 3×3 a structuring element until there exists no unassigned pixel. The result of this operation for level 1 and level 0 are shown in FIGS. 27 (e) and (f). Thus at the end of morphological label assignment all pixels in the image would have received a label. This post region growth processing is much more computationally efficient than method utilized in the GS algorithm where a major portion of the sequential growth procedure is repeatedly carried out assigning each unsegmented pixel to the most occurring parent in its neighborhood. In addition since the region growth map of the GS method comprises much larger number of segments than the MAPGSEG method, for most images, the computational costs required to perform parent based label assignment was huge. The region growth map before and after unassigned residual pixel label assignment for the 'Cars' image using the GS method is shown in FIGS. 27(g) and (h). In these two images it is seen that the results of the region growth procedure employed in the GS algorithm is much more over-segmented than in case of the MAPGSEG where the output of the growth procedure is close representation of the eventual segmentation. This is primarily due to the use of uniform L*a*b* and a flexible and efficient adaptive threshold generation scheme.

Seed Transfer Using Gradient Quantization Based Confidence Map

Figure 28:
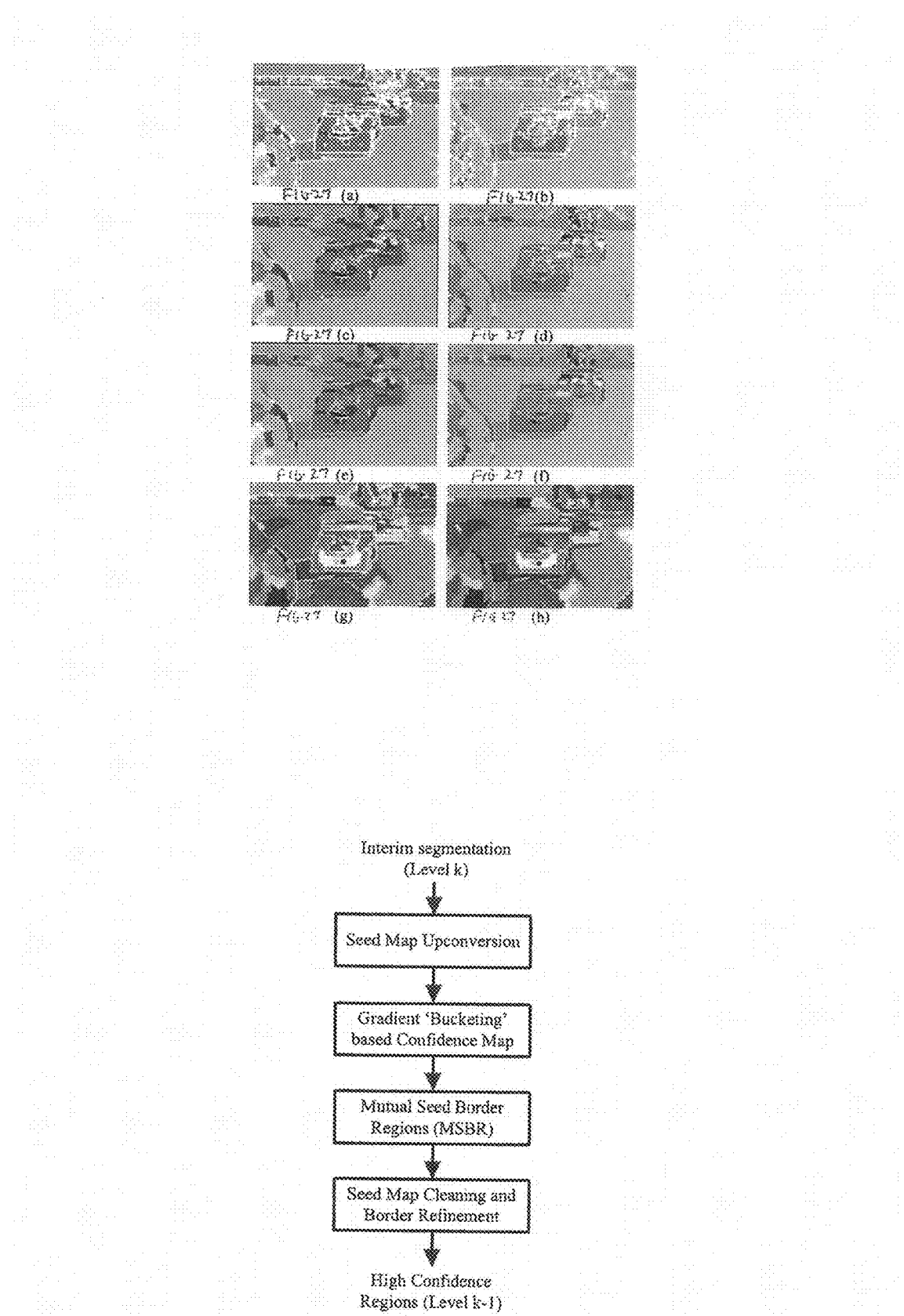
FIG. 28 is a flow chart of a method for multiresolution seed transfer.

The seed transfer module can be deemed as an interface for information transfer from one resolution to another in the MAPGSEG method. This module (M4 as seen in FIGS. 5 and 16) is responsible for identifying transferable regions between resolutions by exploiting the interim segmentation outputs as a-priori information, and acquiring regions of high confidence from the $k^{th}$ level segmentation at the resolution of the $(k-1)^{th}$ level. A block diagram illustrating all constituents requisite for multiresolution seed transfer is shown in FIG. 28. The interface functionality of the module can be observed from the input/output relationship, where the input is at the $k^{th}$ level and the processing culminates in the $(k-1)^{th}$ level, as seen in FIG. 28.

Figure 29:
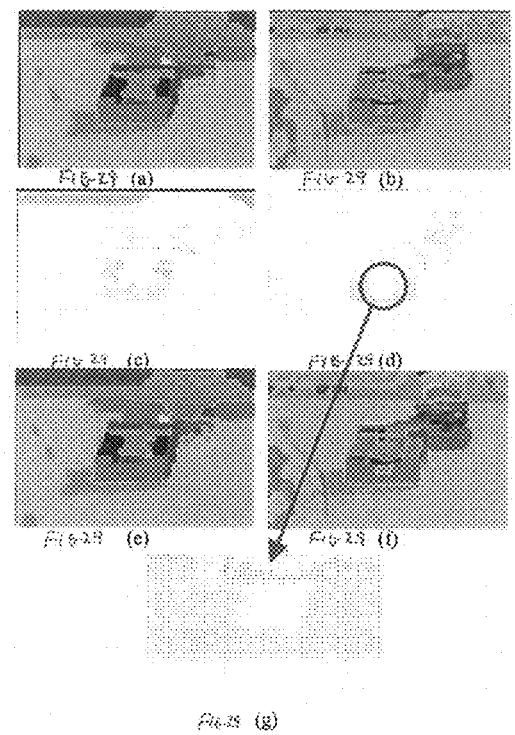
FIG. 29(a) is an image of interim output at Level 2.
FIG. 29(b) is an image of interim output at Level 1.
FIG. 29(c) is an image of zero insertion yielding at Level 1.
FIG. 29(d) is an image of zero insertion yielding at Level 0.
FIG. 29(e) is an image of neighborhood label assignment at Level 1.
FIG. 29(f) is an image of neighborhood label assignment at Level 0.
FIG. 29(g) is a zoomed in portion of the result obtained after zero insertion.

This module is initiated by a seed map up conversion of the $k^{th}$ level segmentation to the resolution of the $(k-1)^{th}$ level. This step is necessary to ensure that the data transferred is in perfect alliance with the next higher resolution. To this effect, we first up sample the interim segmentation at $k^{th}$ level by a factor of two along each dimension thus transmuting it to the subsequent higher dyadic resolution. The up conversion process is a two step method including zero's insertion followed by neighborhood pixel assignment. Zero's insertion involves inserting zero's between every pixel along both dimensions such that an M×N scale is transmuted to a (2*M)×(2*N) scale. In FIGS. 29 (a) and (b) the interim segmentations acquired at level 2 and level 1, are respectively shown. The results at resolutions of 81×121 and 161×241 when subjected to zero insertion are transformed to resolutions 161×241 (level 1) and 321×481(level 0), displayed in FIGS. 29 (c) and (d). To overcome viewing limitations an encircled portion of the result obtained after zero insertion has been zoomed in and shown in FIG. 29 (g). Having obtained the zero inserted images these are now subjected to neighborhood pixel assignment utilizing neighborhood based mode filtering in a manner described previously.

In addition this filter is applied only to the neighborhoods whose center pixel is zero, which from the aforementioned discussion is M×N numbered in a (2*M)×(2*N) scale image. The result of the aforementioned non-linear spatial filtering operation on the images presented in FIGS. 29 (c), (d), is shown in FIGS. 29 (e) and (f) respectively. These two images represent the a-priori information for their corresponding dyadic scales. In addition the a-priori information can be considered to be the estimates of the segmentation output at the current scale.

Gradient Quantization

Gradient quantization is required to determine the pixels in the estimated seed map that are acceptable with high confidence, and be passed on as a-priori information for an arbitrary decomposition level. In general when an image is decomposed to certain number of levels, flat regions can be segmented with relative ease even at lowest scale in comparison to strong gradient regions. This is due to the fact they have not undergone much change in gradient content, but it is just their size that has decreased. However, in case of strong gradient regions decomposition results in loss of information content of these regions and so cannot be segmented with the same ease as done on the full resolution image. The MAPGSEG method is designed to exploit this gradient characteristic for facilitating seed transfer. Thus, the gradient map is quantized at every dyadic scale to differentiate between high and low confidence pixels at that scale. The gradient quantization levels are chosen to be the adaptively generated threshold intervals, obtained at the commencement of the MAPGSEG method. The quantized gradient map combined with varying size criterions (discussed later in the seed map cleaning procedure) is utilized to derive a-priori information at a certain decomposition level.

Figure 30:
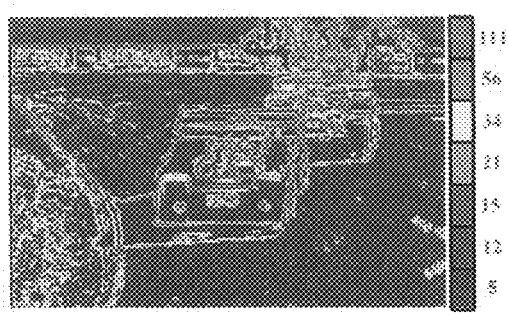
FIG. 30 is a quantized gradient map at Level 1 (161×241)
Figure 31:
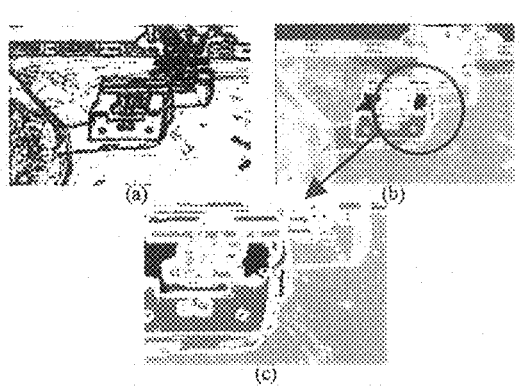
FIG. 31(a) is a logical map of high confidence pixel locations corresponding to quantization levels 5 and 12 at a Level 1.
FIG. 31(b) is a color map of high confidence pixel locations corresponding to quantization levels 5 and 12 at a Level 1.
FIG. 31(c) is a zoomed in version of the circular region shown in FIG. 31(b)

A quantized gradient map utilizing the initial threshold ($\lambda$=5), growth intervals at (12, 15, 21, 34, 56), as well the maximum gradient value in the histogram (111), is shown in FIG. 30. Based on the previous discussion, for low scales (e.g. level 1 for the 'Cars' image), pixels within low gradient quantization levels (5,12) are chosen as potential high confidence regions. When we move to the next higher scale (level 0), higher quantization intervals (15, 21) including the ones utilized in prior scales (5, 12) are chosen as confident a-priori information. In addition since the number of decomposition levels may not be equal to the number of quantization levels, the increment in the number high confidence intervals is varied depending on the number of decomposition levels, such that, apart from strong gradient regions, most low gradient regions shown up as a-priori information at the highest scale. For the gradient confidence map with 7 quantization levels shown in FIG. 30 the quantization levels are incremented in steps of 2 so as to distribute low gradient intervals evenly for levels 1 and level 0. (Note the level 2 the smallest resolution has no a-priori information associated with it). In FIG. 31(a) and (b) a logical map and corresponding labeled color map portraying high confidence pixel locations obtained at level 1 utilizing the two lowest quantization intervals (5 and 12), are shown respectively. The labeled color map was obtained after point wise multiplication of the estimated segmentation map (FIG. 29(e)) and the logical map shown (FIG. 31 (a)). Clearly, it can be observed that these quantization intervals have covered signification image area. Since the quantization intervals are low valued, the regions shown in FIG. 31(b) can be deemed as information that can be passed on to the processing at the current resolution with no loss in gradient detail, thus reducing the computational requirements for segmentation at the current level. However observe that pixel based confidence results in numerous minute seeds which are isolated as well as mutually adjacent to larger existent seeds as shown in FIG. 31(c). These minute seeds cannot be passed on as a-priori information as they would result in high computation requirements. Due to this reason they are eliminated from the labeled color map of high confidence pixels, a process referred to as seed map cleaning.

Mutual Seed Border Regions (MSBR)

The removal of minute seeds cannot be done by connected component analysis as it would only result in partial elimination of these seeds and simultaneously merge mutually adjacent ones, giving an undesired result. Therefore in order to be able to efficiently clean up all isolated as well as mutually adjacent seeds we proceed to determine the Mutual adjacent Seed Border Regions (MSBR). MSBR is defined as all those pixels that are common to two regions that are labeled differently. These regions are obtained through non-linear spatial filtering in the MAPGSEG method. The advantage of using nonlinear spatial filters is that it gives information in the image without actually manipulating individual pixel values.

Given a labeled seed map for facilitating the calculation of MSBR first all pixel neighborhoods containing having multiple labels including 0 are identified. This is done by differencing each pixel in a neighborhood from its adjacent value and finding the total difference. If this value is 0 then all pixels have the same value (in the neighborhood) else their labels differ. Having obtained all such neighborhoods a validation matrix (V) is generated, given by $$v = \sum_{(i,j) \in \beta} |h(i, j) - \sqrt{h(i, j) * \text{mean}(\beta)}| \qquad (51)$$

where $\beta$ is the 3×3 neighborhood being operated and h is the map comprising high confidence pixel locations. This validation matrix is required to segregate neighborhoods comprising multiple labels but having unique nonzero labels and the ones having multiple nonzero labels. Assume that V is being computed in a unique nonzero neighborhood $\beta$. In such a scenario the mean $\beta$ of will be equivalent to the nonzero label itself resulting in V for $\beta$ being 0. Similarly for multiple nonzero labels V>0 is obtain. Thus, in this particular example MSBR is defined as $$MSBR = \begin{cases} 1 & \text{if } V > 0 \\ 0 & \text{otherwise.} \end{cases} \qquad (52)$$

The MSBR for the high confidence pixels map at level 1 (FIG. 32 (*a*)) is shown in FIG. 32 (*b*). This logical map comprises 0's and 1's where a pixel having a value of 1 signifies that it is a part of an MSBR and vice versa.

Seed Map Cleaning and Border Refinement

The MSBR computation is followed by its elimination from high confidence pixels map, resulting in all seeds being independent, sharing no common border, as shown in FIG. 32(*c*). This map with all independent seeds is subjected to connected component analysis to find all large seeds. A size criterion is placed to achieve this objective, and is unique for every scale. Starting from the (k−1)$^{th}$ level, the size criterions for connected component analysis is varied as 10*MSS$_L$, 5*MSS$_L$, and a criterion equivalent to MSS$_L$ (dynamic seed addition size criterions) for all remaining scales, where each scale corresponds to certain gradient quantization levels to determine high confidence seeds. Note that the multiplication factors of 10, 5 and 1 have been arbitrarily set. Similar to the size criteria for the initial clustering as well as the progressive region growth and distributed dynamic seed addition phase, these can be varied depending on the complexity of the image. However in general these multiplicative factors should be chosen in order decreasing magnitudes for correspondingly increasing gradient ranges, to ensure proper region formation. Preferred ranges are 10-20, 5-10 and 1-5 respectively determined based on the embodiment of the present invention's performance on 300 images. However, the preferred range may vary slightly when based upon a larger number of images. The result of employing connected component analysis is shown in FIG. 32(*d*). From this figure it can be seen that all minute isolated and adjacent seeds that were earlier part of the seed map are no longer present. Although the aforementioned seed map cleaning procedure help eliminating all minute seeds, the large seeds that are present in the seed map have borders that are coarse in nature, due to MSBR removal.

The border refinement procedure is responsible for finding all MSBR that have labels present in the map including large seeds, after subjecting it through the seed map cleaning protocol. These borders in turn are added back to large seeds map (FIG. 32(*d*)) to acquire seeds with smoother borders. Border refinement is a four step procedure. Initially all large seeds borders are extracted morphologically, as discussed earlier (shown in FIG. 32(*e*)). In addition all MSBR labels are obtained by performing a point wise multiplication of the MSBR map with the map including all high confidence pixels. (FIG. 32(*a*)). The resultant MSBR labels are shown in FIG. 32(*f*). The labels in the FIG. 32 (*f*) that are adjacent members of the large seeds (FIG. 32(*d*)) are obtained by a point wise multiplication of large seed parent borders and MSBR labels, and the result is presented in FIG. 32(*g*). These labels adjacent to large seeds are now added to the large seeds map to acquire smooth region borders, displayed in FIG. 32(*h*).

The border refinement procedure is the culmination point of the seed transfer module (see FIG. 28). The map obtained at the end of border refinement is considered to the a-priori information for the current dyadic scale at which most seed transfer processing is done. The following section will briefly discuss Module 5 and Module 6.

Texture Channel Generation

In case of natural scene imagery, the segmentation task is often hampered by the presence of regions/patterns composed of multiple shades of colors or intensity variations due to surface/material properties like density, gradient, coarseness, directionality and the like. Such regions/patterns are referred to as 'textures' and are broadly classified into structured and stochastic types, in the image understanding domain. Structured textures are often man-made and have regularity in their appearance, such as a brick wall, interwoven fiber, etc., while stochastic textures are natural and are completely random patterns, such as leopard skin, tree bark, grass, etc. Due to the extensive presence of such patterns in natural scene images the MAPGSEG algorithm has been equipped with a texture characterization module (M5 in FIG. 5), which characterizes different textures at various scales, in terms of the average information provided by intensity variations present in distinct image regions.

A fundamental principle in information theory is based on the hypothesis that the presence of information can be modeled as a probabilistic process, and that the amount of information contained in a random event is inversely proportional to the probability of the occurrence of that event. Thus, if $\{x_1, x_2, \ldots, x_j\}$ are a set of random gray levels present in an image, and $\{P(x_1), P(x_2), \ldots, P(x_j)\}$ are the corresponding probabilities of occurrences of each of these gray levels, an arbitrary gray level $\{x_i\}$ from the set is said to contain:

$$I(x_i) = \log_2 \frac{1}{P(x_i)} = -\log_2 P(x_i) \qquad (53)$$

binary units or bits of information when the base of the logarithm is 2. Furthermore, for an image comprising of k pixels, the law of large numbers states that a gray level $\{x_i\}$ exists on average of $kP(x_i)$ times. Consequently, the total information content (I) in these k pixels, whose intensity values is modeled as a discrete random variable X, is given by:

$$I(X) = -kP(x_1)\log_2 P(x_1) - kP(x_2)\log_2 P(x_2) \ldots - \qquad (54)$$

$$kP(x_J)\log_2 P(x_J)$$

$$= -k\sum_{i=1}^{J} P(x_i)\log_2 P(x_i)$$

Therefore, the average information content per pixel is given by:

$$H(X) = -\sum_{i=1}^{J} P(x_i)\log_2 P(x_i). \qquad (55)$$

Apart from information content, the quantity H(X) also symbolizes the degree of randomness present in the image, and is popularly known as entropy. The entropy calculation in Eq. (55) defined for a single random variable (single channel gray image) can be extended to multiple random variables X, Y, Z (three channel color image) by computing the joint entropy, defined as:

$$H(X, Y, Z) = -\sum_{i}\sum_{j}\sum_{k} P(x_i, y_j, z_k)\log_2 P(x_i, y_j, z_k) \qquad (56)$$

However in order to achieve computational efficiency by avoiding joint entropy calculation between channels, quantization is done by uniformly dividing the 8-bit encoded L*a*b* cube into small boxes, and mapping all information that fall within each box to the color and luminance value at the center of that box (see FIG. 33). The advantage of quantizing the L*a*b* cube over the RGB color cube is that, unlike uniform L*a*b* data, if nonuniform RGB data is uniformly quantized, a constant distance between and any two quantization levels will result in large variation of perceptual color difference (Chou et al., "Embedding Color Watermarks in Color Images," *EURASIP Journal on Applied Signal Processing* 2003(1): 32-40 (2003), which is hereby incorporated by reference in its entirety). After the quantization process, each pixel of an image can be indexed to one of the 216 representative levels, effectively reducing the probability of each level occurring to a one-dimensional random variable. The total number of representative colors was arbitrarily set at 216. This parameter can be varied depending on the "color" complexity of the image, which is the number of different colors present in an image and its associated variations. However in general the number of quantization levels is chosen in manner so as to approximately divide the 3-dimensional color cube evenly. In the case of 216 representative colors, each dimension of the color cube is quantized to 6 different colors/levels. Similarly typical/preferred number of 125, 343, and 512 representative colors can be achieved by quantizing each dimension of the color cube into 5, 7 and 8 different colors respectively. To create a texture channel, the local entropy is computed in a 9-by-9 neighborhood around each pixel of the indexed image, and the resulting value is assigned to the center pixel of the neighborhood. Other neighborhoods can also be chosen with a preferred range varying from 5×5 to 13×13 for achieving optimal results. This model of texture is then utilized in the region merging process.

Region Merging

The progressive region growth procedure involving distributed dynamic seed addition, described in previously, was performed primarily based on the similarity of L*a*b* data between image regions. Consequently, the region growth map obtained at the end of this procedure at an arbitrary scale, in general comprises of over-segmented image regions due to illumination variations, occlusions, texture disparities etc. Thus, we employ a region merging module (M6 in FIG. 5) that fuses color and texture information at different resolution levels, to merge oversegmented regions as deemed necessary, yielding interim segmentations at low resolutions, and the final segmentation output at the highest resolution. However in order to facilitate the aforementioned task, a multivariate analysis of all independent regions utilizing their corresponding L*, a*, b* and texture information, is carried out based on the procedure described in the W. J. Krzanowski, *Principles of Multivariate Analysis*. Oxford University Press, chapter 11 (1988), which is hereby incorporated by reference in its entirety. The essence of this method is to investigate the possibility that multiple groups/regions with various features can be associated with a single factor that enables them to be merged together.

As mentioned previously the region merging module is integrated with the MANOVA procedure, to analyze data associated with each group in the region growth map (generated previously), to produce output segmentations that are spatially and spectrally coherent with the content of image being segmented. Consequently, to facilitate the aforementioned MANOVA-based region merging methodology, at the commencement of processing in this module, the L*, a*, b* and texture data associated with each group in the region growth map are vectorized and concatenated to matrix of dimensions equivalent to the total number of pixels in the image and number of variables (L*, a*, b*, texture) per pixel. The result matrix is employed in the MANOVA procedure involving the Mahalanobis distance (or similarity value) calculation between all possible group pairs, to identify and merge groups with similar characteristics.

The merging process is commenced by identifying the pair of groups with the minimum Mahalanobis distance, signifying the maximum similarity. However in order to reduce the number of iterations of the merging protocol for computational efficiency, by avoiding the merging of only a single group pair per iteration, the obtained distance value between the two most similar groups is gradually increased until a larger set of similar groups pairs (empirically set at five) are obtained. Subsequently, the acquired group pairs are merged with each other from the most similar group pair of the set, to the least similar one, eventually concluding a single iteration of the merging process. Following this, the Mahalanobis distances is recomputed for the all possible group pairs comprised in the new segmentation map, and the process is repeated until either a desired number of groups is achieved or the smallest distance between groups is larger than a certain threshold between two arbitrary groups. These termination criterions ensure that that all images displayed a similar level of segmentation, and were empirically chosen to be 40 and 4 respectively. However these could be varied depending on the application for which this algorithm is being used as well as image complexity, with preferred ranges being 30-60 and 2-4 respectively, for natural scene images.

The MAPGSEG results were benchmarked qualitatively and quantitatively—using the Normalized Probabilistic Rand index (NPR) (Unnikrishnan et al., "Toward Objective Evaluation of image Segmentation Methods," *IEEE Transactions on Pattern Analysis and Machine Intelligence*, 29(6):929-944

(2007), which is hereby incorporated by reference in its entirety)—against several popular methods on the same test bed of manually segmented images (ground truths). The results were compared against those from a spectrum of published segmentation methods such as GRF (Saber et al., "Fusion of Color and Edge Information for improved Segmentation and Edge Linking," *Image and Vision Computing* 15(10):769-780 (1997), which is hereby incorporated by reference in its entirety), JSEG (Deng et al., "Unsupervised Segmentation of Color-Texture Regions in Images and Video," *IEEE Transactions on Pattern Analysis and Machine Intelligence*, 23(8):800-810 (2001), which is hereby incorporated by reference in its entirety), DCGT (Balasubramanian et al., "Unsupervised Color Image Segmentation by Dynamic Color Gradient Thresholding" *Proceedings of SPIE/IS&T Electronic Imaging Symposium* (2008); Garcia et al., "Automatic Color Image Segmentation by Dynamic Region Growth and Multimodal Merging of Color and Texture Information", *International Conference on Acoustics, Speech and Signal Processing*, Las Vegas, Nev. (2008), which are hereby incorporated by reference in their entirety), and a computational time analysis was also performed to furnish a fair indication of the overall performance of the MAPGSEG method. The NPR index requires a set of images each having multiple manual segmentations, for evaluation. Such a set, comprising 1633 manual segmentations for 300 images of dimension~321×481, created by 30 human subjects, has been made publicly available by the University of California at Berkeley (Martin et al., "A Database of Human Segmented Natural Images and Its Application to Evaluating Segmentation Methods and Measuring Ecological Statistics," in *IEEE International Conference on Computer Vision* Vol. 2:416-423, Vancouver, BC, Canada (2001), which is hereby incorporated by reference in its entirety). An additional 445 images with dimension~750×1200 were also utilized for accessing the performance of the MPGSEG against its single scale version. The entire testing database (745 images) was segmented on the same machine having a Pentium® 4 CPU 3.20 GHz, and 3.00 GB of RAM. The GRF, DCGT and GS methods were run from the executable files and MATLAB code provided by the Rochester Institute of Technology, while the JSEG method was run from a different executable file provided by the University of California at Santa Barbara. The proposed method was implemented using MATLAB version R2007a.

EXAMPLES

Example 1

The results of the MAPGSEG method for the 'starfish' image at different stages are presented in FIGS. 34(a)-34(e). These results have been obtained using the following steps:

Step 1:

The input RGB image namely 'starfish' is first subjected to processing in module 1. The processing in this module commences in a color space conversion from RGB to CIEL*a*b* in a manner described in Green et al., *Color Engineering*, John Wiley and Sons Ltd. (2002), which is hereby incorporated by reference in its entirety, and using Eqs. (27) to (29), as described in [0224] and [0225].

Step 2:

Using the resultant L*a*b*data, the magnitude of the gradient of the full resolution color image field is calculated using the procedure described in Lee et al., "Detecting Boundaries in a Vector Field," *IEEE Transactions on Signal Processing* 39(5):1181-1194 (1991), which is hereby incorporated by reference in its entirety.

Step 3:

Following this, using initialization thresholds of $\lambda=5$ and $\lambda+5=10$, as well as number of RGIs N=5, with $\Delta g=10\%$ the threshold values required for segmentation are determined adaptively utilizing Eq. 45, as described in [0226] to [0234]. These values were obtained to be 12, 15, 21, 30, and 45 for the aforementioned starfish image. The same thresholds were utilized for segmenting the input image at all resolutions.

Step 4:

Having obtained the segmentation thresholds in step 3 the full resolution RGB image is subjected to a dyadic wavelet decomposition (module 2) using the Daubechies (9, 7) biorthogonal wavelet analysis coefficients, summarized in Table 1. The number of decomposition levels was determined using the desired dimension D=128 as well as the image dimensions of 321×481, in accordance with the procedure described in [0235]. For this particular example 2-level decomposition was performed.

Step 5:

Starting at the smallest resolution (L=2 of dimensions 81×121), the initial clustering phase is performed using the procedure described in [0237] to [0238]. Initialization thresholds of $\lambda=5$ and $\lambda+5=10$, as well as a Minimum Seed Size ($MSS_{L=2}$) criterion of 3 pixels is utilized for this purpose to eventually generate a Parent Seeds (PSs) map. As mentioned in [0238] the size of the Parent seeds were restricted to 50*MSS and 25*MSS for $\lambda=5$ and $\lambda+5=10$ respectively. Consequently these criteria were obtained to be 150 and 75 pixels, respectively.

Step 6:

The resultant initial seeds map is subjected through a region growth process (module 3) described in [0239] to [0257]. This procedure facilitates the growth of the existent parent seeds as well as the addition of new seeds in unsegmented regions at distinct stages of region processing. The growth of existent parent seeds was done by merging of child seeds to them using a color distance threshold of 60. In addition the region size criteria for the five RGIs, set at 10*MSS, 5*MSS, MSS, MSS and MSS, was obtained to be 30, 15, 3, 3 and 3 pixels, respectively.

Step 7:

Having completed the region growth process, a texture information channel (module 5) was computed using the procedure described in [0269] to [0271]. More specifically the color converted image in the L*a*b* color space was first quantized to 216 different colors and the result indexed/quantized map was employed in a local neighborhood based entropy calculation using Eq. (55) in a 9×9 window around every pixel in the image.

Step 8:

The acquired texture information, along with the L*a*b* information and the region growth map acquired in module 3, are engaged in region merging procedure (module 6) described in [0272] to [0274]. Furthermore this region merging process is based a statistical procedure known as the Multivariate ANalysis Of Variance (MANOVA) described in [0217]. In performing the aforementioned process the maximum similarity value for region merging was set at 4 while the maximum number of groups in the output segmentation (MaxNg) was set at 40.

Step 9:

The output of the region merging module yields an interim segmentation map at the smallest resolution (L=2 for this example). This interim segmentation is subjected through a multiresolution seed transfer process (module 4), described in [0258] to [0268], to identify seeds/regions transferable from the current resolution (L=2) to the subsequent higher resolution (L=1).

Step 10:

Having identified seeds transferable from the current resolution (L=2) to the subsequent higher resolution (L=1), excepting steps 3, 4 and 5 all the remaining steps (1, 2, 6, 7, 8, 9, and 10) are repeated for the image at resolution level L=1 of dimensions 161×241, to arrive at an interim segmentation at resolution level L=1. The only parametric change for this resolution level is that a Minimum Seed Size ($MSS_{L=1}$) criterion of 7 pixels is utilized for processing various steps.

Step 11:

Having obtained at interim segmentation at resolution level L=1 and identified seeds transferable from the current resolution (L=1) to the subsequent higher resolution (L=0), excepting steps 3, 4 and 5 all the remaining steps (1, 2, 6, 7, 8, 9, and 10) are repeated for the image at resolution level L=0 of dimensions 321×481, to arrive at a final segmentation result at resolution level L=0. The only parametric change for this resolution level is that a Minimum Seed Size ($MSS_{L=0}$) criterion of 15 pixels is utilized for processing various steps.

The input image pyramid (see FIG. 15) obtained after color conversion to CIE L*a*b*, is shown in FIG. 34(a). The outcome of gradient computation on the color converted input images at various resolutions, is shown in FIG. 34(b). The seed maps at the end of the region growth procedure, obtained utilizing thresholds that are generated adaptively, are displayed in FIG. 34(c). Observe that these region growth maps are oversegmented, due to reasons specified in Section IIIE. The texture channels generated (at various scales) using color quantization and local entropy calculation are depicted in FIG. 34(d). Finally, the interim and final segmentation maps at the end of the region merging method are shown in FIG. 34(e).

In addition, FIG. 35 demonstrates the multiresolution seed transfer procedure in the MAPGSEG frame work. The level 2 segmentation result of the 'Star fish' image and its up converted version to level 1 are shown in FIGS. 35(a) and (b) respectively. This up-converted seed map is the estimate of the segmentation result at level 1. This estimate is passed through the seed transfer module to give the a-priori information for level 1, as shown in FIG. 35 (c). Utilizing this a-priori information the method arrives at an interim result at level 1 (shown in FIG. 35(d)). The aforementioned procedure is repeated at level 0 as shown in FIGS. 35(e), (g).

Clear performance advantages of the MAPGSEG method can be viewed in FIGS. 34 and 35. In FIG. 34(b) the increase in gradient detail from the lowest to the highest resolution is visible, which supports selecting flat regions at low gradient quantization levels and vice versa. As a result large flat regions can be segmented at the lowest resolution, up scaled to the size of the input image, and in turn be used for various applications. The ability of the MAPGSEG method to fulfill all these functionalities projects it as a potential performance enhancement tool in any application it is used. In addition, it can be observed that the seed maps obtained at end of the region growth procedure improves with each higher scale to the extent that at the highest resolution it is a close representation of the eventual segmentation. This signifies lesser work to the region merging method at successive scales rendering the method to be more computational efficient than its single scale version (the Gradient Segmentation (GS) algorithm).

Example 2

Results obtained from the MAPGSEG method in comparison to the previously mentioned segmentation methods, are shown in FIGS. 36-40. The 'Church' image in FIG. 36(a) represents a moderately complex image. Observed that in FIGS. 36(b), (c), (d), (e) the GRF, JSEG, DCGT and GS methods over segment this image (sky and dome regions) due to illumination disparity seen in various regions. However, the MAPGSEG in FIG. 36(f) method employs the CIE L*a*b* color space where the L* channel contains the luminance information in the image, incapacitates the illumination problem. These results have been obtained using the following steps:

Step 1:

The input RGB image namely 'Church' is first subjected to processing in module 1. The processing in this module commences in a color space conversion from RGB to CIEL*a*b* in a manner described in Green et al., *Color Engineering*, John Wiley and Sons Ltd. (2002), which is hereby incorporated by reference in its entirety, and using Eqs. (27) to (29), as described in [0224] and [0225].

Step 2:

Using the resultant L*a*b*data, the magnitude of the gradient of the full resolution color image field is calculated using the procedure described in Lee et al., "Detecting Boundaries in a Vector Field," *IEEE Transactions on Signal Processing* 39(5):1181-1194 (1991), which is hereby incorporated by reference in its entirety.

Step 3:

Following this, using initialization thresholds of $\lambda=10$ and $\lambda+5=15$, as well as number of RGIs N=5, with $\Delta g=10\%$ the threshold values required for segmentation are determined adaptively utilizing Eq. 45, as described in [0226] to [0234]. These values were obtained to be 17, 19, 25, 35, and 56 for the aforementioned Church image. The same thresholds were utilized for segmenting the input image at all resolutions.

Step 4:

Having obtained the segmentation thresholds in step 3 the full resolution RGB image is subjected to a dyadic wavelet decomposition (module 2) using the Daubechies (9, 7) biorthogonal wavelet analysis coefficients, summarized in Table 1. The number of decomposition levels was determined using the desired dimension D=128 as well as the image dimensions of 321×481, in accordance with the procedure described in [0235]. For this particular example 2-level decomposition was performed.

Step 5:

Starting at the smallest resolution (L=2 of dimensions 81×121), the initial clustering phase is performed using the procedure described in [0237] to [0238]. Initialization thresholds of $\lambda=10$ and $\lambda+5=15$, as well as a Minimum Seed Size ($MSS_{L=2}$) criterion of 3 pixels is utilized for this purpose to eventually generate a Parent Seeds (PSs) map. As mentioned in [0238] the size of the Parent seeds were restricted to 50*MSS and 25*MSS for $\lambda=5$ and $\lambda+5=10$ respectively. Consequently these criteria were obtained to be 150 and 75 pixels, respectively.

Step 6:

The resultant initial seeds map is subjected through a region growth process (module 3) described in [0239] to [0257]. This procedure facilitates the growth of the existent parent seeds as well as the addition of new seeds in unsegmented regions at distinct stages of region processing. The growth of existent parent seeds was done by merging of child seeds to them using a color distance threshold of 60. In addition the region size criteria for the five RGIs, set at 10*MSS, 5*MSS, MSS, MSS and MSS, was obtained to be 30, 15, 3, 3 and 3 pixels, respectively.

Step 7:

Having completed the region growth process, a texture information channel (module 5) was computed using the procedure described in [0269] to [0271]. More specifically the color converted image in the L*a*b* color space was first quantized to 216 different colors and the result indexed/quantized map was employed in a local neighborhood based entropy calculation using Eq. (55) in a 9×9 window around every pixel in the image.

Step 8:

The acquired texture information, along with the L*a*b* information and the region growth map acquired in module 3, are engaged in region merging procedure (module 6) described in [0272] to [0274]. Furthermore this region merging process is based a statistical procedure known as the Multivariate ANalysis Of Variance (MANOVA) described in [0217]. In performing the aforementioned process the maximum similarity value for region merging was set at 4 while the maximum number of groups in the output segmentation (MaxNg) was set at 40.

Step 9:

The output of the region merging module yields an interim segmentation map at the smallest resolution (L=2 for this example). This interim segmentation is subjected through a multiresolution seed transfer process (module 4), described in [0258] to [0268], to identify seeds/regions transferable from the current resolution (L=2) to the subsequent higher resolution (L=1).

Step 10:

Having identified seeds transferable from the current resolution (L=2) to the subsequent higher resolution (L=1), excepting steps 3, 4 and 5 all the remaining steps (1, 2, 6, 7, 8, 9, and 10) are repeated for the image at resolution level L=1 of dimensions 161×241, to arrive at an interim segmentation at resolution level L=1. The only parametric change for this resolution level is that a Minimum Seed Size ($MSS_{L=1}$) criterion of 7 pixels is utilized for processing various steps.

Step 11:

Having obtained at interim segmentation at resolution level L=1 and identified seeds transferable from the current resolution (L=1) to the subsequent higher resolution (L=0), excepting steps 3, 4 and 5 all the remaining steps (1, 2, 6, 7, 8, 9, and 10) are repeated for the image at resolution level L=0 of dimensions 321×481, to arrive at a final segmentation result at resolution level L=0. The only parametric change for this resolution level is that a Minimum Seed Size ($MSS_{L=0}$) criterion of 15 pixels is utilized for processing various steps.

Example 3

Similar results can be seen in the 'Parachute' image. All methods apart from the MAPSEG algorithm, over segment the sky and mountain regions, as seen in FIGS. 37(b), (c), (d), and (e). The MAPSEG results in FIG. 37(f) have been obtained using the following steps:

Step 1:

The input RGB image namely 'Parachute' is first subjected to processing in module 1. The processing in this module commences in a color space conversion from RGB to CIEL*a*b* in a manner described in Green et al., *Color Engineering*, John Wiley and Sons Ltd. (2002), which is hereby incorporated by reference in its entirety, and using Eqs. (27) to (29), as described in [0224] and [0225].

Step 2:

Using the resultant L*a*b*data, the magnitude of the gradient of the full resolution color image field is calculated using the procedure described in Lee et al., "Detecting Boundaries in a Vector Field," *IEEE Transactions on Signal Processing* 39(5):1181-1194 (1991), which is hereby incorporated by reference in its entirety.

Step 3:

Following this, using initialization thresholds of $\lambda=10$ and $\lambda+5=15$, as well as number of RGIs N=5, with $\Delta g=10\%$ the threshold values required for segmentation are determined adaptively utilizing Eq. 45, as described in [0226] to [0234]. These values were obtained to be 18, 24, 45, 64, and 87 for the aforementioned Parachute image. The same thresholds were utilized for segmenting the input image at all resolutions.

Step 4:

Having obtained the segmentation thresholds in step 3 the full resolution RGB image is subjected to a dyadic wavelet decomposition (module 2) using the Daubechies (9, 7) biorthogonal wavelet analysis coefficients, summarized in Table 1. The number of decomposition levels was determined using the desired dimension D=128 as well as the image dimensions of 321×481, in accordance with the procedure described in [0235]. For this particular example 2-level decomposition was performed.

Step 5:

Starting at the smallest resolution (L=2 of dimensions 81×121), the initial clustering phase is performed using the procedure described in [0237] to [0238]. Initialization thresholds of $\lambda=10$ and $\lambda+5=15$, as well as a Minimum Seed Size ($MSS_{L=2}$) criterion of 3 pixels is utilized for this purpose to eventually generate a Parent Seeds (PSs) map. As mentioned in [0238] the size of the Parent seeds were restricted to 50*MSS and 25*MSS for $\lambda=5$ and $\lambda+5=10$ respectively. Consequently these criteria were obtained to be 150 and 75 pixels, respectively.

Step 6:

The resultant initial seeds map is subjected through a region growth process (module 3) described in [0239] to [0257]. This procedure facilitates the growth of the existent parent seeds as well as the addition of new seeds in unsegmented regions at distinct stages of region processing. The growth of existent parent seeds was done by merging of child seeds to them using a color distance threshold of 60. In addition the region size criteria for the five RGIs, set at 10*MSS, 5*MSS, MSS, MSS and MSS, was obtained to be 30, 15, 3, 3 and 3 pixels, respectively.

Step 7:

Having completed the region growth process, a texture information channel (module 5) was computed using the procedure described in [0269] to [0271]. More specifically the color converted image in the L*a*b* color space was first quantized to 216 different colors and the result indexed/quantized map was employed in a local neighborhood based entropy calculation using Eq. (55) in a 9×9 window around every pixel in the image.

Step 8:

The acquired texture information, along with the L*a*b* information and the region growth map acquired in module 3, are engaged in region merging procedure (module 6) described in [0272] to [0274]. Furthermore this region merging process is based a statistical procedure known as the Multivariate ANalysis Of Variance (MANOVA) described in [0217]. In performing the aforementioned process the maximum similarity value for region merging was set at 4 while the maximum number of groups in the output segmentation (MaxNg) was set at 40.

Step 9:

The output of the region merging module yields an interim segmentation map at the smallest resolution (L=2 for this example). This interim segmentation is subjected through a multiresolution seed transfer process (module 4), described in [0258] to [0268], to identify seeds/regions transferable from the current resolution (L=2) to the subsequent higher resolution (L=1).

Step 10:

Having identified seeds transferable from the current resolution (L=2) to the subsequent higher resolution (L=1), excepting steps 3, 4 and 5 all the remaining steps (1, 2, 6, 7, 8, 9, and 10) are repeated for the image at resolution level L=1 of dimensions 161×241, to arrive at an interim segmentation at resolution level L=1. The only parametric change for this resolution level is that a Minimum Seed Size ($MSS_{L=1}$) criterion of 7 pixels is utilized for processing various steps.

Step 11:

Having obtained at interim segmentation at resolution level L=1 and identified seeds transferable from the current resolution (L=1) to the subsequent higher resolution (L=0), excepting steps 3, 4 and 5 all the remaining steps (1, 2, 6, 7, 8, 9, and 10) are repeated for the image at resolution level L=0 of dimensions 321×481, to arrive at a final segmentation result at resolution level L=0. The only parametric change for this resolution level is that a Minimum Seed Size ($MSS_{L=0}$) criterion of 15 pixels is utilized for processing various steps.

Segmenting textured regions becomes a challenge when regions with diverse textures are extremely similar in color. Here a good texture descriptor is indispensable. FIG. 38(a) represents an image of a Cheetah which has a skin tone that almost matches its background making it extremely difficult to segment it based on just color information. The GRF, JSEG, DCGT results shown in FIGS. 38(b), (c) and (d) illustrates the effect of an indistinct texture descriptor for segmentation. The GS (FIG. 38(e)) method in comparison has been able to achieve a good segmentation. However, the use of the RGB space for color similarity has yielded incoherence in the segmentation of the background. This problem has been overcome in the MAPGSEG due to the use of the L*a*b* color space, shown in FIG. 38(f). The same anomalies spotted in the parachute and cheetah image can be seen in FIG. 39. Observe in FIGS. 39 (b), (c), and (e) that lake region is segmented into two regions due to illumination variation. In addition the DCGT method merged the tree bark region due to lack of a proper texture descriptor. Here again, the MAPGSEG is successful in overcoming illumination and color space non-uniformity problems. This method like the GS has the ability to segment fine details such as text with great efficiency unlike the GRF, JSEG, and DCGT as illustrated by the results in FIG. 40. Observe that the word 'Castrol' as seen in FIG. 40(a) is segmented out at multiple locations with near perfection by the MAPGSEG method as seen in FIG. 40(f). The GRF, JSEG and GS cause over segmentation in regions representing the motorway due to varying illumination and occlusion by the foreground objects, as see in FIGS. 40(b), (c), and (d). Thus, the efficiency of the MAPGSEG method in handling the background occlusion problem is emphasized in the 'Cars' results.

In the following figures, shown are the interim and final segmentation outputs of this method in comparison to the DCGT, GS and human segmentations provided by the University of California at Berkeley. In FIG. 41(b), (c) the results of the DCGT and GS from the 'Island' image have been oversegmented in the lake region due to illumination variation. Conversely the MAPGSEG is able to segment this region as one, even at the smallest resolution (see FIG. 41(f). It is noted that the segmentations at lower resolutions other than the original are being displayed after up scaling them to the size of the original input utilizing the up scaling methodology in Section IIID.

In addition the human segmentations for the island image are shown in FIG. 42. The closeness of the segmentation can be observed at all levels of the MAPGSEG to the human segmentations. This signifies the methods effectiveness and its robustness to scalability.

In FIG. 43 the 'Asian' image is portrayed. The DCGT fails on this image due the lack of a texture descriptor. Though this problem is overcome in the GS, it can be observed that the back ground is oversegmented which is not a favorable result when compared to the human segmentations shown in FIG. 44. However the MAPGSEG has been successful in segmenting the background as one region to a large extent as can be seen in FIG. 43 (f) when compared to the images in FIG. 44. In addition the level of detail in FIG. 43 (f) can be observed to be similar to most of the human segmented image unlike the GS method which over segments the robes of the two people and in one case merges the hand of the person with the background. Furthermore, the closeness of level 1 and level 0 results can be observed, signifying faster processing time for segmentation. FIGS. 45 and 46 demonstrate the method's performance on higher resolution images (768×1024 and 768×1020 respectively). To this effect the MAPGSEG is subjected to a 3 level decomposition resulting in three interim and one final segmentation output as seen the 'Tree' image results, in FIGS. 45 (c), (d), (e), and (f). Here the interim segmentation outputs have been showed without any up scaling. In the aforementioned images the increase in level of detail can be observed moving from one resolution to another. On the other hand in the output of the GS method (shown in FIG. 45 (b)) over segments the image in the grass region and road region. Since there is not much illumination variation in the areas of over segmentation this undesired result can be due to the static thresholding methodology employed by the GS. Similar observations can be made for the 'Road' image in FIG. 46 where near uniform illumination condition of the road is seen, but has been oversegmented by the GS which is unlike the MAPGSEG.

In the NPR evaluation, the normalization factor was computed by evaluating the Probabilistic Rand (PR) for all available manual segmentations, and the expected index (E [PR]) obtained was 0.6064. A distributional comparison of this evaluation, of the segmentation results for 300 images (of size 321×481) in the Berkeley database, obtained from the GRF, JSEG, DCGT, GS and MAPGSEG is displayed in FIG. 47. In FIG. 47 (a), it can be observed that the distribution for the GRF is weighted more towards the lower half of the distribution with a minimal NPR value going as low −0.9. A similar observation can made with the NPR distribution of the DCGT method in FIG. 47 (c). An improvement over the previous two methods is the JSEG in FIG. 47 (b) were the values are weighted more towards the higher end of NPR score distribution. More favorable NPR scores can be observed in the case of the GS and MAPGSEG in FIGS. 47 (d) and (e).

The actual improvement can be seen by superimposing all these distributions (as seen in FIG. 47 (f)), and observing the number of segmentation scores that fall within the range of very good segmentation results [0.7<NPR<1]. These numbers for the GRF, JSEG, DCGT, GS, and MAPGSEG were computed as 38, 65, 62, 79 and 85 respectively (see Table 3). This indicates that approximately a third of the images segmented using this method match closely to the segmentations performed by humans.

TABLE 3

EVALUATION OF MAPGSEG USING 300 IMAGES OF THE BERKELEY DATABASE IN COMPARISON TO PUBLISHED WORK

|  | GRF | JSEG | DCGT | GS | MAPGSEG |
|---|---|---|---|---|---|
| Avg. Time (sec) | 280.0 | 16.2 | 86.9 | 35.1 | 11.1 |
| Avg. NPR | 0.357 | 0.439 | 0.375 | 0.487 | 0.495 |
| NPR > 0.7 | 38 | 65 | 62 | 79 | 85 |
| Environment | C | C | MATLAB | MATLAB | MATLAB |

TABLE 4

EVALUATION OF VARIOUS LEVELS OF MAPGSEG USING 300 IMAGES OF THE BERKELEY DATABASE

|  | Level 2 | Level 1 | Level 0 |
|---|---|---|---|
| Avg. Time (sec) | 11.1 | 4.6 | 2.3 |
| Avg. NPR | 0.487 | 0.495 | 0.496 |
| NPR current level Vs NPR Level 0 | 98.09% | 99.7% | 100% |

TABLE 5

EVALUATION OF VARIOUS LEVELS OF MAPGSEG USING 445 LARGE RESOLUTION IMAGES IN COMPARISON TO GS

|  | Level 3 | Level 2 | Level 1 | Level 0 | GS |
|---|---|---|---|---|---|
| Avg. Time (sec) | 35.7 | 19.6 | 11.2 | 8.7 | 177.2 |

A comparison of the evaluation, for the segmentation results obtained from the five methods, is displayed in Table 3. This table shows that the method in accordance with embodiments of the present application has the highest average NPR score, and the lowest average run time per image, showing that this method is achieving quality segmentations with the least computational complexity, considering the different environments in which they were developed. Table 4 exhibits qualitative and quantitative comparison of various levels of the MAPGSEG, after all interim outputs were up scaled to the size of original input. Comparing the average level 2 NPR score to that that of level 1 even at level 2 it is seen that the outputs obtained are more than 98% of segmentation quality at the highest level (level 0), and acquired as fast as 2.3 seconds an image. Further more from Table 3 and 4 it can be seen that the MAPGSEG is three times faster than the GS with marginal improvement in segmentation quality. Table 5 shows the computational time comparison of various levels of the MAPGSEG to the GS for 445 large resolution images (~750×1200). Here it is seen that the GS has an average runtime in minutes (177.2 sec~=2.9 minutes) in comparison to this method with an overall runtime of 35.7 seconds, almost 5 times faster than its single scale version. In FIGS. 48(*a-d*) graphical representations of the computational efficiency of the MAPGSEG in comparison to other methods are shown.

The present invention provides a computationally efficient method designed for fast unsupervised segmentation of color images with varied complexities in a multiresolution framework. This Multiresolution Adaptive and Progressive Gradient-based color image SEGmentation (MAPGSEG) method is primarily based on adaptive gradient thresholding, progressive region growth involving distributed dynamic seed addition, multiresolution seed transfer and culminates in a unique region merging procedure. The method has been tested on a large database of images including the publicly available Berkeley database, and the quality of results show that this method is robust to various image scenarios at different scales and is superior to the results obtained on the same image when segmented by other methods, as can be seen in the results displayed.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for image segmentation, the method comprising:

performing by an image processing computing device a dyadic wavelet decomposition of an input image with automatic determination of a number of decomposition levels;

adaptively generating by the image processing computing device gradient thresholds for initial clustering and region processing at different resolution levels of the input image from a gradient histogram obtained from the performed dyadic wavelet decomposition;

implementing by the image processing computing device progressively thresholded multi-resolution region growth on the initial clustering and dyadic wavelet decomposition of the input image;

identifying by the image processing computing device transferable regions for multi-resolution information transfer, based on the implemented progressively thresholded multi-resolution region growth and a histogram analysis of gradient information; and merging by the image processing computing device the identified regions to provide interim results at arbitrary low resolution levels and a final segmentation map at a dyadic scale equal to that of the input image.

2. The method as set forth in claim 1 further comprising converting by the image processing computing device the input image from RGB to CIE L*a*b* before the adaptively generating thresholds.

3. The method as set forth in claim 1 wherein the adaptively generating gradient thresholds further comprises:

determining by the image processing computing device a vector gradient calculation on the input image to generate a resultant edge map; and using by the image processing computing device the resultant edge map to adaptively generate the gradient thresholds for the initial clustering and the region processing at different resolution levels, of the input image.

4. The method as set forth in claim 1 wherein the performing the dyadic wavelet decomposition of the input image further comprises classifying by the image processing computing device regions of varying gradient densities at different levels.

5. The method as set forth in claim 1 wherein the implementing progressively thresholded multi-resolution region growth utilizes distributed dynamic seed addition.

6. The method as set forth in claim 1 further comprising performing by the image processing computing device texture modeling on the initial clustering and dyadic wavelet decomposition of the input image, the merging is further based on the texture modeling.

7. A non-transitory computer readable medium having stored thereon instructions for image segmentation comprising machine executable code which when executed by at least one processor, causes the processor to perform steps comprising:
performing a dyadic wavelet decomposition of an input image with automatic determination of number of decomposition levels;
adaptively generating gradient thresholds for initial clustering and region processing at different resolution levels of the input image from a gradient histogram obtained from the performed dyadic wavelet decomposition;
implementing progressively thresholded multi-resolution region growth on the initial clustering and dyadic wavelet decomposition of the input image;
identifying transferable regions for multi-resolution information transfer, based on the implemented progressively thresholded multi-resolution region growth and a histogram analysis of gradient information; and
merging the identified regions to provide interim results at arbitrary low resolution levels and a final segmentation map at a dyadic scale equal to that of the input image.

8. The medium as set forth in claim 7 further comprising converting the input image from RGB to CIE L*a*b* before the adaptively generating thresholds.

9. The medium as set forth in claim 7 wherein the adaptively generating gradient thresholds further comprises:
determining a vector gradient calculation on the input image to generate a resultant edge map; and
using the resultant edge map to adaptively generate the gradient thresholds for the initial clustering and the region processing at different resolution levels, of the input image.

10. The medium as set forth in claim 7 wherein the performing the dyadic wavelet decomposition of the input image further comprises classifying regions of varying gradient densities at different levels.

11. The medium as set forth in claim 7 wherein the implementing progressively thresholded multi-resolution region growth utilizes distributed dynamic seed addition.

12. The medium as set forth in claim 7 further comprising performing texture modeling on the initial clustering and dyadic wavelet decomposition of the input image, the merging is further based on the texture modeling.

13. An image processing computing apparatus comprising a memory coupled to a processor configured to execute programmed instructions stored in the memory including instructions for implementing:
performing a dyadic wavelet decomposition of an input image with automatic determination of number of decomposition levels;
adaptively generating gradient thresholds for initial clustering and region processing at different resolution levels of the input image from a gradient histogram obtained from the performed dyadic wavelet decomposition;
implementing progressively thresholded multi-resolution region growth on the initial clustering and dyadic wavelet decomposition of the input image;
identifying transferable regions for multi-resolution information transfer, based on the implemented progressively thresholded multi-resolution region growth and a histogram analysis of gradient information; and
merging the identified regions to provide interim results at arbitrary low resolution levels and a final segmentation map at a dyadic scale equal to that of the input image.

14. The apparatus as set forth in claim 13 wherein the processor is further configured to execute programmed instructions stored in the memory further comprising converting the input image from RGB to CIE L*a*b* before the adaptively generating thresholds.

15. The apparatus as set forth in claim 13 wherein the processor is further configured to execute programmed instructions stored in the memory for the adaptively generating gradient thresholds further comprises:
determining a vector gradient calculation on the input image to generate a resultant edge map; and
using the resultant edge map to adaptively generate the gradient thresholds for the initial clustering and the region processing at different resolution levels, of the input image.

16. The apparatus as set forth in claim 13 wherein the processor is further configured to execute programmed instructions stored in the memory for the performing the dyadic wavelet decomposition of the input image further comprises classifying regions of varying gradient densities at different levels.

17. The apparatus as set forth in claim 13 wherein the implementing progressively thresholded multi-resolution region growth utilizes distributed dynamic seed addition.

18. The apparatus as set forth in claim 13 wherein the processor is further configured to execute programmed instructions stored in the memory further comprising performing texture modeling on the initial clustering and dyadic wavelet decomposition of the input image, the merging is further based on the texture modeling.

* * * * *